US012320917B2

(12) United States Patent
Murakami et al.

(10) Patent No.: US 12,320,917 B2
(45) Date of Patent: Jun. 3, 2025

(54) TRANSMITTING APPARATUS, CONTROL SYSTEM, AND TRANSMITTING METHOD

(71) Applicant: Panasonic Intellectual Property Corporation of America, Torrance, CA (US)

(72) Inventors: Yutaka Murakami, Kanagawa (JP); Nobuhiko Hashida, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 710 days.

(21) Appl. No.: 17/132,828

(22) Filed: Dec. 23, 2020

(65) Prior Publication Data

US 2021/0149016 A1 May 20, 2021

Related U.S. Application Data

(63) Continuation of application No. PCT/JP2019/048833, filed on Dec. 12, 2019.

(Continued)

(30) Foreign Application Priority Data

Nov. 11, 2019 (JP) .................................. 2019-204317

(51) Int. Cl.
*G01S 7/03* (2006.01)
*H04L 27/26* (2006.01)
(Continued)

(52) U.S. Cl.
CPC ............ *G01S 7/03* (2013.01); *H04L 27/2605* (2013.01); *H04W 72/04* (2013.01); *G01S 7/282* (2013.01);
(Continued)

(58) Field of Classification Search
CPC ... G01S 7/03; G01S 7/282; G01S 7/35; G01S 13/42; H04L 27/2605; H04L 5/0007; H04L 27/2602; H04W 72/04
See application file for complete search history.

(56) References Cited

U.S. PATENT DOCUMENTS 5,247,327 A 9/1993 Suzuka et al.
10,038,526 B2 * 7/2018 Zhao ..................... H04L 1/0058
(Continued)

FOREIGN PATENT DOCUMENTS

EP 0 843 188 5/1998
JP 5-93844 4/1993
(Continued)

OTHER PUBLICATIONS

International Search Report (ISR) issued on Mar. 17, 2020 in International (PCT) Application No. PCT/JP2019/048833.
(Continued)

*Primary Examiner* — Timothy A Brainard
*Assistant Examiner* — Ismaaeel A. Siddiquee
(74) *Attorney, Agent, or Firm* — Wenderoth, Lind & Ponack, L.L.P.

(57) ABSTRACT

A transmitting apparatus includes: a frame configuration unit that configures a frame conforming to orthogonal frequency-division multiple access (OFDMA) and including a plurality of time-frequency resources, each being a resource defined by time and frequency; and a transmitter that transmits the frame configured by the frame configuration unit over radio waves. The frame configuration unit configures, as the frame, a frame including a resource for communication and a resource for sensing, the resource for communication being a time-frequency resource in which a symbol including communication data is disposed, and the resource for sensing being a time-frequency resource in which a symbol (Continued)

for sensing via radio waves transmitted by the transmitter is disposed.

9 Claims, 65 Drawing Sheets

Related U.S. Application Data

(60) Provisional application No. 62/895,673, filed on Sep. 4, 2019, provisional application No. 62/779,096, filed on Dec. 13, 2018.

(51) Int. Cl.
| | | |
|---|---|---|
| *H04W 72/04* | (2023.01) | |
| *G01S 7/282* | (2006.01) | |
| *G01S 7/35* | (2006.01) | |
| *G01S 13/42* | (2006.01) | |
| *H04L 5/00* | (2006.01) | |

(52) U.S. Cl.
CPC ............... *G01S 7/35* (2013.01); *G01S 13/42* (2013.01); *H04L 5/0007* (2013.01); *H04L 27/2602* (2013.01)

(56) References Cited

U.S. PATENT DOCUMENTS

| | | |
|---|---|---|
| 2002/0024422 A1 | 2/2002 | Turner et al. |
| 2006/0152342 A1 | 7/2006 | Turner et al. |
| 2007/0060079 A1 | 3/2007 | Nakagawa et al. |
| 2008/0018521 A1 | 1/2008 | Sahinoglu et al. |
| 2011/0092223 A1 | 4/2011 | Nakagawa et al. |
| 2013/0136093 A1* | 5/2013 | Han ................ H04L 5/0046 370/329 |
| 2013/0316730 A1 | 11/2013 | Ding |
| 2015/0063321 A1* | 3/2015 | Sadek ............... H04L 5/0062 370/336 |
| 2015/0373571 A1* | 12/2015 | Chincholi ......... H04L 5/0082 370/330 |
| 2017/0339692 A1 | 11/2017 | Chun et al. |
| 2018/0095161 A1* | 4/2018 | Kellum ............... G01S 13/10 |
| 2018/0160333 A1* | 6/2018 | Patil ..................... H04W 4/46 |
| 2019/0162817 A1 | 5/2019 | Priyanto et al. |
| 2020/0036487 A1* | 1/2020 | Hammond ........ H04L 5/0012 |
| 2022/0060245 A1* | 2/2022 | Sato ..................... B61L 25/02 |

FOREIGN PATENT DOCUMENTS

| | | |
|---|---|---|
| JP | 10-3109 | 1/1998 |
| JP | 10-232338 | 9/1998 |
| JP | 2002-064404 | 2/2002 |
| JP | 2007-071819 | 3/2007 |
| JP | 2008-026310 | 2/2008 |
| JP | 2010-078527 | 4/2010 |
| JP | 2011-080799 | 4/2011 |
| JP | 2013-072732 | 4/2013 |
| JP | 2014-138290 | 7/2014 |
| JP | 2018-522306 | 8/2018 |
| KR | 10-1615319 | 4/2016 |
| WO | 2016/200508 | 12/2016 |

OTHER PUBLICATIONS

S. Schuster, S. Scheiblhofer, R. Feger, and A. Stelzer, "Signal Model and Statistical Analysis for the Sequential Sampling Pulse Radar Technique," in Proc. IEEE Radar Conf, 2008, pp. 1-6, 2008.

D. Cao, T. Li, P. Kang, H. Liu, S. Zhou, H. Su, "Single-Pulse Multi-Beams Operation of Phased Array Radar", 2016 CIE International Conference on Radar (RADAR), pp. 1-4, 2016.

A. Bourdoux, K. Parashar, and M. Bauduin, "Phenomenology of Mutual Interference of FMCW and PMCW Automotive Radars," in 2017 IEEE Radar Conference (Radar Conf.), pp. 1709-1714, 2017.

J. Fink, F. K. Jondral, "Comparison of OFDM Radar and Chirp Sequence Radar," in 2015 16th International Radar Symposium (IRS), pp. 315-320, 2015.

Hadizadehmoghaddam, Sepehr et al. , "Simultaneous Execution of Multiple Radar Tasks using OFDMA," 2017 IEEE Radar Conference, May 2017, pp. 0622-0626, DOI: 10.1109/RADAR.2017.7944278, Section I and II.

English Machine Translation of JPH10-232338, published Sep. 2, 1998.

\* cited by examiner

TRANSMITTING APPARATUS, CONTROL SYSTEM, AND TRANSMITTING METHOD

CROSS REFERENCE TO RELATED APPLICATIONS

This application is a U.S. continuation application of PCT International Patent Application Number PCT/JP2019/048833 filed on Dec. 12, 2019, claiming the benefit of priority of U.S. Provisional Patent Application No. 62/779,096 filed on Dec. 13, 2018, U.S. Provisional Patent Application No. 62/895,673 filed on Sep. 4, 2019, and Japanese Patent Application Number 2019-204317 filed on Nov. 11, 2019, the entire contents of which are hereby incorporated by reference.

BACKGROUND

1. Technical Field

The present disclosure relates to a transmitting apparatus, a control system, and a transmitting method.

2. Description of the Related Art

One method of sensing the situation in the surrounding area includes a method of detecting light in the surrounding area using, for example, a camera, and a method of detecting light, infrared light, ultrasound waves that have reflected off something in the surrounding area. In recent years, a method of sensing the situation in the surrounding area using radio waves has also been proposed.

SUMMARY

There are various purposes for using spatial sensing, applications of spatial sensing, and environments in which spatial sensing is used.

In view of this, the present disclosure provides a transmitting apparatus and a transmitting method capable of performing sensing in the surrounding area.

A transmitting apparatus according to one aspect of the present disclosure includes: a frame configuration unit configured to configure a frame conforming to orthogonal frequency-division multiple access (OFDMA) and including a plurality of time-frequency resources, each being a resource defined by time and frequency; and a transmitter configured to transmit the frame configured by the frame configuration unit over radio waves. The frame configuration unit is configured to configure, as the frame, a frame including a resource for communication and a resource for sensing, the resource for communication being a time-frequency resource in which a symbol including communication data is disposed, and the resource for sensing being a time-frequency resource in which a symbol for sensing via radio waves transmitted by the transmitter is disposed.

General or specific aspects of these may be realized as a system, method, integrated circuit, computer program, computer-readable recording medium such as a CD-ROM, or any given combination thereof.

The transmitting apparatus according to the transmitting apparatus is capable of performing sensing in the surrounding area.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
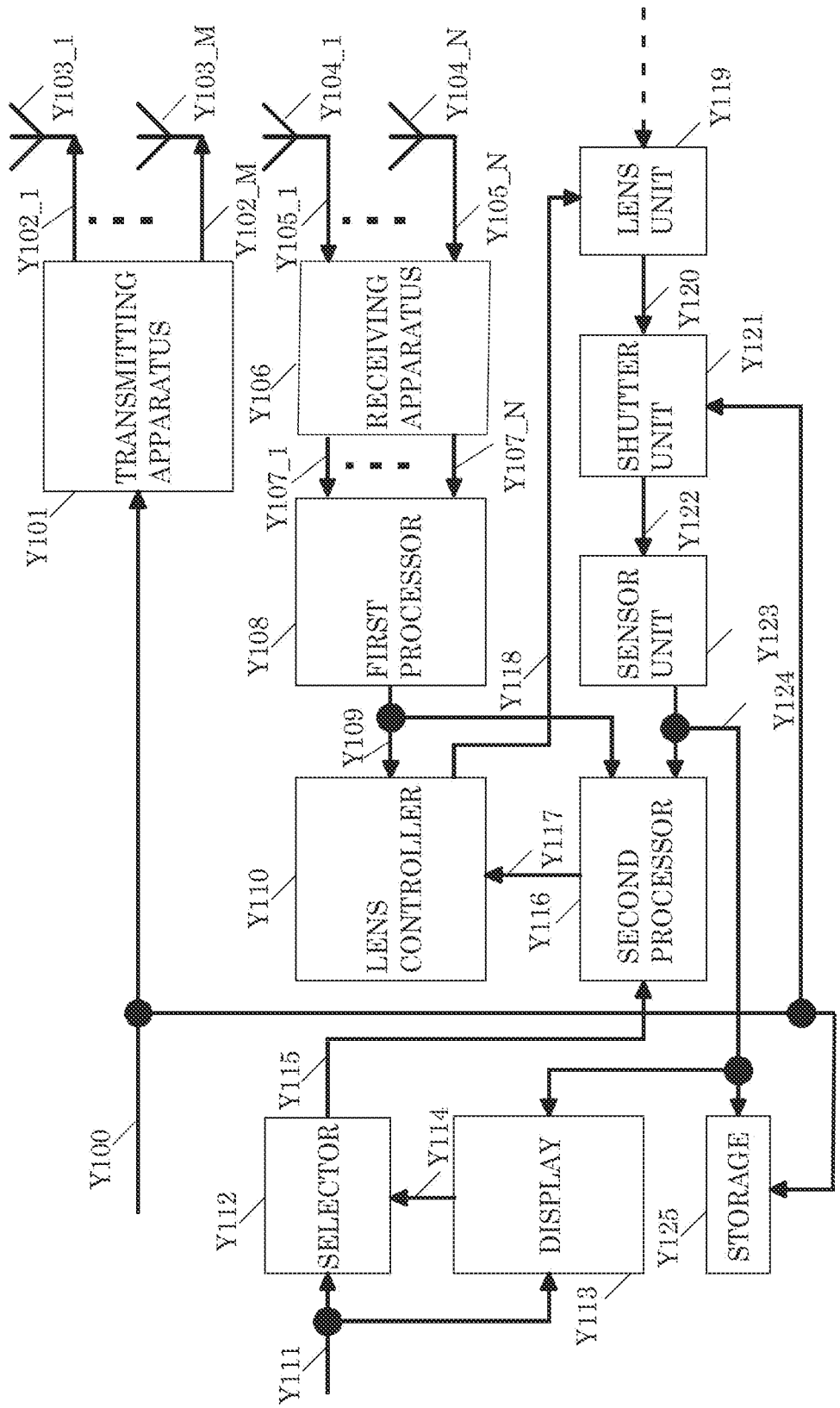
FIG. 1 illustrates one example of a configuration of a detecting apparatus according to Embodiment 1.

A transmitting apparatus according to one aspect of the present disclosure includes: a frame configuration unit configured to configure a frame conforming to orthogonal frequency-division multiple access (OFDMA) and including a plurality of time-frequency resources, each being a resource defined by time and frequency; and a transmitter configured to transmit the frame configured by the frame configuration unit over radio waves. The frame configuration unit is configured to configure, as the frame, a frame including a resource for communication and a resource for sensing, the resource for communication being a time-frequency resource in which a symbol including communication data is disposed, and the resource for sensing being a time-frequency resource in which a symbol for sensing via radio waves transmitted by the transmitter is disposed.

The above aspect enables the transmitting apparatus to perform, via the transmitter, communication using radio waves and sensing of an object in the surrounding area of the transmitting apparatus using radio waves. More specifically, the transmitting apparatus can perform communication using a resource for communication disposed in a frame transmitted over radio waves by the transmitter and perform sensing using a resource for sensing disposed in the frame. This makes it possible for the transmitting apparatus to perform sensing in the surrounding area.

For example, the frame may include at least two of the resources for sensing, the at least two resources for sensing being defined by different times and a same frequency, and disposed temporally adjacent to one another with a guard interval therebetween.

The above aspect enables the transmitting apparatus to perform even more adequate sensing of the surrounding area of the transmitting apparatus while avoiding interference between two resources for sensing by providing a guard interval between the two resources for sensing in the frame. This allows the transmitting apparatus to even more adequately obtain a sensing result of the surrounding area.

For example, the frame may include two guard intervals of different lengths of time and different frequencies.

The above aspect enables the transmitting apparatus to provide guard intervals of mutually different frequencies and different lengths of time in the frame. This allows for more flexibility in providing a guard interval for each frequency, which makes it possible to avoid interference between two resources for sensing and enables the transmitting apparatus to perform even more adequate sensing of the surrounding area. This allows the transmitting apparatus to even more adequately obtain a sensing result of the surrounding area.

For example, the frame may include at least two of the resources for sensing, the at least two resources for sensing being of different frequencies and different lengths of time.

The above aspect enables the transmitting apparatus to dispose two resources for sensing of mutually different frequencies and different lengths of time in the frame. This allows for more flexibility in providing a resource for sensing for each frequency, which makes it possible to avoid interference between two resources for sensing and enables the transmitting apparatus to perform even more adequate sensing of the surrounding area. This allows the transmitting apparatus to even more adequately obtain a sensing result of the surrounding area.

For example, the transmitting apparatus may further include: a receiver configured to receive a reflected wave of the radio waves transmitted by the transmitter; and a processor configured to execute sensing processing by analyzing the reflected wave received by the receiver.

The above aspect enables the transmitting apparatus to receive and analyze reflected waves of transmitted radio waves. This allows the transmitting apparatus to obtain a sensing result of the surrounding area of the transmitting apparatus.

For example, the sensing processing may include at least one of processing of detecting a position of an object, processing of detecting presence or absence of an object, or processing of detecting a shape of an object, by analyzing the reflected wave received by the receiver.

The above aspect enables the transmitting apparatus to more easily obtain a sensing result of the surrounding area of the transmitting apparatus by performing processing of detecting the position of an object, processing of detecting the presence or absence of an object, and/or processing of detecting the shape of an object.

For example, the transmitting apparatus may further include a controller configured to control driving of an electronic device based on a result of the sensing processing by the processor.

The above aspect enables the transmitting apparatus to control the driving of an electronic device based on a sensing result of the surrounding area of the transmitting apparatus. This makes it possible to control the driving of an electronic device using a sensing result of the surrounding area.

A control system according to one aspect of the present disclosure includes: the transmitting apparatus described above; and the electronic device driven under control by the controller included in the transmitting apparatus.

The above aspect enables the control system to achieve the same advantageous effects as the transmitting apparatus described above.

A transmitting method according to one aspect of the present disclosure includes: configuring a frame conforming to orthogonal frequency-division multiple access (OFDMA) and including a plurality of time-frequency resources, each being a resource defined by time and frequency; and transmitting the frame configured in the configuring over radio waves, wherein in the configuring, a frame including a resource for communication and a resource for sensing is configured as the frame, the resource for communication being a time-frequency resource in which a symbol including communication data is disposed, and the resource for sensing being a time-frequency resource in which a symbol for sensing via radio waves transmitted in the transmitting is disposed.

The above aspect enables the transmitting method to achieve the same advantageous effects as the transmitting apparatus described above.

General or specific aspects of these may be realized as a system, method, integrated circuit, computer program, computer-readable recording medium such as a CD-ROM, or any given combination thereof.

Hereinafter, the transmitting apparatus according to the present disclosure will be described in greater detail with reference to the drawings.

Each of the following embodiments describes a general or specific example. The numerical values, shapes, materials, elements, the arrangement and connection of the elements, the steps, the order of the steps, etc., shown in the following embodiments are mere examples, and therefore do not limit the scope of the present disclosure. Therefore, among elements in the following embodiments, those not recited in any of the independent claims indicating the broadest scope are described as optional elements.

Embodiment 1

In the present embodiment, a detecting apparatus capable of detecting a position of an object in the surrounding area, positional relationships between objects, and distance to an object will be described. Note that the detecting apparatus is also herein referred to as a transmitting apparatus.

FIG. 1 illustrates one example of a configuration of the detecting apparatus according to the present embodiment.

Transmitting apparatus Y101 receives an input of control signal Y100. In this example, control signal Y100 includes information for controlling operations of one or more element included in detecting apparatus, such as information indicating to start operations for object detection, information indicating to end operations for object detection, information indicating to start recording a still image or video, and information indicating to end recording a still image or video.

When control signal Y100 includes information indicating to start operations for object detection, for example, transmitting apparatus Y101 generates, in receiving apparatus Y106, M modulated signals to be used for radio wave direction of arrival estimation, and outputs M transmission signals. In other words, transmitting apparatus Y101 outputs transmission signals Y102_1 through Y102_M. Note that M is an integer that is greater than or equal to 1. Transmission signal Y102_i is output as radio waves from antenna Y103_i. Note that i is an integer that is greater than or equal to 1 and less than or equal to M. Antenna Y103_i may be configured as a single antenna, and may be configured as a plurality of antennas. When antenna Y103_i is configured as a plurality of antennas, antenna Y103_i may include directionality control functionality.

A modulated signal transmitted from transmitting apparatus Y101 is reflected by an object present in the direction in which the modulated signal is radiated or in the surrounding area of the radiated modulation signal. Receiving apparatus Y106 receives the reflected waves. Accordingly, receiving apparatus Y106 receives reception signal group Y105_1 received by antenna Y104_1 through reception signal group Y105_N received by antenna Y104_N. Note that N is an integer that is greater than or equal to 1.

Hereinafter, a case in which antenna Y104_i is configured of a plurality of antennas will be described. As such, in the following description, the signals received by antenna Y104_i will be referred to as reception signal group Y105_i. For example, when antenna Y104_i is configured of 16 antennas, reception signal group Y105_i includes 16 reception signals.

Receiving apparatus Y106 performs direction of arrival estimation on reception signal group Y105_1 and estimates the distance to an object based on the timing of the transmission of modulated signals by transmitting apparatus Y101 and the timing of obtainment of reception signal group Y105_1. Receiving apparatus Y106 thus outputs object estimation information Y107_1. The phrase "distance to an object" used above means, for example, the distance between the object and the detecting apparatus. Here, the value calculated as the distance is, for example, the distance between the object and an antenna, the distance between the object and a central position of a plurality of antennas, or the distance between the object and a sensor unit (to be described later). The "distance to an object" may be, for example, the distance between a point or region of reflection of the modulated signal on the object and the detecting apparatus. When, for example, a plurality of modulated signals are transmitted simultaneously, a plurality of distances to an object may be measured, one for each of a plurality of points or regions on the object.

Similarly, receiving apparatus Y106 performs direction of arrival estimation on reception signal group Y105_i and estimates the distance to an object based on the timing of the transmission of modulated signals by transmitting apparatus Y101 and the timing of obtainment of reception signal group Y105_i. Receiving apparatus Y106 thus outputs object estimation information Y107_i. Note that i is an integer that is greater than or equal to 1 and less than or equal to N.

First processor Y108 receives an input of object estimation information Y107_1 through object estimation information Y107_N. For example, first processor Y108 performs detailed object estimation using object estimation information Y107_1 through object estimation information Y107_N. and outputs object estimation signal Y109.

Display Y113 receives inputs of image information Y124 and area information Y111 for restricting the area in which to perform object recognition, associates an image with the area in which to perform object recognition, and outputs area signal Y114. Note that the association of an image with the area in which to perform object recognition is, for example, specifying the area in which to perform object recognition in an image obtained in display Y113. The association of an image with the area in which to perform object recognition may be, for example, specifying an area in which first processor Y108 is to perform object recognition in accordance with a specified area of an image obtained in display Y113.

Selector Y112 receives inputs of area information Y111 and area signal Y114, for restricting the area in which to perform object recognition. Selector Y112 determines an area to detect an object in based on area information Y111 and area signal Y114, and outputs selected area signal Y115. Note that selector Y112 need not restrict the area to detect an object in. In such cases, selector Y112 need not output selected area signal Y115; selected area signal Y115 may include information indicating that the area to detect an object in is not restricted.

Although this configuration includes display Y113 and display Y113 is configured to output area signal Y114, the detecting apparatus is not limited to this configuration. Moreover, display Y113 may restrict the area of object detection based on instruction from the user made on a panel such as a liquid crystal panel via a touch panel function (e.g., an apparatus including a display apparatus such as a liquid crystal panel and a positional input apparatus such as a touch pad).

Second processor Y116 receives inputs of object estimation signal Y109, selected area signal Y115, and image information Y124. In this example, second processor Y116 performs first and second processing methods. However, second processor Y116 may perform only one of the first and second processing methods, and, alternatively, may switch between the first and second processing methods depending on the situation. Second processor Y116 may generate auxiliary information for storing distance information for a plurality of positions using object estimation signal Y109. For example, the auxiliary information is a plurality of items of position information corresponding to an object that is a candidate to be captured, and second processor Y116 may select position information corresponding to an object that is a candidate to be captured from the plurality of items of position information corresponding to an object that is a candidate to be captured.

First Processing Method:

Second processor Y116 performs object recognition from image information Y124. Second processor Y116 estimates the distance between each object recognized and the detecting apparatus based on recognition information for the object and object estimation signal Y109, and outputs estimated distance information Y117. Note that second processor Y116 may restrict the area in which object recognition is to be performed, using selected area signal Y115. Second processor Y116 may restrict which objects to perform distance estimation on, using selected area signal Y115.

Second Processing Method:

Second processor Y116 estimates the distance between each object and the detecting apparatus from object estimation signal Y109 and image information Y124, and outputs estimated distance information Y117. Note that second processor Y116 may restrict the area in which object recognition is to be performed, using selected area signal Y115. Second processor Y116 may restrict which objects to perform distance estimation on, using selected area signal Y115.

Lens controller Y110 receives inputs of object estimation signal Y109 and estimated distance information Y117. Lens controller Y110 determines control of operations related to the lens using object estimation signal Y109 and/or estimated distance information Y117, such as focal distance control for a target object, lens focus control for a target object, and controlling the direction in which to capture a target object, and outputs operation control signal Y118.

Lens unit Y119 receives an input of operation control signal Y118, and based on operation control signal Y118, controls operations related to the lens, such as focal distance control for a target object, lens focus control for a target object, and/or controlling the direction in which to capture a target object, and outputs object signal Y120. Note that object signal Y120 is an optical signal.

Shutter unit Y121 receives inputs of control signal Y100 and object signal Y120, controls operation of the shutter based on control signal Y100, and outputs post-control object signal Y122.

Sensor unit Y123 receives an input of post-control object signal Y122, performs optical to electric signal conversion, for example, and outputs image information Y124. For example, a charge-coupled device (CCD) image sensor, a complementary metal oxide semiconductor (CMOS) image sensor, or an organic CMOS image sensor may be used as sensor unit Y123.

Storage Y125 receives inputs of control signal Y100 and image information Y124, and stores image information, such as a video or a still image, based on control signal Y100. Storage Y125 may store the image information obtained by sensor unit Y123 as-is, and may store encoded data encoded using an image encoding technique.

In addition to or instead of image information, storage Y125 may store analytical data obtained as a result of signal processing the image. The analytical data is, for example, information indicating whether a detection target, which is set in advance and examples of which include a person, animal, vehicle, or drone, is captured or not, that is to say, whether or not a detection target is present in the region of capture or not. The analytical data may include information related to an attribute of the detection target such as color or size, the orientation of the detection target, and information related to an activity, such as the path of movement, the speed of the detection target, time of stay of the detection target, what the detection target is doing, or what the detection target is looking at. For example, the information related to an attribute may include, in the case of a person, the estimated gender and/or age of the person, and in the case of a vehicle, the model of the vehicle, the number of passengers, and/or the amount of cargo loaded in the vehicle.

As described above, with the detecting apparatus according to the present embodiment, it is possible to estimate the distance to an object using radio waves. Moreover, with the detecting apparatus according to the present embodiment, by controlling a lens used to capture the object based on the estimated distance to the object, it is possible to control the lens according to purpose, such as clearly capturing the target object to be captured. Moreover, with the detecting apparatus according to the present embodiment, the distance to the object can be estimated even when the surrounding area is dark, for example, which makes it possible to improve the reliability of the estimation of the distance to the object. Moreover, by both estimating the distance to the object using radio waves and estimating the distance to the object based on an optical signal (image), there is a possibility that the advantageous effect that more accurate or more reliable distance estimation can be performed can be achieved.

Next, the configuration of a detecting apparatus that differs from FIG. 1 and is capable of detecting an object with high accuracy will be described.

Figure 2:
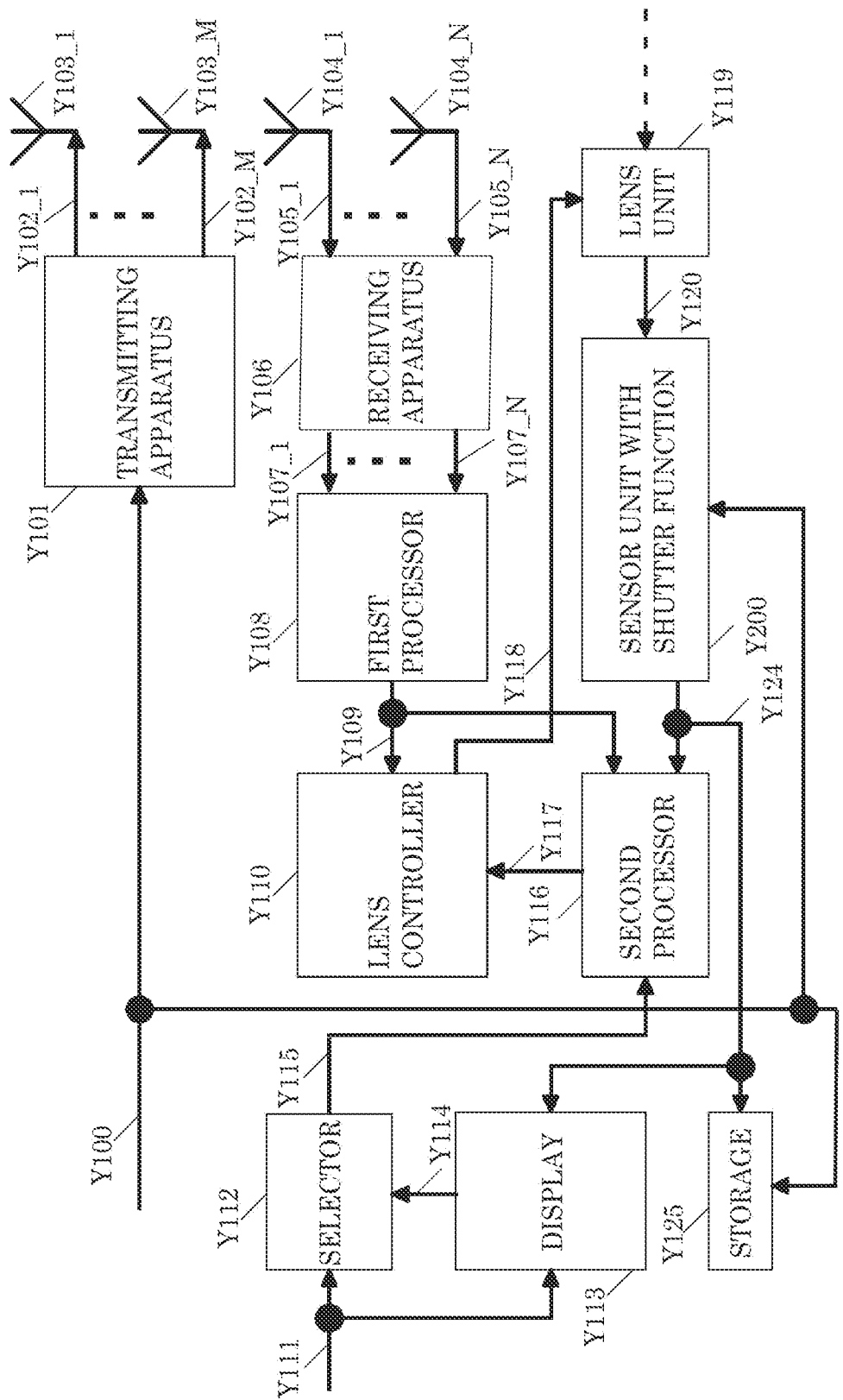
FIG. 2 illustrates one example of a configuration of the detecting apparatus according to Embodiment 1.

FIG. 2 illustrates an example of a configuration of a detecting apparatus that differs from FIG. 1. In FIG. 2, elements that operate the same as in FIG. 1 have the same reference signs, and repeated description will be omitted.

Sensor unit with shutter function Y200 receives inputs of control signal Y100 and object signal Y120. Sensor unit with shutter function Y200 receives an input of control signal Y100, controls shutter operation based on control signal Y100, and generates and outputs image information Y124 by performing optical to electric signal conversion, for example. The shutter of sensor unit with shutter function Y200 may be, for example, an electronic shutter or a global shutter.

In FIG. 2, operations performed by elements other than sensor unit with shutter function Y200 are the same as described with reference to FIG. 1.

With the detecting apparatus configured as described above, it is possible to estimate distance to an object using radio waves. Moreover, with the detecting apparatus configured as described above, by controlling a lens used to capture the object based on the estimated distance to the object, it is possible to control the lens according to purpose, such as clearly capturing the target object to be captured. Moreover, with the detecting apparatus configured as described above, the distance to the object can be estimated even when the surrounding area is dark, for example, which makes it possible to improve the reliability of the estimation of the distance to the object. Moreover, by both estimating the distance to the object using radio waves and estimating the distance to the object based on an optical signal (image), there is a possibility that the advantageous effect that more accurate or more reliable distance estimation can be performed can be achieved.

Next, the configuration of a detecting apparatus that differs from FIG. 1 and FIG. 2 and is capable of detecting an object with high accuracy will be described.

Figure 3:
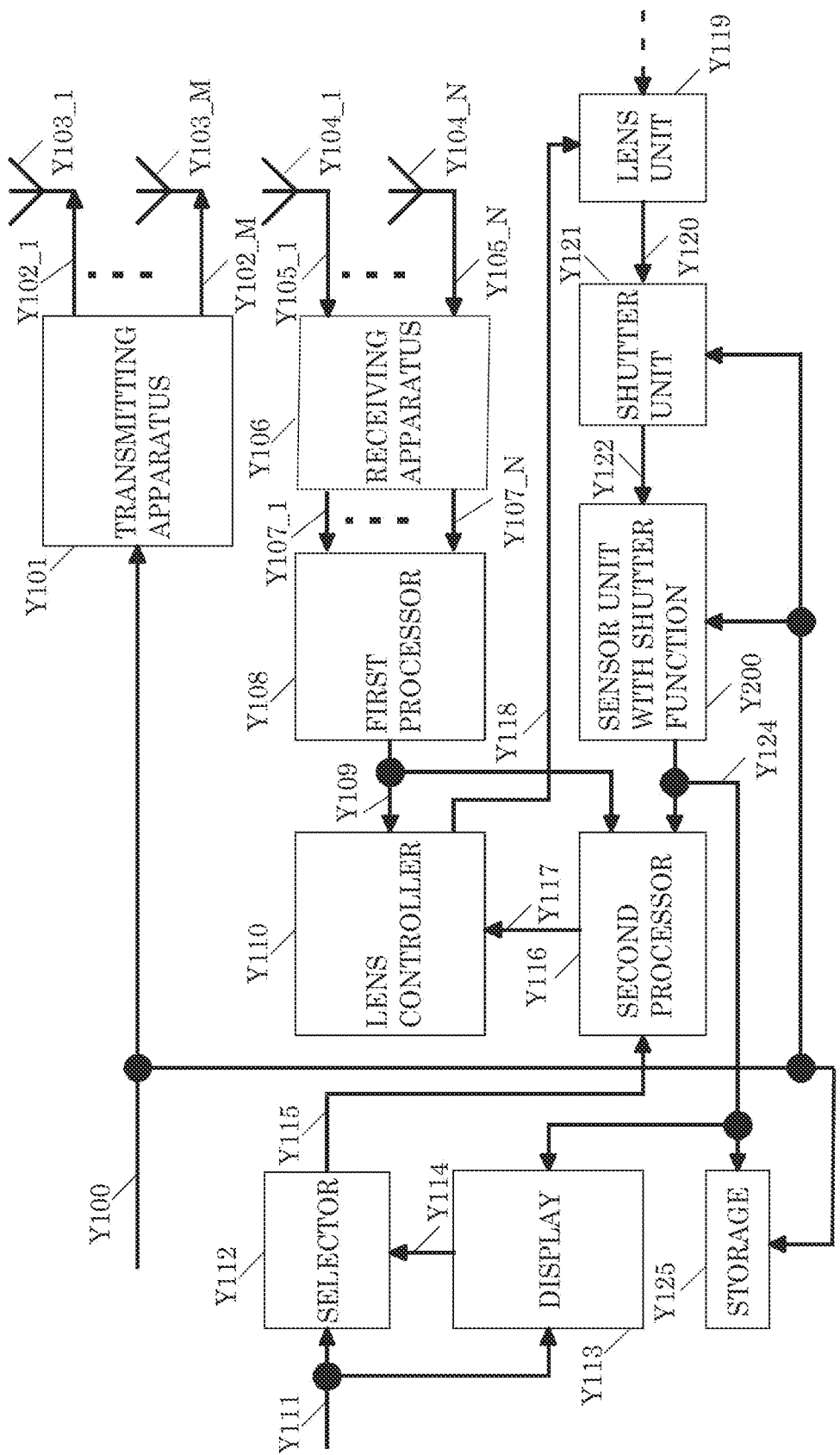
FIG. 3 illustrates one example of a configuration of the detecting apparatus according to Embodiment 1.

FIG. 3 illustrates an example of a configuration of a detecting apparatus that differs from FIG. 1 and FIG. 2. In FIG. 3, elements that operate the same as in FIG. 1 and FIG. 2 have the same reference signs, and repeated description will be omitted.

One characterizing feature of the configuration in FIG. 3 is that the detecting apparatus includes both shutter unit Y121 and sensor unit with shutter function Y200.

For example, shutter unit Y121 includes a mechanical shutter such as a focal-plane shutter. Sensor unit with shutter function Y200 includes an electronic shutter or a global shutter.

Sensor unit with shutter function Y200 receives an input of control signal Y100, and when the operation information included in control signal Y100 indicates video mode, the shutter function of sensor unit with shutter function Y200 operates. In contrast, shutter unit Y121 receives an input of control signal Y100, and when the operation information included in control signal Y100 indicates video mode, shutter unit Y121 does not operate the shutter, that is to say, keeps the shutter open.

Sensor unit with shutter function Y200 receives an input of control signal Y100, and when the operation information included in control signal Y100 indicates still image mode, control signal Y100 includes, for example, shutter speed information. In still image mode, sensor unit with shutter function Y200 operates the shutter function of sensor unit with shutter function Y200 in accordance with the shutter speed information.

Shutter unit Y121 receives an input of control signal Y100, and when the operation information included in control signal Y100 indicates still image mode, control signal Y100 includes, for example, shutter speed information. In still image mode, shutter unit Y121 operates the shutter function in accordance with the shutter speed information.

Note that in the still image mode, when the shutter function of sensor unit with shutter function Y200 is operating, the shutter function of shutter unit Y121 does not operate. Conversely, when the shutter function of shutter unit Y121 is operating, the shutter function of sensor unit with shutter function Y200 does not operate.

In FIG. 3, operations performed by elements other than those described above are the same as described with reference to FIG. 1.

With the detecting apparatus configured as described above, it is possible to estimate distance to an object using radio waves. Moreover, with the detecting apparatus configured as described above, by controlling a lens used to capture the object based on the estimated distance to the object, it is possible to control the lens according to purpose, such as clearly capturing the target object to be captured. Moreover, with the detecting apparatus configured as described above, the distance to the object can be estimated even when the surrounding area is dark, for example, which makes it possible to improve the reliability of the estimation of the distance to the object. Moreover, by both estimating the distance to the object using radio waves and estimating the distance to the object based on an optical signal (image), there is a possibility that the advantageous effect that more accurate or more reliable distance estimation can be performed can be achieved.

FIG. 4 illustrates a variation of FIG. 1.

Figure 4:
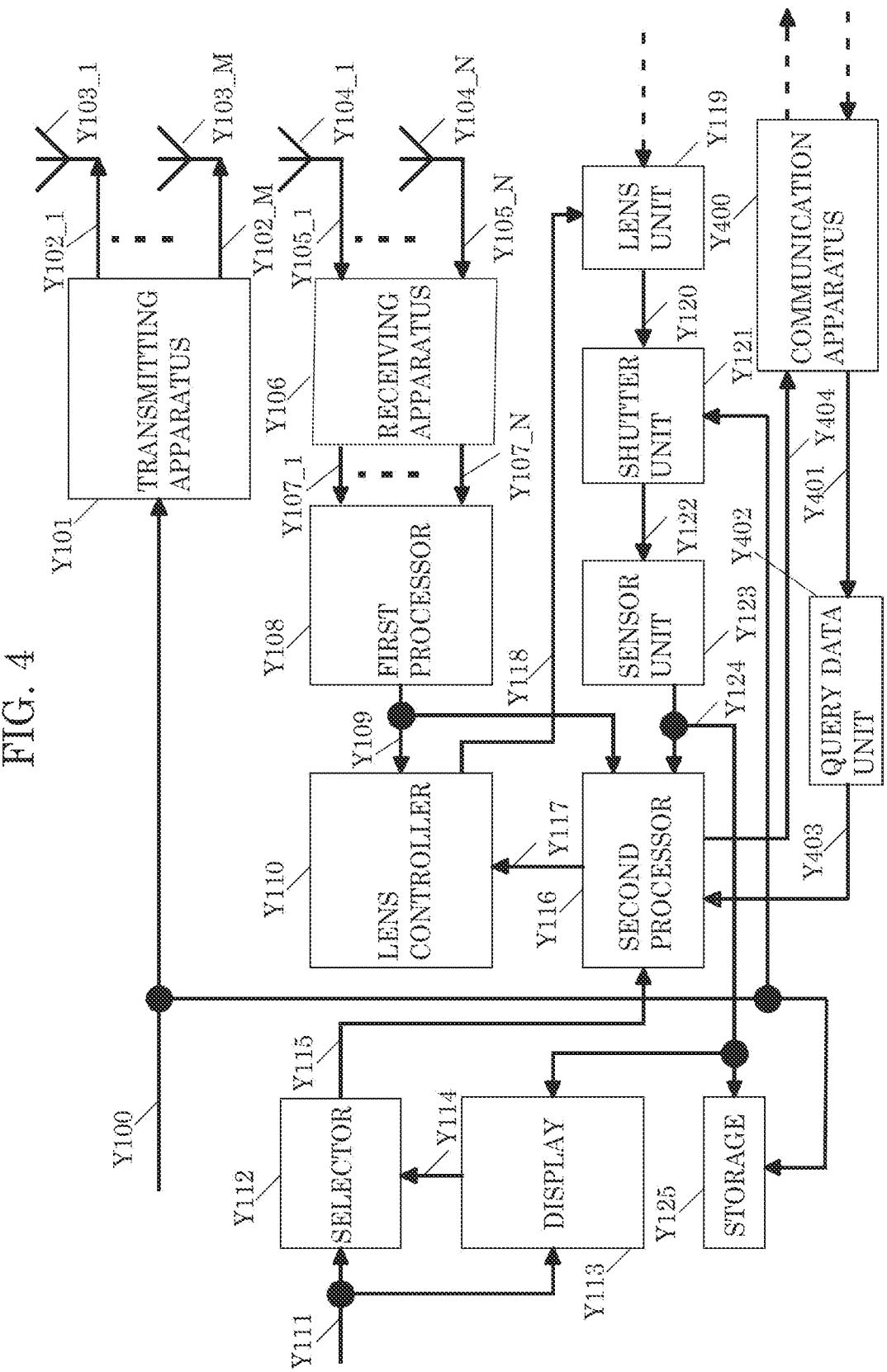
FIG. 4 illustrates a variation of a configuration of the detecting apparatus according to Embodiment 1.

In FIG. 4, elements that operate the same as in FIG. 1 have the same reference signs, and repeated description will be omitted.

Second processor Y116 receives inputs of object estimation signal Y109, selected area signal Y115, image information Y124, and data group Y403. In this example, second processor Y116 performs object recognition from image information Y124, based on data group Y403. Second processor Y116 estimates the distance between each object recognized and the detecting apparatus illustrated in the figure based on recognition information for the object and object estimation signal Y109, and outputs estimated distance information Y117. Second processor Y116 may restrict which objects to perform distance estimation on, using selected area signal Y115.

Examples of signal processing used when performing object recognition using image information Y124 include processing of detecting a person or part of the person such as their face, processing of identifying a person, processing of detecting a target object such as a vehicle or a drone, processing of identifying a target object such as a vehicle or a drone, processing of detecting activity or movement of a detected person or target object, and processing of tracking a detected person or target object. In this example, image information Y124 may be one or more still images, and may be a video of a plurality of frames successively obtained at a predetermined time.

For example, at least one feature amount obtained by performing a predetermined calculation process determined based on the purpose of the signal processing is extracted from image information Y124, and the signal processing is performed based on a comparison result of the extracted feature amount and a known feature amount corresponding to the target object or an activity thereof. Moreover, the signal processing may be performed based on a determination of whether the extracted feature amount exceeds a predetermined threshold or not. Moreover, the signal processing may be performed based on some other signal processing not described above. For example, the signal processing may be performed using a model created via machine learning using a multi-layer neural network. When a model created via machine learning using a multi-layer neural network is used, preprocessing may be performed on video image data, and the preprocessed data may be input into the model created via machine learning using a multi-layer neural network.

In FIG. 4, second processor Y116 may output data to query data unit Y402. For example, based on this information, query data unit Y402 may reduce the output data amount of data group Y403.

In the above description, second processor Y116 is exemplified as performing object recognition using image information Y124, but second processor Y116 may perform object recognition using object estimation signal Y109 in addition to image information Y124. In this example, object estimation signal Y109 need not comprise only distance information; for example, object estimation signal Y109 may include information such as reflectance, which is obtained by analyzing reception signal group Y105_i.

Second processor Y116 may output object recognition information Y404.

Communication apparatus Y400 receives an input of object recognition information Y404, generates a modulated signal including this data, and transmits the modulated signal to a communication apparatus that is a communication partner. In this example, the communication apparatus that is a communication partner is, for example, connected to a server, and the server obtains object recognition information Y404 from the modulated signal transmitted by communication apparatus Y400, generates an object recognition database, generates a modulated signal including this data base via the communication apparatus, and transmits the generated modulated signal to communication apparatus Y400.

Communication apparatus Y400 receives the modulated signal, obtains object recognition database Y401, and outputs object recognition database Y401 to query data unit Y402. Query data unit Y402 receives an input of object recognition database Y401, and updates data group Y403 that second processor Y116 uses to perform object recognition.

With the detecting apparatus configured as described above, it is possible to estimate distance to an object using radio waves. Moreover, with the detecting apparatus configured as described above, by controlling a lens used to capture the object based on the estimated distance to the object, it is possible to control the lens according to purpose, such as clearly capturing the target object to be captured. Moreover, with the detecting apparatus configured as described above, the distance to the object can be estimated even when the surrounding area is dark, for example, which makes it possible to improve the reliability of the estimation of the distance to the object. Moreover, by both estimating the distance to the object using radio waves and estimating the distance to the object based on an optical signal (image), there is a possibility that the advantageous effect that more accurate or more reliable distance estimation can be performed can be achieved.

Furthermore, with the detecting apparatus configured as described above, the mechanism for updating the database used for object recognition makes it possible to improve the accuracy and reliability of the object recognition, which resultantly contributes to an improvement in the accuracy and reliability of distance estimation. Moreover, when object recognition is performed using information obtained using radio waves in addition to using image information, there is a possibility that the accuracy and reliability of the object recognition will improve.

Figure 5:
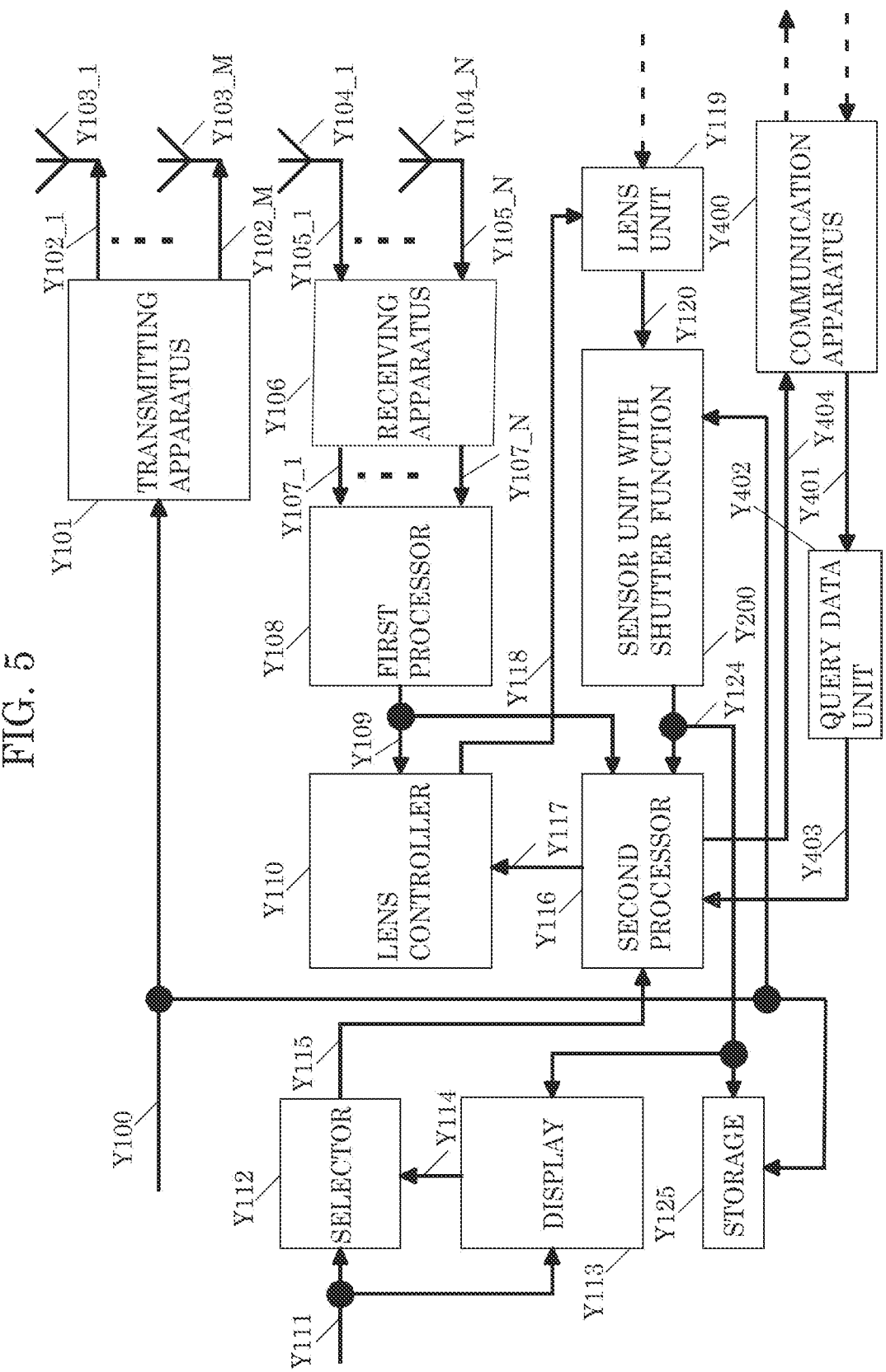
FIG. 5 illustrates a variation of a configuration of the detecting apparatus according to Embodiment 1.

FIG. 5 illustrates a variation of FIG. 2. In FIG. 5, elements that operate the same as in FIG. 1, FIG. 2, and FIG. 4 have the same reference signs, and repeated description will be omitted. As operations performed by each element illustrated in FIG. 5 have already been described, repeated description thereof will be omitted.

Figure 6:
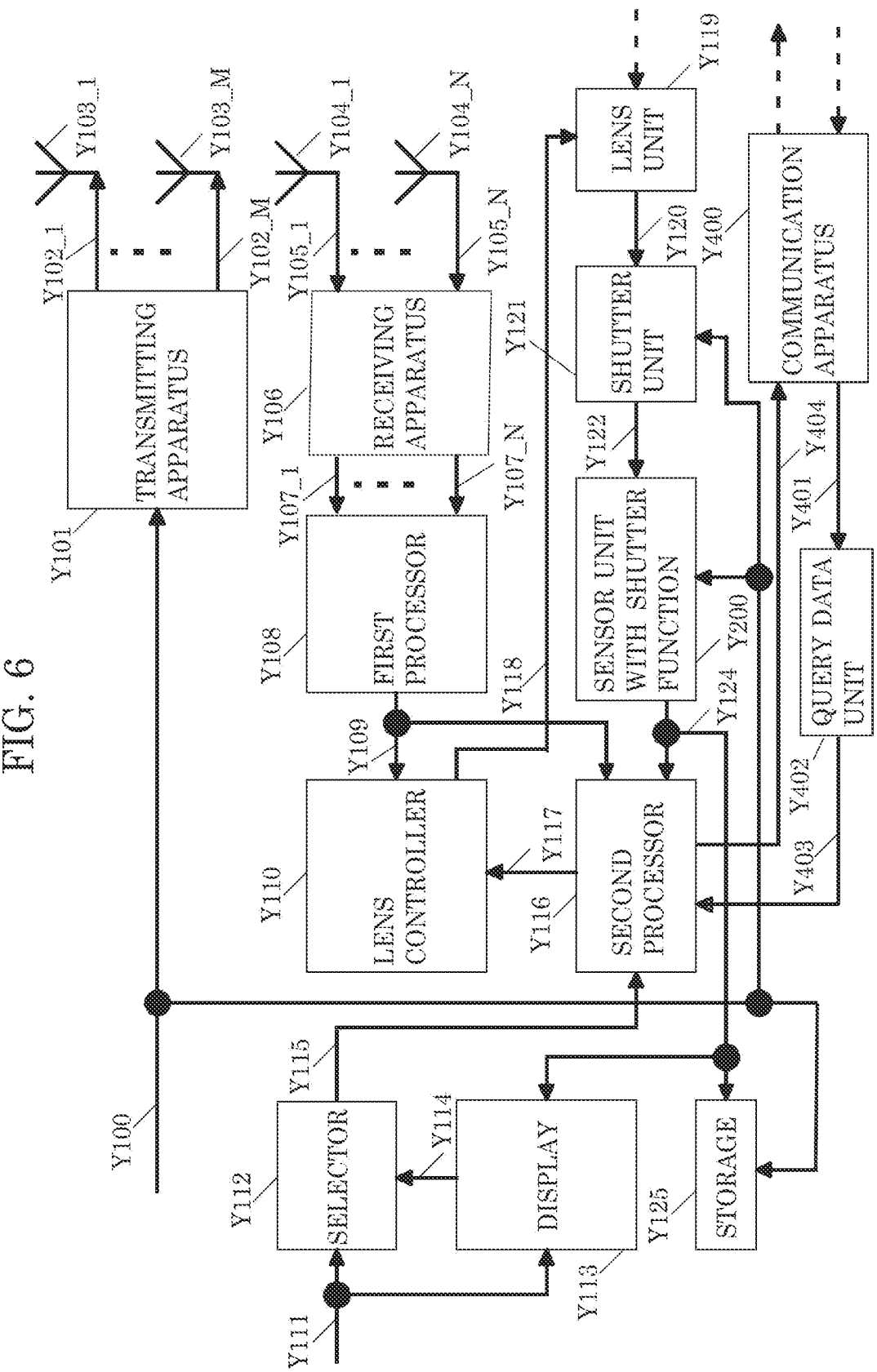
FIG. 6 illustrates a variation of a configuration of the detecting apparatus according to Embodiment 1.

FIG. 6 illustrates a variation of FIG. 3. In FIG. 6, elements that operate the same as in FIG. 1, FIG. 2, and FIG. 4 have the same reference signs, and repeated description will be omitted. As operations performed by each element illustrated in FIG. 6 have already been described, repeated description thereof will be omitted.

With the detecting apparatus configured as described above, it is possible to estimate distance to an object using radio waves. Moreover, with the detecting apparatus configured as described above, by controlling a lens used to capture the object based on the estimated distance to the object, it is possible to control the lens according to purpose, such as clearly capturing the target object to be captured. Moreover, with the detecting apparatus configured as described above, the distance to the object can be estimated even when the surrounding area is dark, for example, which makes it possible to improve the reliability of the estimation of the distance to the object. Moreover, by both estimating the distance to the object using radio waves and estimating the distance to the object based on an optical signal (image), there is a possibility that the advantageous effect that more accurate or more reliable distance estimation can be performed can be achieved.

Furthermore, with the detecting apparatus configured as described above, the mechanism for updating the database used for object recognition makes it possible to improve the accuracy and reliability of the object recognition, which resultantly contributes to an improvement in the accuracy and reliability of distance estimation. Moreover, when object recognition is performed using information obtained using radio waves in addition to using image information, there is a possibility that the accuracy and reliability of the object recognition will improve.

In the present embodiment, although an apparatus exemplified as having one of the configurations illustrated in FIG. 1 through FIG. 6 is referred to as a "detecting apparatus", the naming of the apparatus is not limited to a "detecting apparatus". For example, since the apparatus according to the present embodiment includes storage, this element may be referred to as a "storage apparatus", and since the apparatus includes a sensor unit, this element may be referred to as a camera, a video camera, a monitoring camera, a security camera, a recording apparatus, or a still image capturing apparatus. Moreover, this element may simply be referred to as an "apparatus". The naming of this element is not limited to the above examples.

The configurations of FIG. 1, FIG. 2, FIG. 3, FIG. 4, FIG. 5, and FIG. 6 may be realized as a system of a combination of separate apparatuses. Hereinafter, an example in which a configuration is realized as a plurality of separate apparatuses will be given.

Figure 7:
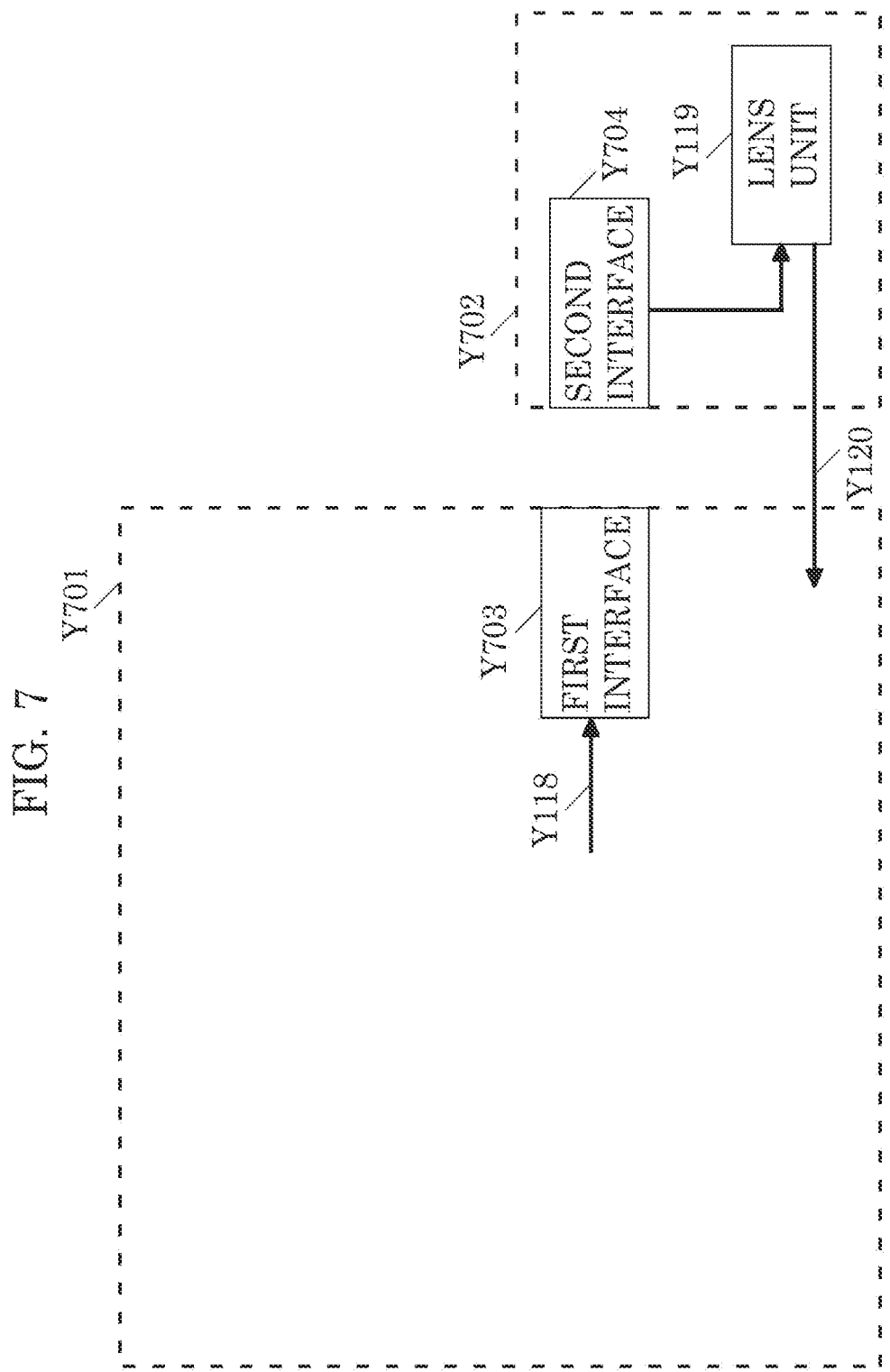
FIG. 7 illustrates one example of a separated configuration of the detecting apparatus according to Embodiment 1.

FIG. 7 illustrates a first example of separation of apparatuses.

Second apparatus Y702 is an apparatus that includes lens unit Y119 that is included in the apparatuses illustrated in FIG. 1, FIG. 2, FIG. 3, FIG. 4, FIG. 5, and FIG. 6. First apparatus Y701 is an apparatus that includes elements other than lens unit Y119 that are included in the apparatuses illustrated in FIG. 1, FIG. 2, FIG. 3, FIG. 4, FIG. 5, and FIG. 6.

First apparatus Y701 includes first interface Y703 for connecting to second apparatus Y702, and second apparatus Y702 includes second interface Y704 for connecting to first apparatus Y701.

Accordingly, first interface Y703 receives an input of operation control signal Y118. Second interface Y704 then outputs a signal to lens unit Y119. By connecting first interface Y703 and second interface Y704, lens unit Y119 can obtain a signal that corresponds to operation control signal Y118. Note that first interface Y703 and second interface Y704 may be connected in any manner. For example, first interface Y703 and second interface Y704 may be directly connected, and, alternatively, may be connected via a connection cable, for example. However, the connection method is not limited to the above examples.

Figure 8:
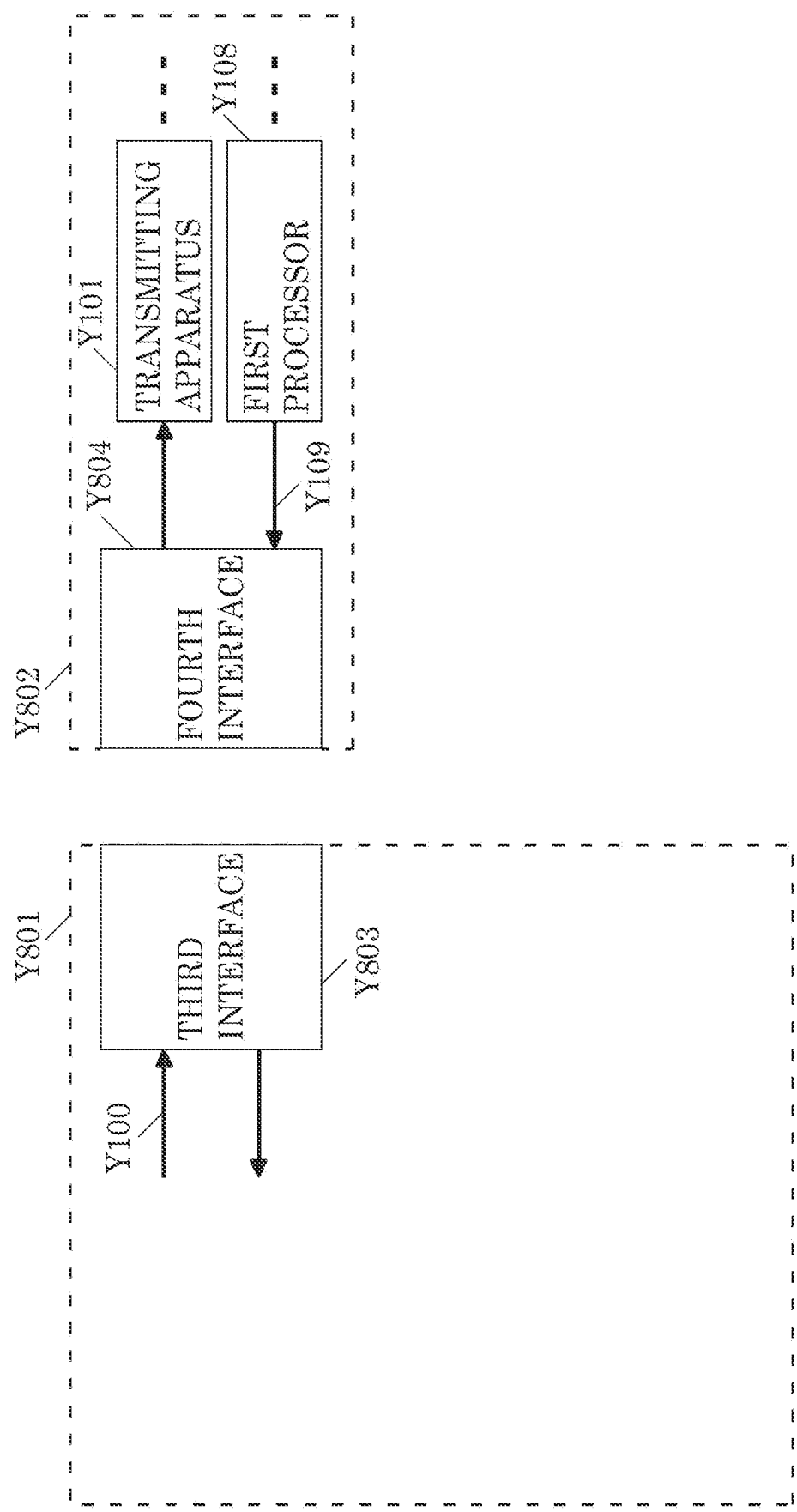
FIG. 8 illustrates one example of a separated configuration of the detecting apparatus according to Embodiment 1.

FIG. 8 illustrates a second example of separation of apparatuses.

Third apparatus Y802 includes transmitting apparatus Y101, antennas Y103_1 to Y103_M, antennas Y104_1 to Y104_N, receiving apparatus Y106, and first processor Y108 that are included in the apparatuses illustrated in FIG. 1, FIG. 2, FIG. 3, FIG. 4, FIG. 5, and FIG. 6. First variant Y801 of first apparatus Y701 is an apparatus that includes elements other than transmitting apparatus Y101, antennas Y103_1 to Y103_M, antennas Y104_1 to Y104_N, receiving apparatus Y106, and first processor Y108 that are included in the apparatuses illustrated in FIG. 1, FIG. 2, FIG. 3, FIG. 4, FIG. 5, and FIG. 6.

First variant Y801 of first apparatus Y701 includes third interface Y803 for connecting to third apparatus Y802, and third apparatus Y802 includes fourth interface Y804 for connecting to first variant Y801 of first apparatus Y701.

Accordingly, third interface Y803 receives an input of control signal Y100. Fourth interface Y804 then outputs a signal to transmitting apparatus Y101. By connecting third interface Y803 and fourth interface Y804, transmitting apparatus Y101 can obtain a signal that corresponds to control signal Y100.

Fourth interface Y804 receives an input of object estimation signal Y109. Third interface Y803 then outputs a signal. Accordingly, by connecting third interface Y803 and fourth interface Y804, third interface Y803 outputs a signal corresponding to object estimation signal Y109.

Note that third interface Y803 and fourth interface Y804 may be connected in any manner. For example, third interface Y803 and fourth interface Y804 may be directly connected, and, alternatively, may be connected via a connection cable, for example. However, the connection method is not limited to the above examples.

Figure 9:
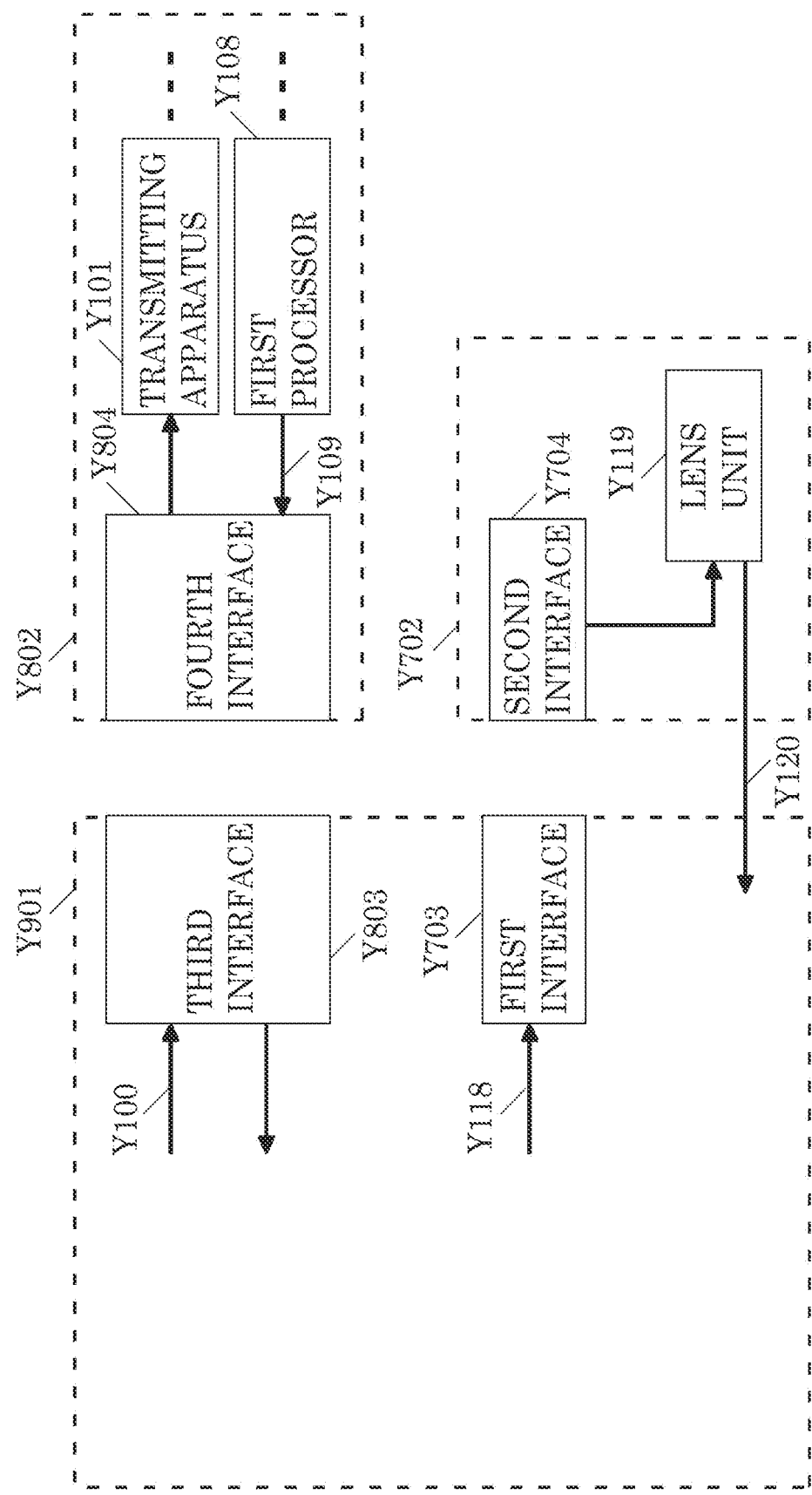
FIG. 9 illustrates one example of a separated configuration of the detecting apparatus according to Embodiment 1.

FIG. 9 illustrates a third example of separation of apparatuses. In FIG. 9, elements that operate the same as in FIG. 7 and FIG. 8 have the same reference signs, and repeated description will be omitted.

Second variant Y901 of first apparatus Y701 includes the elements that are included in the apparatuses illustrated in FIG. 1, FIG. 2, FIG. 3, FIG. 4, FIG. 5, and FIG. 6 except for transmitting apparatus Y101, antennas Y103_1 to Y103_M, antennas Y104_1 to Y104_N, receiving apparatus Y106, first processor Y108, and lens unit Y119. Second variant Y901 of first apparatus Y701 also includes first interface Y703 and third interface Y803.

Note that first interface Y703, second interface Y704, third interface Y803, and fourth interface Y804 illustrated in FIG. 9 operate as described above.

FIG. 9 illustrates a third example of separation of apparatuses. In FIG. 9, elements that operate the same as in FIG. 7 and FIG. 8 have the same reference signs, and repeated description will be omitted.

Second variant Y901 of first apparatus Y701 includes the elements that are included in the apparatuses illustrated in FIG. 1, FIG. 2, FIG. 3, FIG. 4, FIG. 5, and FIG. 6 except for transmitting apparatus Y101, antennas Y103_1 to Y103_M, antennas Y104_1 to Y104_N, receiving apparatus Y106, first processor Y108, and lens unit Y119. Second variant Y901 of first apparatus Y701 also includes first interface Y703 and third interface Y803.

Note that first interface Y703, second interface Y704, third interface Y803, and fourth interface Y804 illustrated in FIG. 9 operate as described above.

Figure 10:
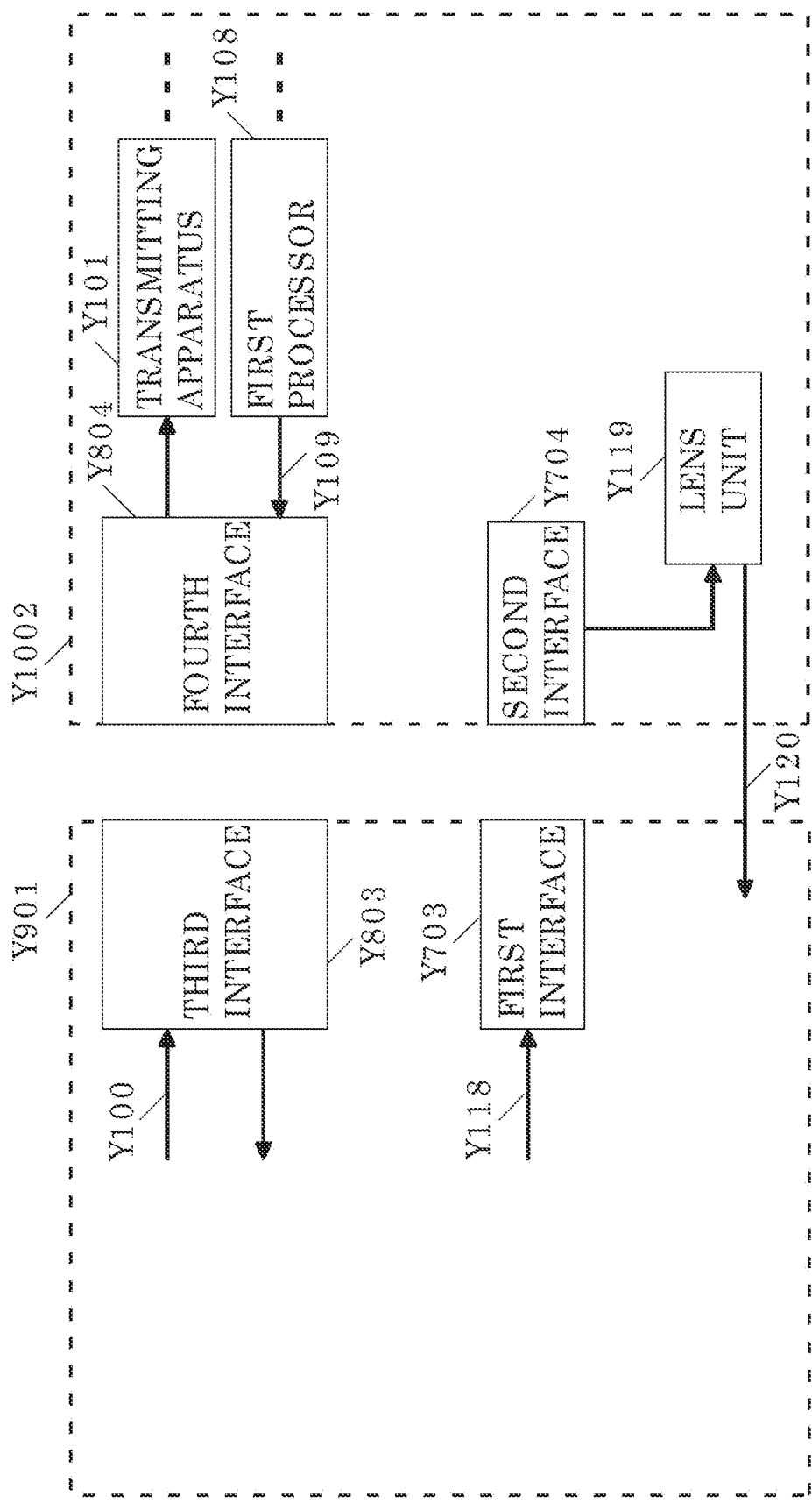
FIG. 10 illustrates one example of a separated configuration of the detecting apparatus according to Embodiment 1.

FIG. 10 illustrates a fourth example of separation of apparatuses. In FIG. 10, elements that operate the same as in FIG. 7, FIG. 8, and FIG. 9 have the same reference signs, and repeated description will be omitted.

Fourth apparatus Y1002 includes transmitting apparatus Y101, antennas Y103_1 through Y103_M, antennas Y104_1 through Y104_N, receiving apparatus Y106, first processor Y108, and lens unit Y119 that are included in the configurations illustrated in FIG. 1. FIG. 2, FIG. 3, FIG. 4, FIG. 5, and FIG. 6, and further includes second interface Y704 and fourth interface Y804. As operations performed by each element illustrated in FIG. 10 have already been described, repeated description thereof will be omitted.

Although examples of operations performed by the present embodiment have been described with reference to FIG. 1 through FIG. 10, the configurations illustrated in FIG. 1 through FIG. 10 are merely non-limiting examples.

Transmitting apparatus Y101 and receiving apparatus Y106 illustrated in FIG. 1 through FIG. 10 transmit and receive radio waves, and operations performed when doing so have been described. In contrast, if transmitting apparatus Y101 illustrated in FIG. 1 through FIG. 10 is configured to generate an optical modulated signal such as a visible light modulated signal and receiving apparatus Y106 illustrated in FIG. 1 through FIG. 10 is configured to receive optical modulated signals, the embodiment can still be carried out. If such a configuration is adopted, light emitting diodes (LEDs) or electroluminescent (EL) elements are used instead of antennas Y103_1 through Y103_M, and photodiodes or image sensors or the like are used instead of antennas Y104_1 through Y104_N.

In the apparatuses illustrated from FIG. 1 to FIG. 10 and the like, object recognition may be performed using information obtained using radio waves. In FIG. 1 through FIG. 10, one characterizing feature is that object recognition or estimation of distance to an object is performed and a still image or video is recorded (stored), but the configuration of an apparatus having such a characterizing feature is not limited to the configurations illustrated in FIG. 1 through FIG. 10.

Note that transmission power needs to be increased to increase sensing distance. For example, transmission power can be increased by narrowing the transmission band. Sensing using polarized waves is also possible.

Embodiment 2

In the present embodiment, a configuration method of the modulated signal transmitted by the apparatus described with reference to FIG. 1 through FIG. 10 and the like according to Embodiment 1 that performs distance estimation using radio waves or performs object recognition using radio waves will be described.

Figure 11:
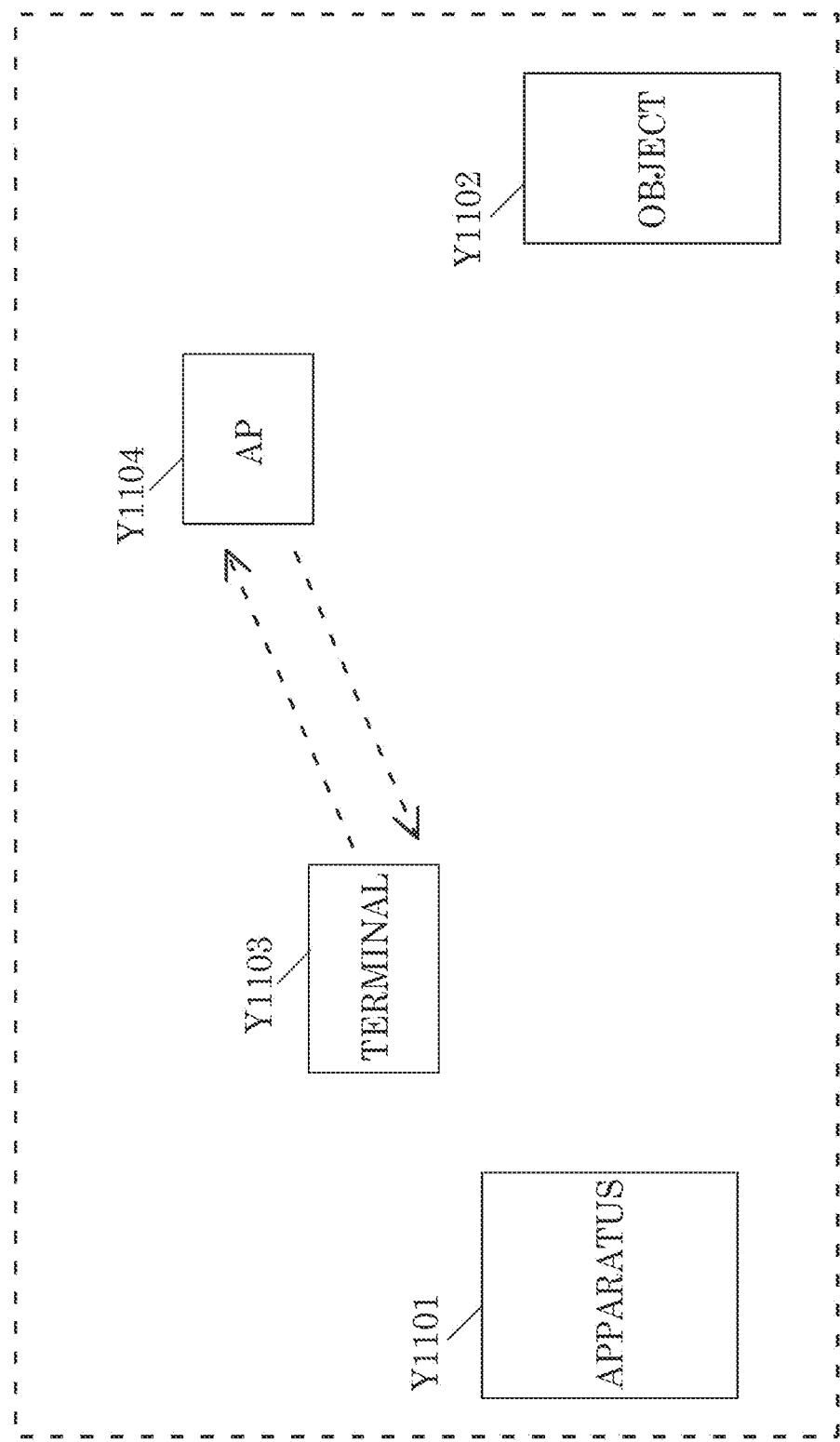
FIG. 11 illustrates one example of a state of an apparatus according to Embodiment 2.

FIG. 11 illustrates one example of states of apparatus Y1101 that performs distance estimation using radio waves or performs object recognition using radio waves described in Embodiment 1, object Y1102 that is a target for the distance estimation or object recognition, and other apparatuses. Hereinafter, "apparatus Y1101 that performs distance estimation using radio waves or performs object recognition using radio waves" will be referred to simply as "apparatus Y1101".

FIG. 11 illustrates terminal Y1103 and access point (AP) Y1104 in addition to apparatus Y1101 and object Y1102.

Terminal Y1103 and AP Y1104 use a first frequency band when they communicate. Apparatus Y1101 uses the first frequency band when performing distance estimation or object recognition on object Y1102.

In this example, when communication between terminal Y1103 and AP Y1104 and distance estimation or object recognition of object Y1102 by apparatus Y1101 are performed at the same time, radio waves from one will interfere with radio waves from the other, which decreases communication quality and may contribute to a decrease in accuracy of the distance estimation or object recognition.

In the present embodiment, a method for improving these decreases will be described.

Figure 12:
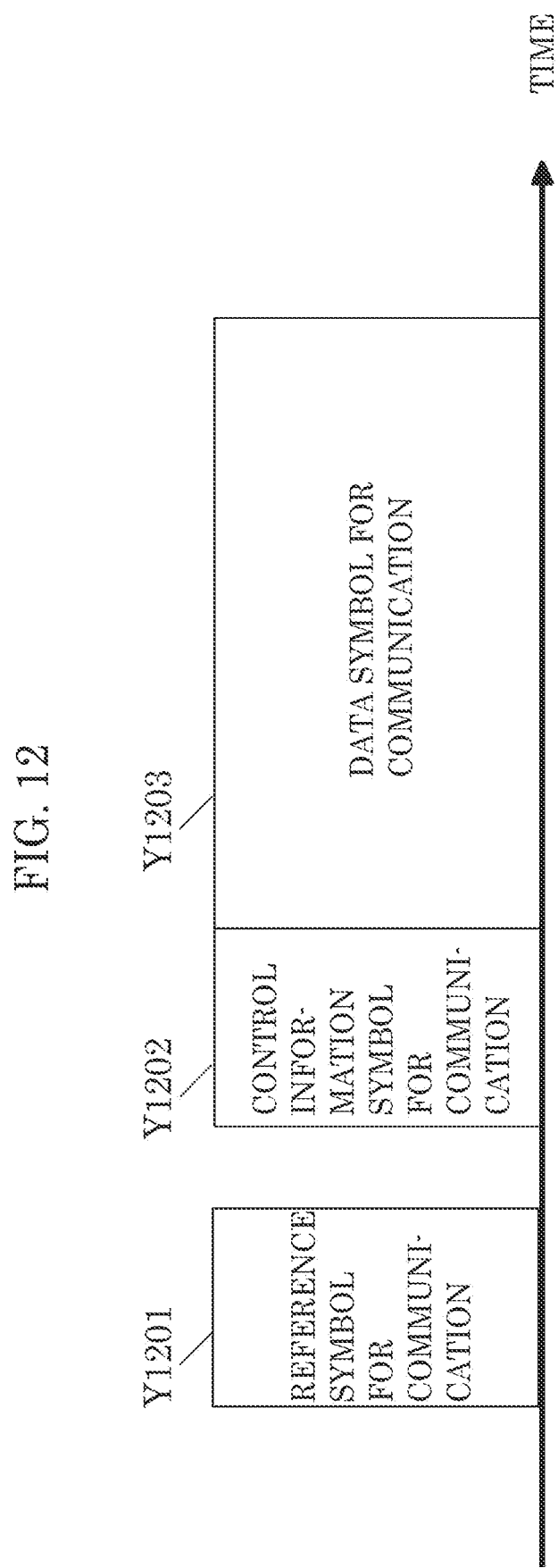
FIG. 12 illustrates one example of a configuration of a frame according to Embodiment 2.

FIG. 12 illustrates an example of a frame configuration used when terminal Y1103 and access point (AP) Y1104 transmit modulated signals for communication as illustrated in FIG. 11. In FIG. 12, time is represented on the horizontal axis.

Reference symbol for communication Y1201 is a symbol for a communication partner to perform signal detection, time synchronization, frequency synchronization, channel estimation, etc. Reference symbol for communication Y1201 may be control information or a media access control (MAC) frame required for a procedure to perform data communication.

Control information symbol for communication Y1202 is a symbol for notifying of the communication method or the like of data symbol for communication Y1203. Accordingly, control information symbol for communication Y1202 includes information such as information indicating the error correction coding method (information indicating coding rate, block length (code length), error correction code), information indicating the modulation method, information indicating the transmitting method (for example, information indicating whether single stream transmission or multi-stream transmission is used) (information indicating modulation and coding scheme (MCS)), information indicating data length, etc.

Data symbol for communication Y1203 is a symbol for transmitting data to a communication partner.

The frame configuration illustrated in FIG. 12 is merely one example; the frame configuration may include other symbols. A single carrier transmission method or a multi-carrier transmission method, such as orthogonal frequency division multiplexing (OFDM) may be used to transmit the frame illustrated in FIG. 12.

Reference symbol for communication Y1201 may include a region for transmitting data. The region for transmitting data may include data for identifying whether the transmission signal is transmitting a signal for communication or transmitting a signal for object detection.

Although the naming "reference symbol for communication" Y1201 is used, the naming of such a symbol is not limited to this example. Reference symbol for communication Y1201 may be referred to as a pilot symbol, training symbol, training field, preamble, control information symbol, mid-amble, etc.

Figure 13:
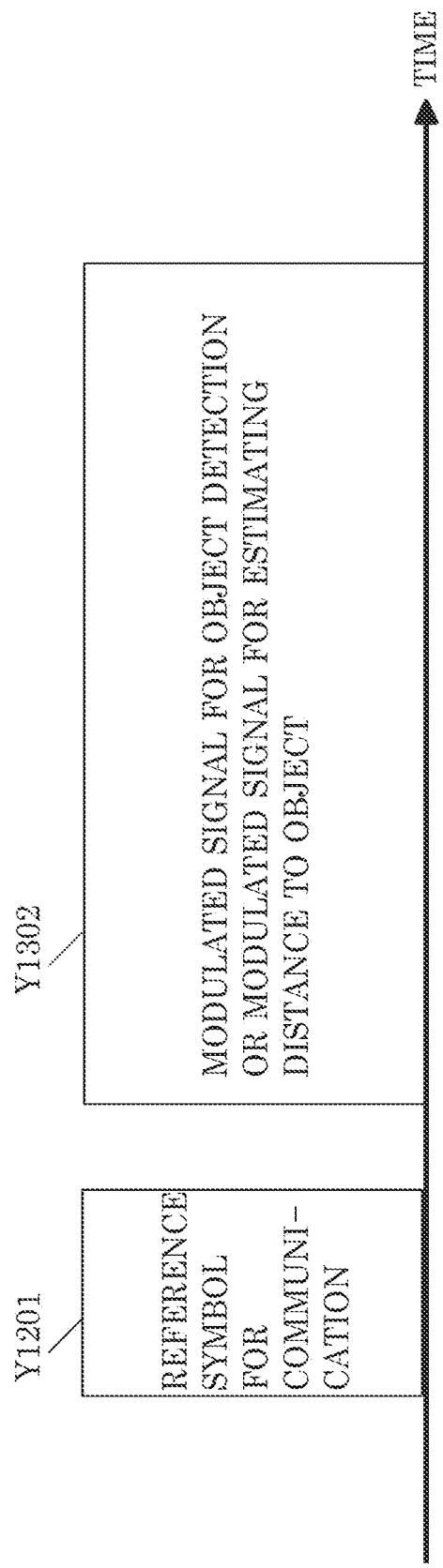
FIG. 13 illustrates one example of a configuration of a frame according to Embodiment 2.

FIG. 13 illustrates one example of a frame configuration of a modulated signal transmitted by apparatus Y1101. In FIG. 13, elements that operate the same as in FIG. 12 have the same reference signs, and as they have already been described above, repeated description will be omitted.

As described in Embodiment 1, based on information indicating to start operations for object detection or information indicating to start recording a still image or video included in control signal Y100, apparatus Y1101 first transmits reference symbol for communication Y1201.

Note that information indicating to start operations for object detection or information indicating to start recording a still image or video may be implemented by a user pressing a button included in apparatus Y1101, a user touching a touch panel included in apparatus Y1101, a user pressing a shutter button included in apparatus Y1101, or a user pressing a record start button included in apparatus Y1101.

Apparatus Y1101 then transmits "modulated signal for object detection or modulated signal for estimating distance to object" Y1302.

As a result of apparatus Y1101 transmitting a modulated signal like in FIG. 13, terminal Y1103 and AP Y1104 in FIG. 11 detect reference symbol for communication Y1201 illustrated in FIG. 13, whereby they know that a modulated signal is present in the first frequency band. Accordingly, when terminal Y1103 and AP Y1104 detect reference symbol for communication Y1201, they temporarily suspend modulated signal transmission. When terminal Y1103 and AP Y1104 cease to detect reference symbol for communication Y1201, they can resume modulated signal transmission.

By implementing the above, a situation in which a modulated signal transmitted by apparatus Y1101 and a modulated signal transmitted by terminal Y1103 or AP Y1104 interfere with one another can be inhibited from occurring, which makes it possible to achieve the advantageous effects of an improvement in data reception quality in communication between terminal Y1103 and AP Y1104 and an improvement in accuracy of distance estimation and object recognition performed by apparatus Y1101.

The frame configuration illustrated in FIG. 13 is merely one example; the frame configuration may include other modulated signals.

Hereinafter, a sensing method that uses radio waves will be described by way of examples. An apparatus that implements the sensing method that uses radio waves to be described in the following embodiment may use the sensing method in combination with processing that uses sensing data obtained from a sensor having an image capturing function such as a camera as described in Embodiments 1 and 2. Conversely, an apparatus that implements the sensing method that uses radio waves to be described in the following embodiment need not use the sensing method in combination with processing that uses sensing data obtained from a sensor having an image capturing function such as a camera.

As used herein, implementation of a sensing method that uses radio waves without being combined with processing that uses sensing data obtained from a sensor having an image capturing function such as a camera does not refer only to a case in which an apparatus that does not include a camera performs sensing using radio waves. For example, an apparatus that includes a camera, such as a smartphone, may capture an image or perform sensing for distance measuring using one or more cameras, and may separately perform sensing that uses radio waves using, for example, a wireless communication unit or wireless communication radar. In order for an apparatus that includes a camera, such as a smartphone, to control the capturing of an image or the performing of sensing for distance measuring using one or more cameras, the apparatus may refrain from using the sensing result of the sensing that uses radio waves using, for example, a wireless communication unit or wireless communication radar, and in order for the apparatus to control the sensing that uses radio waves using, for example, a wireless communication unit or wireless communication radar, the apparatus may refrain from using the sensing result of the capturing of an image or the performing of sensing for distance measuring using one or more cameras, and on the other hand, the apparatus may use a combination of both sensing results in a single application.

Embodiment 3

In the present embodiment, for example, a system includes one or more of an apparatus that performs communication, an apparatus that performs sensing, and an apparatus that performs communication and sensing. First, configurations of, for example, an apparatus that performs sensing and an apparatus that performs communication and sensing will be described.

Figure 14:
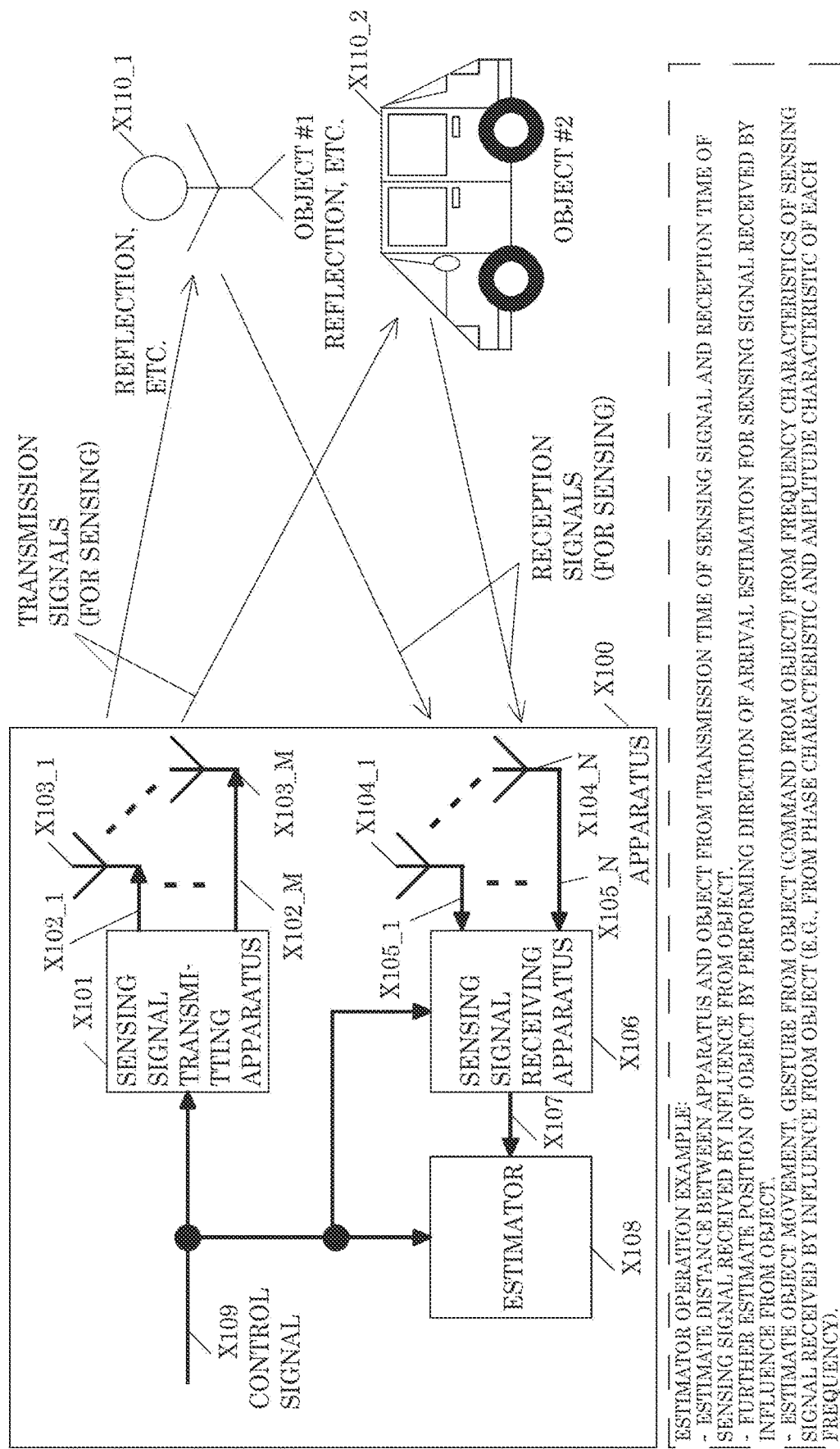
FIG. 14 illustrates one example of a configuration of an apparatus according to Embodiment 3.

FIG. 14 illustrates one example of a configuration of apparatus X100 that performs sensing that transmits a signal for sensing and receives a signal for sensing that has reflected off an object in the surrounding area and returned.

Transmitting apparatus X101 generates transmission signals X102_1 through X102_M as signals for sensing, and transmits transmission signals X102_1 through X102_M from antennas X103_1 through X103_M, respectively. In this example, the number of antennas used for transmission is M, where M is an integer that is greater than or equal to 1 or greater than or equal to 2.

For example, transmitting apparatus X101 may generate transmission signals X102_1 through X102_M by multiplying the same sensing signal by coefficients determined for each antenna, and transmit transmission signals X102_1 through X102_M from antennas X103_1 through X103_M to perform directionality control for the sensing signals. Moreover, for example, transmitting apparatus X101 may generate transmission signals X102_1 through X102_M by multiplying a plurality of sensing signals with coefficients determined for each of the sensing signals and each of the antennas, and combining them, and transmit the generated transmission signals X102_1 through X102_M from antennas X103_1 through X103_M. This makes it possible to perform directionality control for each sensing signal. Coefficients determined for each antenna or coefficients determined for each sensing signal and each antenna are expressed as complex numbers or integers. Depending on the value of the coefficient, the amplitude and/or phase of the sensing signal transmitted from each antenna differs. However, the coefficient may be 1, and in this case, a sensing signal generated by transmitting apparatus X101 is transmitted as-is from the antenna whose coefficient value is 1.

Note that transmitting apparatus X101 may transmit transmission signals without performing directionality control. For example, transmission signals of antennas corresponding to each of the plurality of sensing signals may be output by transmitting apparatus X101 as-is from antennas X103_1 through X103_M. Although there are a plurality of sensing signals and a plurality of antennas in the above example, the number of sensing signals generated by transmitting apparatus X101 and the number of antennas that transmit sensing signals may be one.

Sensing signals transmitted from antennas X103_1 through X103_M are reflected off object #1 X110_1 and object #2 X110_2, and the reflected sensing signals are received by antennas X104_1 through X104_N included in apparatus X100. In this example, the number of antennas that receive sensing signals is N, where N is an integer that is greater than or equal to 1 or greater than or equal to 2. The number of antennas used for transmission, M, may be the same as or different than the number of antennas used for reception, N.

Reception signals X105_1 through X105_N received by antennas X104_1 through X104_N are input into receiving apparatus X106. For example, receiving apparatus X106 implements, on reception signals X105_1 through X105_N, filter processing of extracting only a frequency range or channel components in a frequency range in which the sensing signals are transmitted, frequency conversion processing of conversion from a wireless communication frequency band to an intermediate frequency band (IF band) or frequency band of a baseband signal, and/or weighting synthesis processing on N reception signals, and outputs estimation signal X107.

Coefficients used in the weighting synthesis performed on the N reception signals can be set for each of reception signals X105_1 through X105_N, and reception directionality control can be performed by changing the coefficient values. The coefficients may be estimated in advance, and, alternatively, using reception signals X105_1 through X105_N, the coefficients may be set so as yield an amplitude or signal-to-noise power ratio (SNR) of weighting-synthesized sensing signal components that are larger than when a different coefficient is used, or set so as to exceed a predetermined threshold. Moreover, by using a plurality of groups of N coefficients corresponding to reception signals X105_1 through X105_N, receiving apparatus X106 may simultaneously obtain signals having a directionality that corresponds to each group of coefficients. However, it is possible to carry out the above without performing weighting synthesis.

Estimator X108 performs estimation processing related to the sensing environment, i.e., the surrounding environment, using estimation signal X107. The estimation processing performed by estimator X108 will be described in greater detail later.

Control signal X109 is input into transmitting apparatus X101, receiving apparatus X106, and estimator X108, and instructs transmitting apparatus X101, receiving apparatus X106, and estimator X108 in regard to the implementation of sensing, control of the sensing area, and control of sensing timing.

This concludes the description related to one example of a configuration of apparatus X100 according to the present embodiment.

Although FIG. 14 illustrates an example in which signals generated by apparatus X100 are transmitted from M antennas and signals received by N antennas are signal processed by receiving apparatus X106, the configuration of an apparatus that implements the sensing method described in the present embodiment is not limited to this example.

For example, a transmit antenna unit for transmitting signals may be configured of a plurality of antenna units each of which includes a plurality of antennas. Here, the plurality of antenna units may have the same directionality and directionality control function, and, alternatively, the range in which directionality control can be performed may differ from antenna unit to antenna unit. In such cases, a single transmitting apparatus X101 may be configured to select, from among the plurality of antenna units, an antenna unit for transmitting sensing signals, and, alternatively, sensing signals may be transmitted simultaneously from the plurality of antenna units. Moreover, transmitting apparatus X101 may be configured to switch between transmitting a single sensing signal from a single antenna unit and transmitting sensing signals simultaneously from a plurality of antenna units. Moreover, apparatus X100 may include a plurality of transmitting apparatuses X101, and may include a transmitting apparatus X101 for each antenna unit.

Reception signals X105_1 through X105_N received by antennas X104_1 through X104_N are input into receiving apparatus X106. For example, receiving apparatus X106 implements, on reception signals X105_1 through X105_N, filter processing of extracting only a frequency range or channel components in a frequency range in which sensing signals are transmitted, frequency conversion processing of conversion from a wireless communication frequency band to an intermediate frequency band (IF band) or frequency band of a baseband signal, and/or weighting synthesis processing on N reception signals, and outputs estimation signal X107.

Coefficients used in the weighting synthesis performed on the N reception signals can be set for each of reception signals X105_1 through X105_N, and reception directionality control can be performed by changing the coefficient values. Coefficients may be estimated in advance, and, alternatively, using reception signals X105_1 through X105_N, coefficients may be set so as yield an amplitude or SNR of weighting-synthesized sensing signal components that are larger than when a different coefficient is used, or set so as to exceed a predetermined threshold. Moreover, by using a plurality of groups of N coefficients corresponding to reception signals X105_1 through X105_N, receiving apparatus X106 may simultaneously obtain signals having a directionality that corresponds to each group of coefficients. However, it is possible to carry out the above without performing weighting synthesis.

Estimator X108 performs estimation processing related to the sensing environment, i.e., the surrounding environment, using estimation signal X107. The estimation processing performed by estimator X108 will be described in greater detail later.

Control signal X109 is input into transmitting apparatus X101, receiving apparatus X106, and estimator X108, and instructs transmitting apparatus X101, receiving apparatus X106, and estimator X108 in regard to the implementation of sensing, control of the sensing area, and control of sensing timing.

This concludes the description related to one example of a configuration of apparatus X100 according to the present embodiment.

Although FIG. 14 illustrates an example in which signals generated by apparatus X100 are transmitted from M antennas and signals received by N antennas are signal processed by receiving apparatus X106, the configuration of an apparatus that implements the sensing method described in the present embodiment is not limited to this example.

For example, a transmit antenna unit for transmitting signals may be configured of a plurality of antenna units each of which includes a plurality of antennas. Here, the plurality of antenna units may have the same directionality and directionality control function, and, alternatively, the range in which directionality control can be performed may differ from antenna unit to antenna unit. In such cases, a single transmitting apparatus X101 may be configured to select, from among the plurality of antenna units, an antenna unit for transmitting sensing signals, and, alternatively, sensing signals may be transmitted simultaneously from the plurality of antenna units. Moreover, transmitting apparatus X101 may be configured to switch between transmitting a single sensing signal from a single antenna unit and transmitting sensing signals simultaneously from a plurality of antenna units. Moreover, apparatus X100 may include a plurality of transmitting apparatuses X101, and may include a transmitting apparatus X101 for each antenna unit.

Similarly, a receive antenna unit transmitting signals may be configured of a plurality of antenna units each of which includes a plurality of antennas. Here, the plurality of antenna units may have the same directionality control capabilities such as directionality control range and directionality control accuracy, and, alternatively, directionality control capabilities may differ from antenna unit to antenna unit. Moreover, the plurality of antenna units may be disposed so as to have the same directionality control capabilities such as directionality control range and directionality control accuracy, but so that the spatial area in which directionality control can be performed differs. Here, a configuration in which a single receiving apparatus X106 selects and uses an antenna unit for obtaining reception signals from among a plurality of antenna units may be implemented, and, alternatively, a configuration in which signals received from a plurality of antenna units are signal processed simultaneously may be implemented. Moreover, receiving apparatus X106 may be configured to switch between whether to signal process only a reception signal received from a single antenna unit or whether to simultaneously signal process reception signals received from a plurality of antenna units. Moreover, apparatus X100 may include a plurality of receiving apparatus X106, and may include a receiving apparatus X106 for each antenna unit.

Apparatus X100 may include a plurality of antennas that can be used for both transmission and reception of signals, rather than a plurality of transmit antennas and a plurality of receive antennas. In such cases, apparatus X100 may be capable of selectively switching each antenna between transmission use and reception use, and may switch a plurality of antennas between transmission use and reception use over time.

Apparatus X100 may include a transmission and reception antenna unit that can be used commonly for both signal transmission and reception. Here, the transmission and reception antenna unit may include a plurality of antenna units, and each antenna unit may be switched between transmission use and a reception use. Apparatus X100 may include a selector that selects and switches antenna units to be used to transmit a signal generated by transmitting apparatus X101 and antenna units to be used to receive a signal applied with signal processing by receiving apparatus X106.

Note that when sensing signals are transmitting simultaneously using a plurality of antenna units, the directionalities of the signals transmitted from each antenna unit may be the same and, alternatively, may be different. When apparatus X100 transmits sensing signals using the same directionality from a plurality of antenna units, there is a possibility that the distance that the sensing signals can reach or the distance to a reflection point at which the reflected sensing signals are receivable can be increased.

Note that the number of antennas included in the antenna unit in the above description may be the same across all antenna units and may differ from antenna unit to antenna unit.

Next, the estimation processing performed by estimator X108 will be described by way of example.

For example, estimator X108 estimates the distance between the apparatus it is included in (hereinafter also referred to as a host apparatus) and an object that reflected a sensing signal. The estimation of the distance between the host apparatus and an object that reflected a sensing signal can be calculated by, for example, detecting an amount of delay between the time of transmission and time of reception of the sensing signal, and multiplying the amount of delay by a propagation speed of electromagnetic waves. Estimator X108 may estimate the direction of arrival of a reception signal, that is to say, the direction in which an object that reflected a sensing signal is present, using a direction of arrival estimation method such as multiple signal classification (MUSIC). In addition to the distance between the host apparatus and an object, estimator X108 is capable of estimating the position of an object that reflected a transmitted signal by estimating the direction. Estimator X108 is capable of estimating the position of an object by triangulation using, for example, a direction of arrival estimation method such as MUSIC, the position of the transmit antenna, the position of the receive antenna, and the direction of transmission directionality control. Using the reception signal, estimator X108 may detect, for example, the object, movement of the object, material properties of the object, etc.

The position of the object may be expressed using a polar coordinate system, and may be expressed using a three-dimensional Cartesian coordinate system. The origin of the coordinate system may be, for example, an arbitrary position in apparatus X100, and the axes in the coordinate system may be oriented arbitrarily. When a device including apparatus X100 includes a plurality of wireless communication sensors or other distance sensors having the same or different configuration as apparatus X100 in addition to apparatus X100, the origin and axes of the coordinate system of the data obtained by each sensor may be the same across all sensors and may be unique to each sensor. Estimator X108 may output position information expressed in the unique coordinate system described above as-is, and, alternatively, may convert the coordinate system to the coordinate system used in common by all devices. The converted coordinate system may be a coordinate system unique to the devices, and, alternatively, may be a common coordinate system used by other devices such as a coordinate system used by three-dimensional map data used by a device.

Estimator X108 may estimate, in each of a plurality of directions, distance to an object that reflected a signal, and obtain three-dimensional coordinates for the plurality of estimated reflection positions as a point cloud. The data format of the plurality of distance measuring results obtained by estimator X108 need not be a point cloud format including three-dimensional coordinate values, and may be, for example, a distance image or some other format. When a distance image format is used, a position (the coordinates) in a two-dimensional plane in the distance image corresponds to the direction of arrival of the reception signal from the perspective of the host apparatus, and distances to an object in directions corresponding to each pixel position in the image are stored as pixel sample values.

Estimator X108 may further perform recognition processing such as estimating the shape of the object using the above-described point cloud data or distance image data. For example, estimator X108 can estimate the shape of the object based on one or more close points that are distanced within a predetermined range, or by extracting a plurality of points or image regions determined to be of the same object, and estimating the shape of the object based on the one point, the positional relationship of the plurality of points, or the shapes of the image regions. Estimator X108 may perform identification of the sensed object as the recognition processing that uses the result of the estimation of the shape of the object. In such cases, estimator X108 may identify whether the object in the sensing range is a person or some other animal, and may perform identification that classifies the object. Note that the recognition processing performed by estimator X108 may be processing performed for purposes other than object identification. For example, as the recognition processing, estimator X108 may detect the number of people or number of vehicles, etc., in the sensing range, and, for example, may estimate the position or orientation of the face of a detected person. As an example of recognition processing that differs from the above-described recognition processing, estimator X108 may perform processing such as face authentication that determines whether the shape of a detected person's face matches a person registered in advance, or determines who the detected person is.

Estimator X108 may measure the distance between the host apparatus and an object a plurality of times at different points in time, and obtain a temporal change in the distance between the host apparatus and the object or a temporal change in the position of a detected point. In such cases, estimator X108 may estimate the speed or acceleration or the like of a moving object, as recognition processing that uses temporal change in the distance between the host apparatus and the object or a temporal change in the position of a detected point. For example, estimator X108 may estimate the speed or direction of movement of a vehicle driving in the sensing range. Note that recognition processing that is performed by estimator X108 using the temporal change in distance or position of a detected point may be used for the purpose of something other than estimation of the speed or acceleration or the like of the object. For example, by estimator X108 detecting whether a detected person performed a specific action based on change in posture of the person, apparatus X100 may be used as a gesture input device for an electronic device such as a smartphone, tablet, or personal computer.

The above-described estimation of the speed of a moving object may be derived by comparing the frequency of the transmitted sensing signal to the frequency of the received reflected signal, and estimating a change in frequency caused by the Doppler effect on the reflected signal.

Next, the sensing signal used by transmitting apparatus X101 and receiving apparatus X106 will be described by way of example.

Apparatus X100 may transmit the pulse signal disclosed in S. Schuster, S. Scheiblhofer, R. Feger, and A. Stelzer, "Signal model and statistical analysis for the sequential sampling pulse radar technique," in Proc. IEEE Radar Conf, 2008, pp. 1-6, 2008 and D. Cao, T. Li, P. Kang, H. Liu, S. Zhou, H. Su, "Single-Pulse Multi-Beams Operation of Phased Array Radar", 2016 CIE International Conference on Radar (RADAR), pp. 1-4, 2016 as the signal for sensing. Apparatus X100 transmits the pulse signal in a frequency range used for sensing, and measures the distance to an object that reflected the sensing signal based on the amount of delay between the transmission time of the pulse signal and the reception time of the reflected signal.

As another example of the signal for sensing, apparatus X100 may use a signal conforming to a frequency modulated continuous wave (FMCW) scheme or a phase modulated continuous wave (PMCW) scheme disclosed in A. Bourdoux, K. Parashar, and M. Bauduin, "Phenomenology of mutual interference of FMCW and PMCW automotive radars," in 2017 IEEE Radar Conference (Radar Conf.), pp. 1709-1714, 2017. A FMCW signal is a signal obtained by converting a chirp signal in which the frequency changes with time, to a wireless communication frequency. As estimation processing that uses a FMCW signal, estimator X108 superimposes a signal transmitted from apparatus X100 and a signal received by receiving apparatus X106 using a mixer. As a result, the superimposed signal becomes a signal having an intermediate frequency relative to the frequency of the reception signal, which is dependent on the time of flight of the reception signal, and as such, distance to the object that reflected the FMCW signal is measured by detecting a frequency component included in the superimposed signal.

As another example of the signal for sensing, apparatus X100 may use a signal obtained by frequency converting a modulated signal having a predetermined frequency to a signal of a frequency range used in sensing. In such cases, estimator X108 can, for example, estimate the distance to an object that reflected a signal for sensing, based on a difference between the phase of the modulation component of the signal transmitted from apparatus X100 and the phase of the modulation component of the signal received by receiving apparatus X106. Moreover, estimator X108 may detect variations in frequency caused by the Doppler effect up until the sensing signal is received after being reflected and estimating the movement speed and direction of a moving object by comparing the frequency of the transmitted modulated signal and the frequency of the received modulated signal. Note that there may be a plurality of frequency components included in the modulated signal, and for example, an OFDM signal including a plurality of frequency components may be used as the modulated signal disclosed in J. Fink, F. K. Jondral, "Comparison of OFDM radar and chirp sequence radar," in 2015 16th International Radar Symposium (IRS), pp. 315-320, 2015.

Note that examples of the signal for sensing are not limited to the above examples. The signal for sensing may be a signal modulated using a modulation method, may be an unmodulated carrier, or some other signal.

As described above, apparatus X100 may simultaneously transmit a plurality of sensing signals using a plurality of antennas, and may simultaneously transmit a plurality of sensing signals using a plurality of antenna units each of which includes a plurality of antennas.

The present embodiment describes an example in which distance is measured from the difference between the transmission time of the sensing signal and the reception time of the reflected signal, as the estimation processing performed by estimator X108. However, the estimation processing performed by estimator X108 is not limited to the above example. For example, estimator X108 may estimate a transmission path state from the received reflected signal, and perform recognition processing based on a temporal change in estimated transmission path state, an average value of past estimated transmission path states, or comparison with a feature amount, to determine whether an object is present in the sensing range or detect the presence or absence of movement of an object. Moreover, estimator X108 may detect, for example, the presence or absence of rainfall based on an attenuation status of the reception signal.

The present embodiment also described an example in which reflected waves of a transmitted sensing signal are used in sensing. However, performing sensing using a sensing signal is not limited to the apparatus that transmits the sensing signal. For example, receiving apparatus X106 included in apparatus X100 may receive a sensing signal transmitted from another apparatus, and estimator X108 may determine whether the other apparatus is in a range in which the sensing signal will reach based on the reception signal, and estimate the direction in which the other apparatus is present. Estimator X108 may also estimate the distance to the other apparatus based on the signal strength of the received sensing signal. Moreover, transmitting apparatus X101 included in apparatus X100 may transmit a sensing signal so that another apparatus can use it in performing sensing. The sensing signal transmitted in such cases may be a sensing signal transmitted for sensing by the host apparatus using reflected waves and may be a sensing signal cyclically transmitted for use in sensing by another apparatus. When apparatus X100 receives a sensing signal transmitted from another apparatus, apparatus X100 may use transmitting apparatus X101 to transmit a sensing signal in the direction in which the reception signal was received. Note that the sensing signal transmitted to another apparatus may be transmitted without performing directionality control.

Although FIG. 14 illustrates an example in which apparatus X100 that performs sensing receives signals reflected off object #1 and object #2, signals obtained after reflecting off object #1 and object #2 and further reflecting off some other object(s) or matter may be obtained by apparatus X100 that performs sensing and object detection may be performed, distance to the object may be estimated, and the position of the object may be estimated, etc.

Next, an example of a sensing method that uses radio waves that differs from the example illustrated in FIG. 14 will be given.

Figure 15:
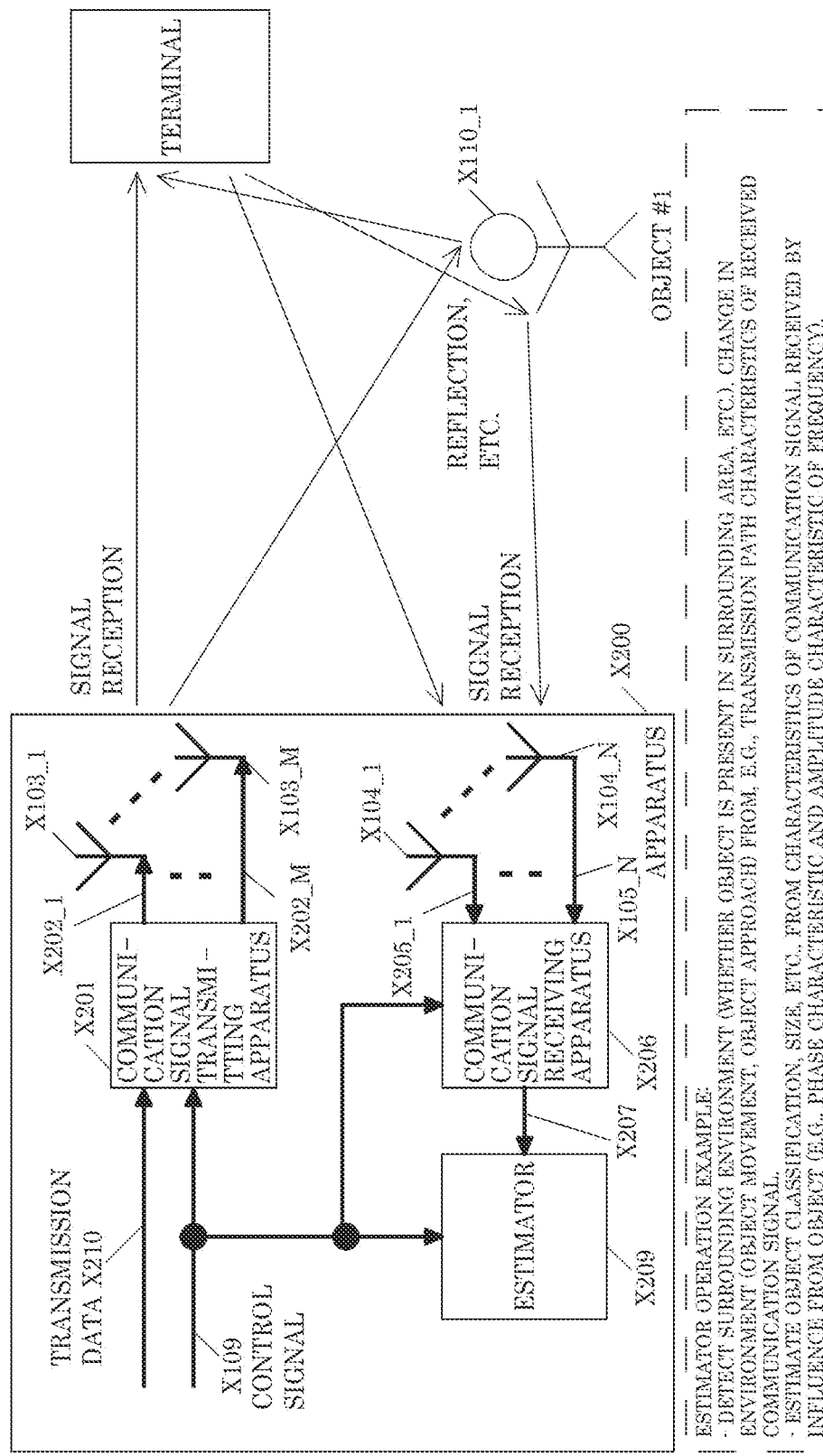
FIG. 15 illustrates one example of a configuration of the apparatus according to Embodiment 3.

FIG. 15 illustrates one example of a configuration of apparatus X200 that performs sensing using, for example, radio waves. Elements in FIG. 15 that have the same function as in FIG. 14 have the same reference signs, and detailed description thereof will be omitted.

Apparatus X200 differs from apparatus X100 in that apparatus X200 performs sensing using a modulated signal for sensing and/or a modulated signal for communication. One feature is that, for example, apparatus X200 transmits a signal, and as a result of a terminal, which is a communication partner, observing changes in the signal transmitted by apparatus X200, estimates the position of, size of, and distance to an object (for example, object #1 in FIG. 15). Note that when apparatus X200 is transmitting a modulated signal for communication, data communication with the terminal is also possible. Hereinafter, a case in which sensing is performed using a modulated signal for communication will be described.

Transmitting apparatus X201 receives inputs of control signal X109 and transmission data X210, and generates transmission signals for communication X202_1 through X202_M by implementing error correction coding processing, modulation processing, precoding, multiplexing processing, etc. Apparatus X200 respectively transmits transmission signals X202_1 through X202_M from antennas X103_1 through X103_M.

The number of transmission signals and the number of antennas used to transmit the transmission signals is the same as described with reference to FIG. 14, that is to say, may be two or more and, alternatively, may be one. The example in FIG. 15 differs from the example in FIG. 14 in that while the transmission signal in FIG. 14 includes a sensing signal component, the transmission signal in FIG. 15 includes a component of a signal of modulated transmission data, but the aspect that directionality control can be performed using coefficients used by transmitting apparatus X201 in weighting synthesis processing for generating the transmission signal is the same as with the example illustrated in FIG. 14. Moreover, just like apparatus X100, apparatus X200 may include a single antenna unit that includes a plurality of antennas, and, alternatively, may include a plurality of antenna units.

Note that when directionality control is performed, transmitting apparatus X101 described with reference to FIG. 14 performs transmission directionality control in the direction in which sensing is to be performed, but transmitting apparatus X201 in FIG. 15 performs transmission directionality control to improve communication quality with the terminal that is the communication partner. However, transmitting apparatus X201 may perform transmission signal directionality control toward the direction in which sensing is to be performed, and the terminal that is the communication partner may use the signal transmitted by apparatus X200 to perform sensing and further perform directionality control so as to achieve a desired sensing result. When transmitting apparatus X201 performs directionality control for sensing to be performed by the terminal, transmitting apparatus X201 transmits a signal using a coefficient specified by the terminal. The signal transmitted in such cases may include a signal component modulated using transmission data, and, alternatively, need not include a signal component modulated using transmission data. A signal that does not include a signal component modulated using transmission data is, for example, a signal modulated using a value known by the terminal such as a preamble or reference signal. Moreover, transmitting apparatus X201 may use different directionality control when transmitting a signal including a signal component modulated using transmission data and when transmitting a signal that does not include a signal component modulated using transmission data.

Note that the terminal both obtains data and performs sensing by receiving the modulated signal transmitted by apparatus X200.

Moreover, the terminal transmits a signal, and by apparatus X200, which is the communication partner, observing changes in the signal transmitted by the terminal, apparatus X200 may estimate, for example, the position of, size of, distance to, classification of, and material property of an object (for example, object #1 in FIG. 15). Note that when the terminal is transmitting a modulated signal for communication, data communication with apparatus X200 is also possible.

For example, apparatus X200 receives modulated signals transmitted by terminal using antennas X104_1 through X104_N. Receiving apparatus X206 receives control signal X109 and reception signals X205_1 through X205_N as inputs, and obtains reception data by performing demodulation processing and error correction decoding processing, etc. Receiving apparatus X206 outputs, as estimation signal X207, transmission path characteristics and the like obtained via the reception processing.

Coefficients used in the weighting synthesis performed on the N reception signals can be set for each of reception signals X105_1 through X105_N, and reception directionality control can be performed by changing the coefficient values. The coefficients may be estimated in advance, and, alternatively, using reception signals X105_1 through X105_N, the coefficients may be set so as yield an amplitude or SNR of weighting-synthesized sensing signal components that are larger than when a different coefficient is used, or set so as to exceed a predetermined threshold. Moreover, by using a plurality of groups of N coefficients corresponding to reception signals X105_1 through X105_N, receiving apparatus X206 may simultaneously obtain signals having a directionality that corresponds to each group of coefficients.

Estimator X208 receives inputs of control signal X109 and estimation signal X207, and performs estimation processing using estimation signal X207. Estimator X208 estimates the surrounding environment, such as whether an object is present or not in the surrounding area, based on, for example, transmission path characteristics included in estimation signal X207. Estimator X208 may detect the movement of an object or the approach of an object or the like based on change in the transmission path characteristics with time. Estimator X208 may estimate the direction of arrival of a reception signal, that is to say, estimate the direction in which an object that reflected the sensing signal is present using a direction of arrival estimation method such as MUSIC. Estimator X208 may estimate the position of an object by performing triangulation using a direction of arrival estimation method such as MUSIC, antenna position (for example, the position of the transmitting apparatus and the position of the receiving apparatus), and the direction of the transmission directionality control. Using the reception signal, estimator X208 may detect, for example, the object, movement of the object, material properties of the object, etc.

Estimator X208 implements the above-described estimation processing by implementing, on estimation signal X207, signal processing in accordance with what is to be detected, such as the presence or absence of the above-described object or the presence or absence of movement of the object. Here, the estimation processing is performed based on a determination result of whether a feature amount extracted via the signal processing exceeds a predetermined threshold or not. The estimation processing may be performed based on signal processing other than the signal processing described in the above example. For example, the estimation processing may be performed using a model created via machine learning using a multi-layer neural network. When a model created via machine learning using a multi-layer neural network is used in the estimation processing, estimator X208 may perform predetermined preprocessing on estimation signal X207, and the preprocessed data may be input into the model created via machine learning using a multi-layer neural network. Moreover, estimator X208 may use information such as the frequency range or channel number in the frequency range that is used for communication. Moreover, estimator X208 may use the address of the communication apparatus that transmitted the reception signal for communication or the address of the communication apparatus that is a destination of the signal. In this way, by using information related to the reception signal for communication, such as the frequency range or the address of the communication apparatus, it is possible to compare positions of communication apparatuses that transmitted the signals or signals for communication having the same or similar conditions in regard to, for example, the directionality used when transmitting the signals, and thus there is a possibility that estimation accuracy can be improved.

The above described a case in which sensing is performed using a signal for communication transmitted by a communication partner. Although FIG. 15 illustrates an example in which, in apparatus X200, the configuration for implementing transmission processing, i.e., transmitting apparatus X201 and antennas X103_1 through X103_M differs from the configuration for implementing reception processing, i.e., receiving apparatus X206 and antennas X104_1 through X104_N, the configuration of apparatus X200 is not limited to this example. For example, transmitting apparatus X201 and receiving apparatus X206 may be implemented as a single element, and a plurality of antennas may be used for both transmission and reception. Moreover, just like with the description made with reference to FIG. 14, the plurality of antennas for transmission in apparatus X200 may be configured of a plurality of antenna units, and the plurality of antennas for reception in apparatus X200 may be configured of a plurality of antenna units. Moreover, the plurality of antennas for transmission and the plurality of antennas for reception may be configured as a transmission and reception antenna unit.

Moreover, a signal for sensing may be used instead of a signal for communication. In other words, a first apparatus may use a signal for sensing transmitted by another apparatus to estimate, for example, the position of, size of, distance to, classification of, and material property of an object (for example, object #1 in FIG. 15).

The sensing method that uses a signal for communication may also be used for the same purpose as the example described with reference to FIG. 14 in which a sensing signal is transmitted to another apparatus. In other words, apparatus X200 may use a signal for communication transmitted from another apparatus such as a terminal for not only sensing the surrounding environment from transmission path characteristics and the like of the signal, but for determining whether the other apparatus is in a range in which the signal for communication will reach or estimating the direction in which the other apparatus is present as well.

Note that apparatus X200 may perform only demodulation operations without performing sensing operations when receiving a modulated signal for communication transmitted by a, for example, terminal that is a communication partner.

Next, the apparatus that performs communication and sensing will be described.

Figure 16:
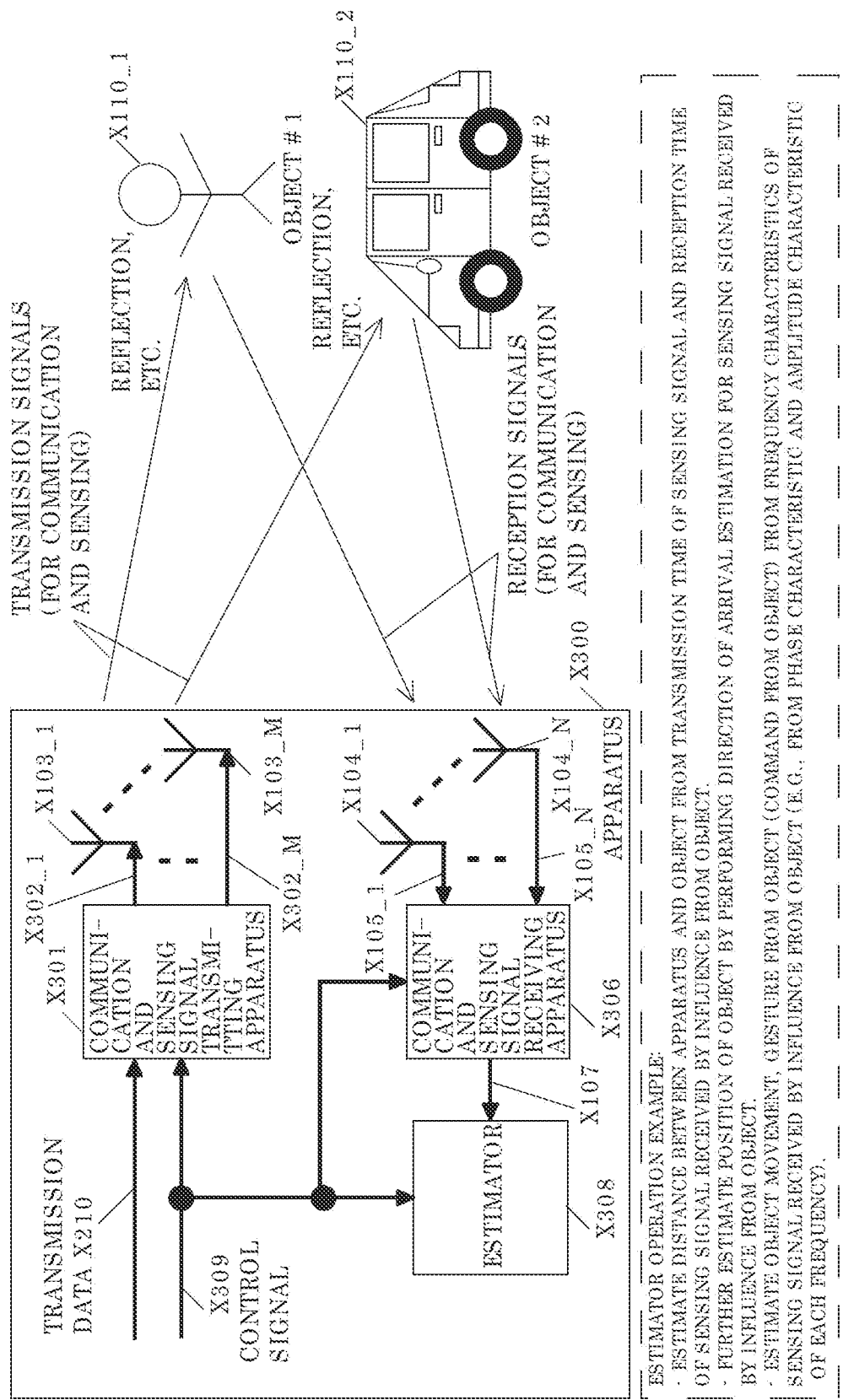
FIG. 16 illustrates one example of a configuration of the apparatus according to Embodiment 3.

FIG. 16 illustrates one example of a configuration of an apparatus that performs communication and sensing. Elements in FIG. 16 that have the same function as in FIG. 14 and FIG. 15 have the same reference signs, and detailed description thereof will be omitted.

Apparatus X300 both performs sensing using a modulated signal for sensing and sensing using a modulated signal for communication. Accordingly, transmitting apparatus X301 included in X300 includes a function for transmitting a signal for sensing, just like transmitting apparatus X101, and a function for transmitting a signal for communication to another communication apparatus, just like transmitting apparatus X201. Moreover, receiving apparatus X306 included in apparatus X300 includes a function for receiving a signal for sensing, just like receiving apparatus X106, and a function for receiving a signal for communication transmitted by another communication apparatus, just like receiving apparatus X206. Moreover, estimator X308 performs both estimation processing that uses a signal for sensing, just like estimator X108, and estimation processing that uses a signal for communication, just like estimator X208.

When transmitting and/or receiving signals for sensing, processes performed by each element included in apparatus X300 are the same as apparatus X100 illustrated in FIG. 14, and when transmitting and/or receiving signals for communication, processes performed by each element included in apparatus X300 are the same as apparatus X200 illustrated in FIG. 15.

Although FIG. 16 illustrates an example in which, in apparatus X300, the configuration for implementing transmission processing, i.e., transmitting apparatus X301 and antennas X103_1 through X103_M differs from the configuration for implementing reception processing, i.e., receiving apparatus X306 and antennas X104_1 through X104_N, the configuration of apparatus X300 is not limited to this example. For example, transmitting apparatus X301 and receiving apparatus X306 may be implemented as a single element, and one or more or a plurality of antennas may be used for both transmission and reception.

Moreover, apparatus X300 may include a transmitting apparatus for sensing that is separate from a transmitting apparatus for communication. In such cases, the transmitting apparatus for communication and the transmitting apparatus for sensing may switchedly use the same one or more or a plurality of antennas, and, alternatively, may include one or more or a plurality of dedicated communication antennas and one or more or a plurality of dedicated sensing antennas.

Note that transmitting apparatus X301 that transmits both signals for communication and signals for sensing may switch between transmitting a signal for sensing and transmitting a modulated signal for communication based on mode information included in control signal X309 and transmit the signals from an antenna, that is to say, may include a mode for transmitting signals for sensing and a mode for transmitting modulated signals for communication. Moreover, transmitting apparatus X301 that transmits both signals for communication and signals for sensing may transmit a signal that is a combination of a signal for sensing and a modulated signal for communication.

Moreover, apparatus X300 may include a receiving apparatus for sensing that is separate from a receiving apparatus for communication. In such cases, the receiving apparatus for communication and the receiving apparatus for sensing may switchedly use the same one or more or a plurality of antennas, and, alternatively, may include one or more or a plurality of dedicated communication antennas and one or more or a plurality of dedicated sensing antennas. Moreover, apparatus X300 may include a transmitting apparatus for communication, a transmitting apparatus for sensing, a receiving apparatus for communication and a receiving apparatus for sensing that are separate from one another. Moreover, apparatus X300 may include a transceiver apparatus for communication and a transceiver apparatus for sensing. Moreover, apparatus X300 may include a transceiver apparatus for communication, a transmitting apparatus for sensing, and a receiving apparatus for sensing.

In the present embodiment as well, just as described with reference to FIG. 14 and FIG. 15, one or more or a plurality of transmit antennas may be configured of one or more or a plurality of antenna units, and one or more or a plurality of receive antennas may be configured of one or more or a plurality of antenna units. Moreover, one or more or a plurality of transmit antennas and one or more or a plurality of receive antennas may be configured as a common transmission and reception antenna unit.

Using the above-described apparatus configuration makes it possible to implement embodiments to be described hereinafter, which in turn makes it possible to achieve the advantageous effects described in each embodiment. Hereinafter, implementation methods will be described in more detail by way of examples.

Embodiment 4

The present embodiment will give one example of a sensing method used when sensing is performed by an access point (AP) or terminal having a wireless communication function.

Figure 17:
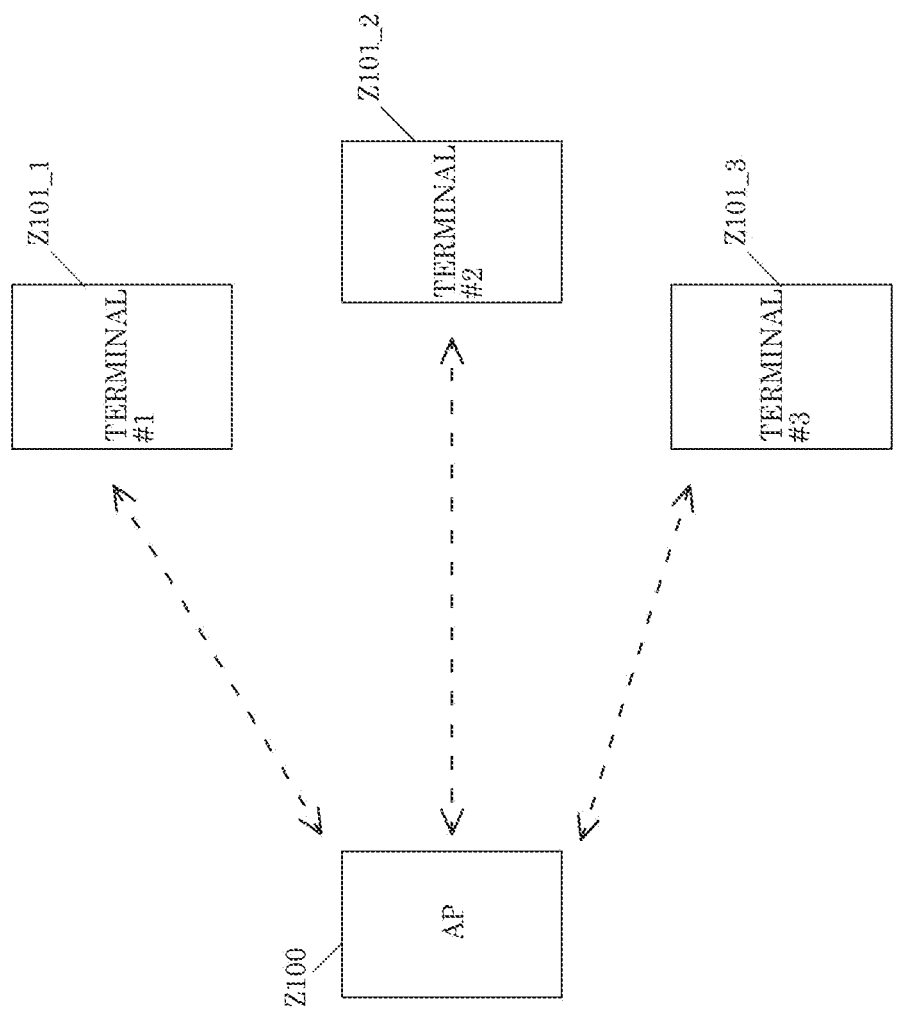
FIG. 17 illustrates one example of a system configuration according to Embodiment 4.

FIG. 17 illustrates one example of a system configuration according to the present embodiment. In FIG. 17, Z100 indicates an access point (AP), and Z101_1, Z101_2, and Z101_3 each indicate a terminal that wirelessly communicates with the AP. Although each terminal is exemplified as communicating with the AP in FIG. 17, each terminal may also have a function for communicating with other terminals.

Figure 18:
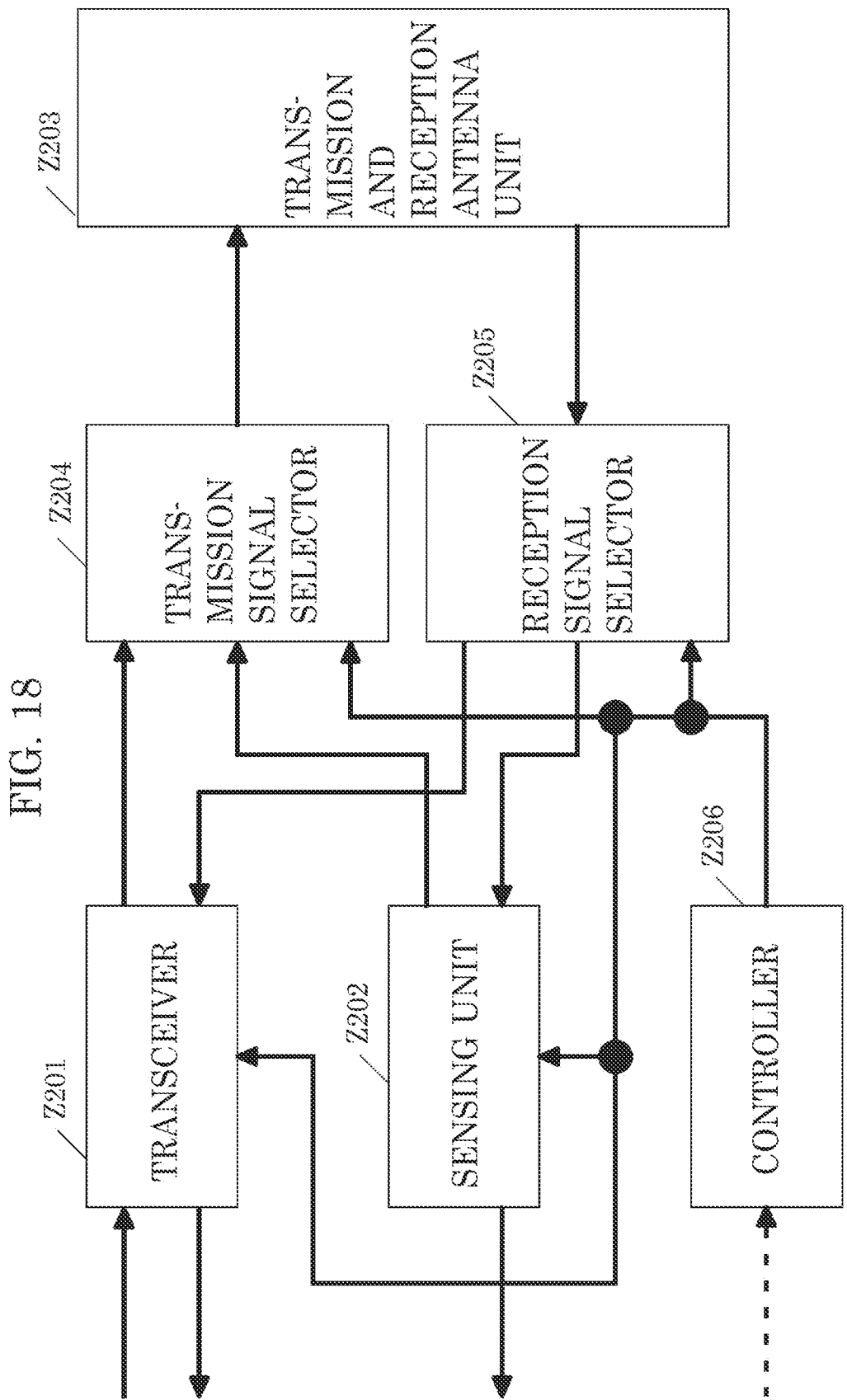
FIG. 18 illustrates one example of a configuration of an apparatus according to Embodiment 4.

FIG. 18 illustrates one example of a configuration of an apparatus capable of communication and sensing that AP Z100 and terminals Z101_1, Z101_2, and Z101_3 include. The apparatus illustrated in FIG. 18 performs sensing using one or a plurality of frequency ranges that can be used for communication, just like apparatus X300 illustrated in FIG. 16 and described in Embodiment 3, and one or a plurality of channels included in each of the one or a plurality of frequency ranges.

The apparatus illustrated in FIG. 18 includes transceiver Z201, sensing unit Z202, transmission and reception antenna unit Z203, transmission signal selector Z204, reception signal selector Z205, and controller Z206.

Transceiver Z201 transmits and receives signals for communication. Processing for transmitting and receiving signals for communication performed by the transceiver is the same as the transmission processing performed by transmitting apparatus X201 and the reception processing performed by receiving apparatus X206 that are described in Embodiment 3.

Sensing unit Z202 performs sensing based on a reception signal. Sensing unit Z202 may implement a sensing method in which the signal for sensing described in Embodiment 3 is transmitted and a received reflected signal is used for sensing, and may implement a sensing method in which a signal for communication received from another communication apparatus such as a terminal or AP is used for sensing, which is also described in Embodiment 3. Moreover, sensing unit Z202 may implement both a sensing method that transmits a sensing signal and a sensing method that transmits a received signal for communication. When a sensing method that transmits a sensing signal is implemented, sensing unit Z202 performs the same processing as transmitting apparatus X101 described in Embodiment 1, and generates and outputs a signal for sensing. On the other hand, when sensing unit Z202 does not implement a sensing method that transmits a sensing signal and implements a sensing method that uses a signal for communication, sensing unit Z202 need not transmit a signal.

Transmission and reception antenna unit Z203 transmits and receives signals. Transmission signal selector Z204 transmits, from transmission and reception antenna unit Z203, signals generated by transceiver Z201 and sensing unit Z202. Reception signal selector Z205 inputs signals received by transmission and reception antenna unit Z203 into transceiver Z201 and sensing unit Z202. Controller Z206 generates a control signal for controlling operations of transceiver Z201, sensing unit Z202, transmission signal selector Z204, and reception signal selector Z205, and controls the frequency and period to be used for communication and the frequency and period to be used for sensing. Note that transmission signal selector Z204 generates and outputs a signal in accordance with a frame including a combination of a signal for sensing and a signal for communication. Moreover, reception signal selector Z205 generates a signal for communication and a signal for sensing from a reception signal, and outputs both.

FIG. 19 through FIG. 37 illustrate examples of configurations of frames that are transmitted and received by an apparatus according to the present embodiment. In FIG. 19 through FIG. 37, time is represented on the horizontal axis, and in FIG. 19, FIG. 20, and FIG. 22 through FIG. 37, frequency is represented on the vertical axis. The frequency on the vertical axis may be frequency in a single channel in a single frequency range such as a subcarrier of an orthogonal frequency division multiplexing (OFDM) signal, and, alternatively, may be frequency in a plurality of channels in one or more frequency ranges. Moreover, the frequency on the vertical axis may be in a plurality of subcarriers of an OFDM signal that straddles a plurality of channels. Accordingly, a single carrier transmission scheme may be used, and, alternatively, a multicarrier transmission scheme such as OFDM may be used. Moreover, when the frame is used for sensing or when the signal is used for sensing, for example, a pulse signal that is bandlimited may be used, and a tone signal or carrier may be used. Accordingly, when the frames illustrated in FIG. 19 through FIG. 37 are used for communication and/or sensing, the frame illustrated in FIG. 19 need not be a signal that conforms to a single carrier transmission scheme or a signal that conforms to a multicarrier transmission scheme.

The reference symbol illustrated in FIG. 19 through FIG. 37 is a symbol for the apparatus according to the present embodiment to implement sensing. Note that the reference symbol may include a function for the communication partner to perform, for example, signal detection, time synchronization, frequency synchronization, channel estimation, etc. Moreover, the reference symbol may be control information or a media access control (MAC) frame required for procedures to perform data communication.

The control information symbol is, for example, a symbol for notifying of the communication method of the data symbol. Accordingly, the control information symbol includes information such as information indicating the error correction coding method (information indicating coding rate, block length (code length), error correction code), information indicating the modulation method, information indicating the transmitting method (for example, information indicating whether single stream transmission or multi-stream transmission is used) (information indicating modulation and coding scheme (MCS)), information indicating data length, etc.

The data symbol is a symbol for transmitting data to the communication partner.

The guard interval is an interval disposed directly after the reference signal, and is for assisting sensing. For example, the guard interval is provided to avoid interference between signals or symbols disposed before and after the guard interval, or for changing the transmission directionality and/or reception directionality of the symbol before the guard interval and the symbol after the guard interval. For example, a signal need not be present in the guard interval. Note that a guard interval need not be provided in a frame. For example, sensing unit Z202 is used to obtain a reception state of a signal in a state in which the communication apparatus in which sensing unit Z202 is included or another communication apparatus is not transmitting a signal for sensing or a signal for communication in the guard interval.

Note that the frame configurations illustrated in FIG. 19 through FIG. 37 are merely non-limiting examples. For example, some other symbol may be included in the frame. Moreover, a single carrier transmission scheme or a multi-carrier transmission scheme such as OFDM may be used when transmitting the frame.

The reference symbol may include a region for transmitting data. The region for transmitting data may include data for identifying whether the transmission signal is transmitting a signal for communication or transmitting a signal for object detection.

Although the naming "reference symbol" is used herein, the naming is not limited to this example. The reference symbol may be referred to as a pilot symbol, a training symbol, and training field, a preamble, a control information symbol, or a mid-amble or the like. For example, sensing may be implemented using a pilot symbol, training symbol, training field, preamble, control information symbol, mid-amble, etc.

Figure 19:
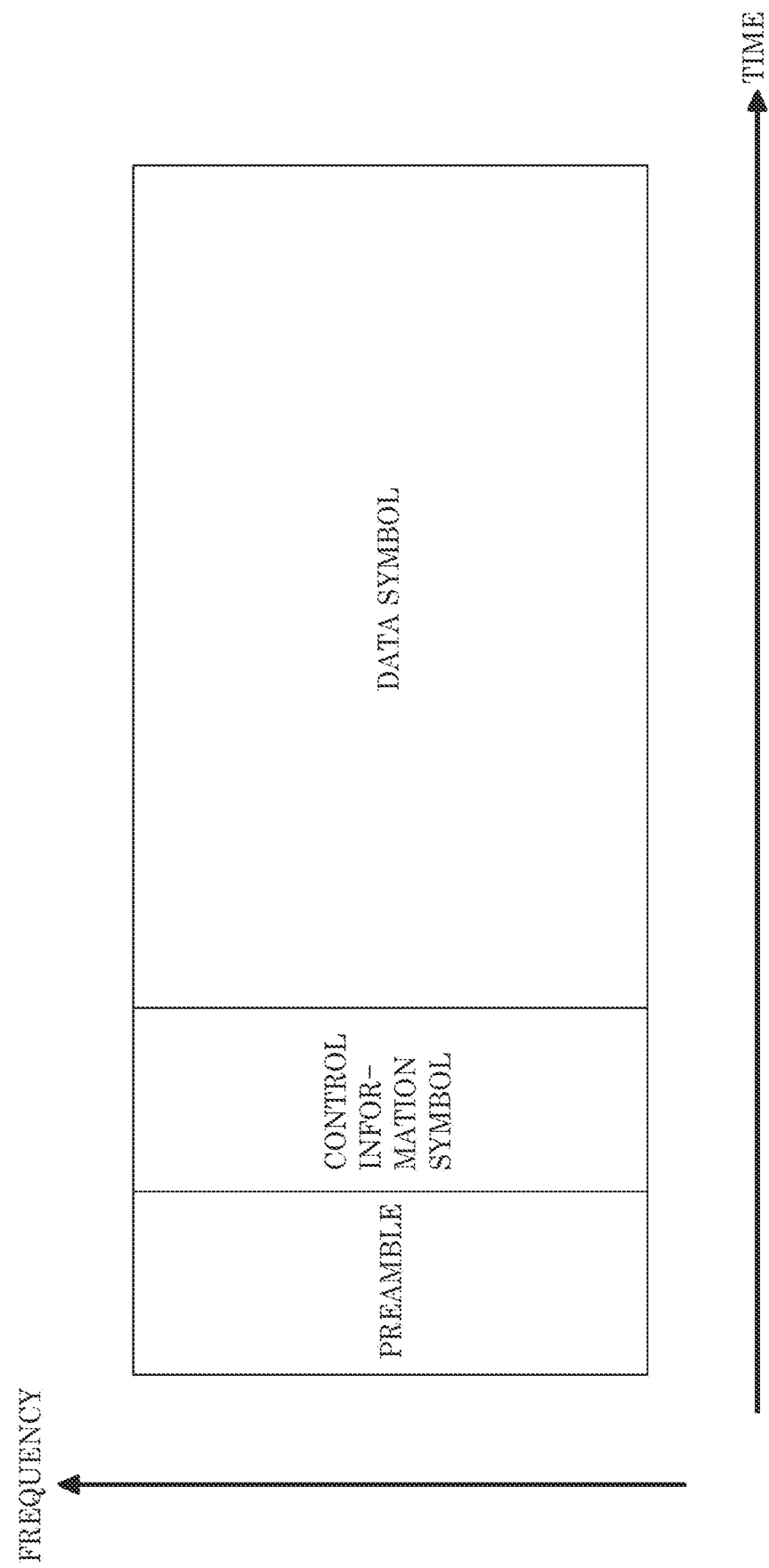
FIG. 19 illustrates one example of a configuration of a frame according to Embodiment 4.

FIG. 19 illustrates a frame configuration when the apparatus according to the present embodiment is performing communication.

The frame illustrated in FIG. 19 includes a preamble, a control information symbol, and a data symbol.

Figure 20:
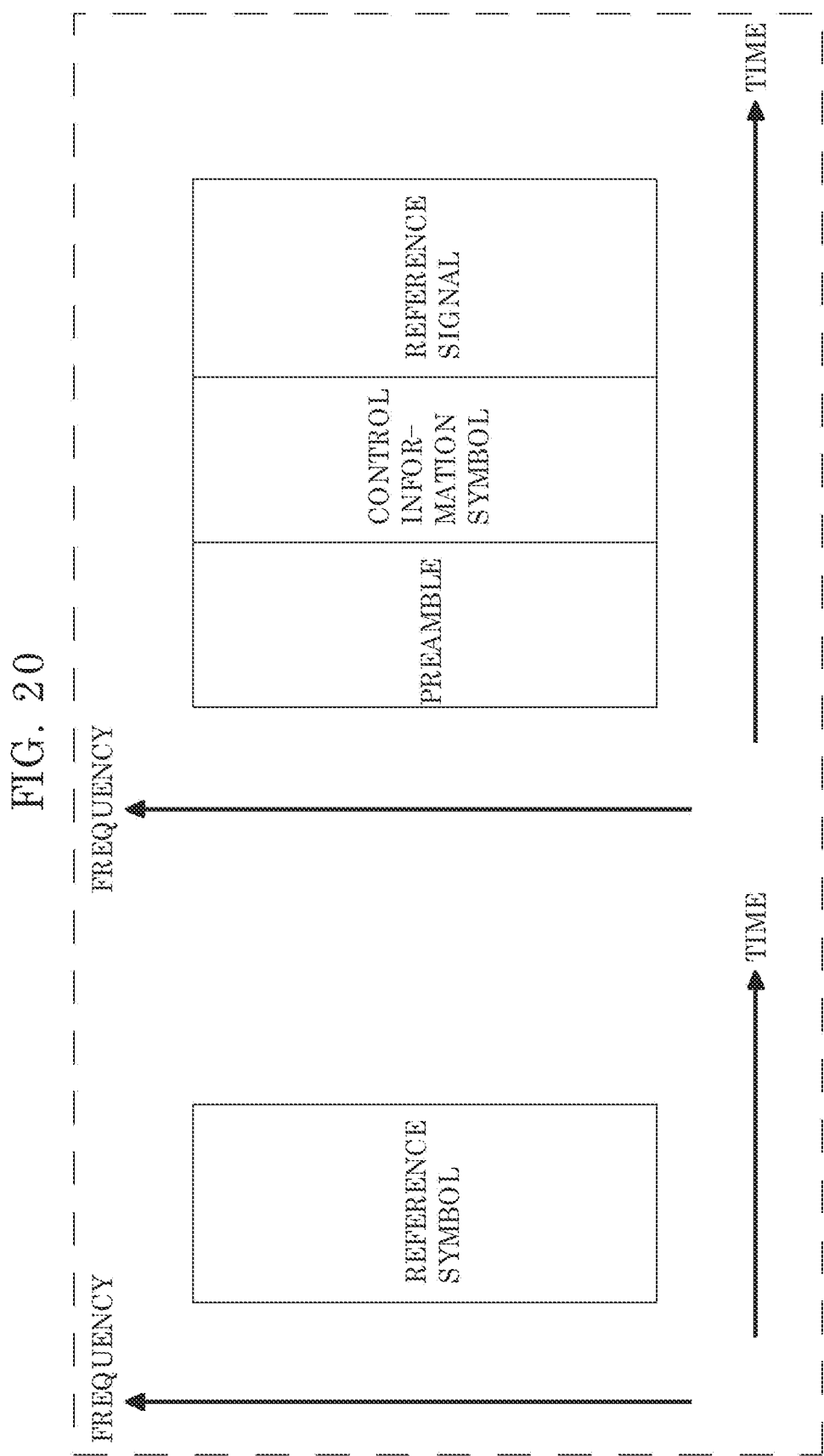
FIG. 20 illustrates one example of a configuration of a frame according to Embodiment 4.

FIG. 20 illustrates a frame configuration when the apparatus according to the present embodiment is performing sensing.

A frame configuration when a reference symbol is transmitted for sensing is shown on the left hand side of FIG. 20. The frame on the left hand side of FIG. 20 includes a reference symbol.

The frame configuration on the right hand side of FIG. 20 includes a preamble and a control information symbol in addition to the reference symbol for sensing. The frame shown on the right hand side of FIG. 20 includes a preamble, a control information symbol, and a reference signal.

Even if the apparatus that receives the frame illustrated on the right hand side of FIG. 20 includes only a communication function, by receiving the preamble and the control information symbol, the apparatus can know that a signal for sensing is present, whereby the apparatus can achieve the advantageous effect that it can control the transmission timing of a modulated signal so as not to cause interference. An example of the presence of such a signal is illustrated in FIG. 21.

Figure 21:
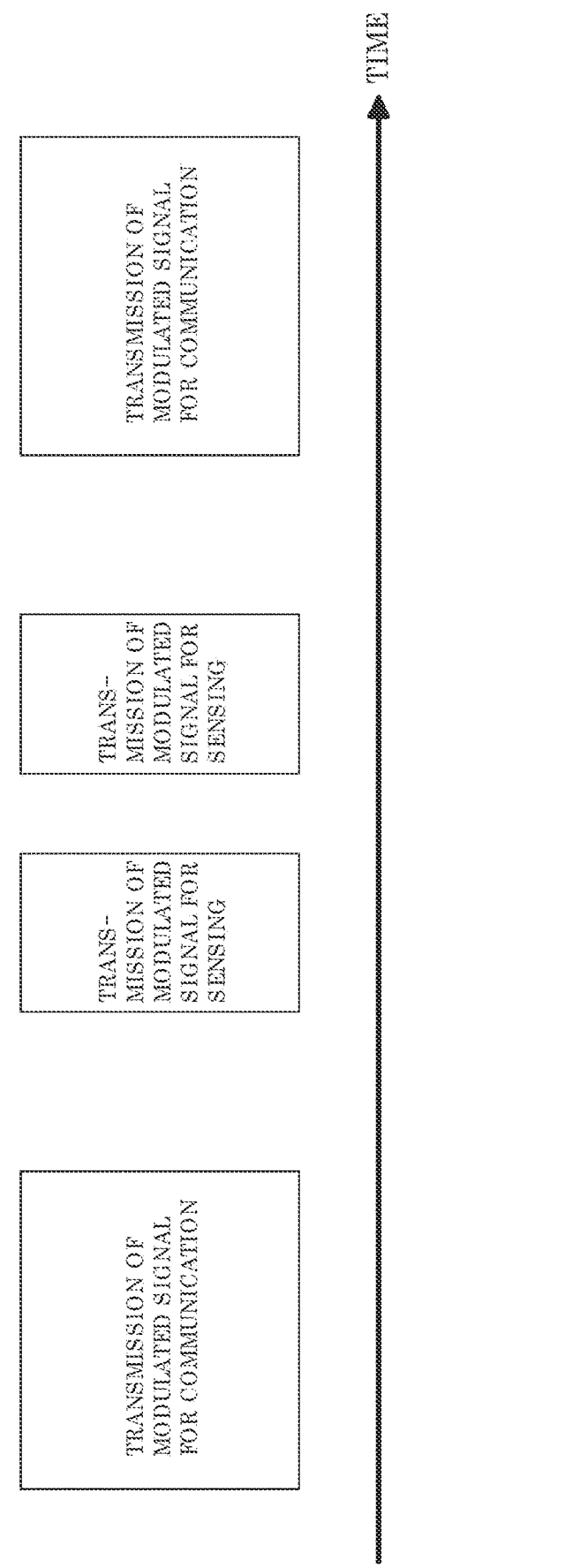
FIG. 21 illustrates one example of a configuration of a frame according to Embodiment 4.
Figure 22:
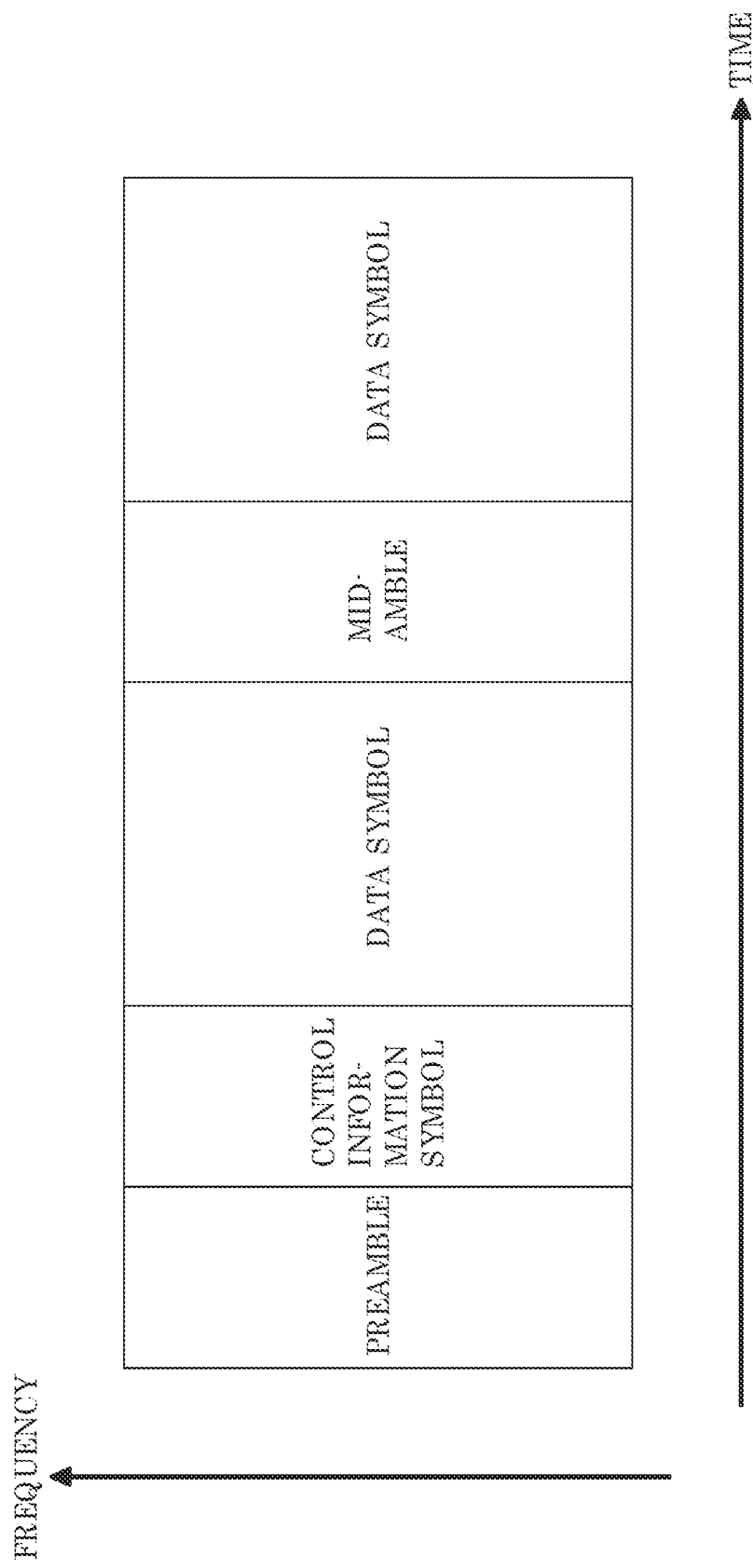
FIG. 22 illustrates one example of a configuration of a frame according to Embodiment 4.

As illustrated in FIG. 21, it is possible to have a modulated signal for communication and a modulated signal for sensing in a given frequency band.

Note that the apparatus according to the present embodiment may be an apparatus that includes only a communication function that enables for the transmission and reception of the frame illustrated in FIG. 19.

Moreover, the apparatus according to the present embodiment may be an apparatus that includes only a sensing function that enables for the transmission and reception of the frame illustrated in FIG. 20.

The apparatus according to the present embodiment may be an apparatus that performs both processing for communication and processing for sensing in parallel, so as to enable the transmission and reception of the frames illustrated in FIG. 22 through FIG. 37. The frames illustrated in FIG. 22 through FIG. 37 will be described hereinafter. Note that FIG. 22 through FIG. 37 illustrate examples of frames that enable sensing, and there are also cases in which there are frames that enable communication along with sensing. Moreover, in frames FIG. 22 through FIG. 37, there are frames including a guard interval, but the frames may be configured without a guard interval and the embodiment can still be implemented. Consider the state illustrated in FIG. 17 from the viewpoint of the frames illustrated in FIG. 22 through FIG. 37. However, the AP may be considered as a repeater. The frame illustrated in FIG. 22 includes a preamble, a control information symbol, a data symbol, a mid-amble, and a data symbol. In this example, the mid-amble is a symbol for demodulating a data symbol, and/or a symbol for sensing. This applies to other figures as well. Although the preamble is exemplified as being provided for realizing communication, the preamble and/or the control information symbol may be used by the apparatus for sensing. This applies to other figures as well.

Figure 23:
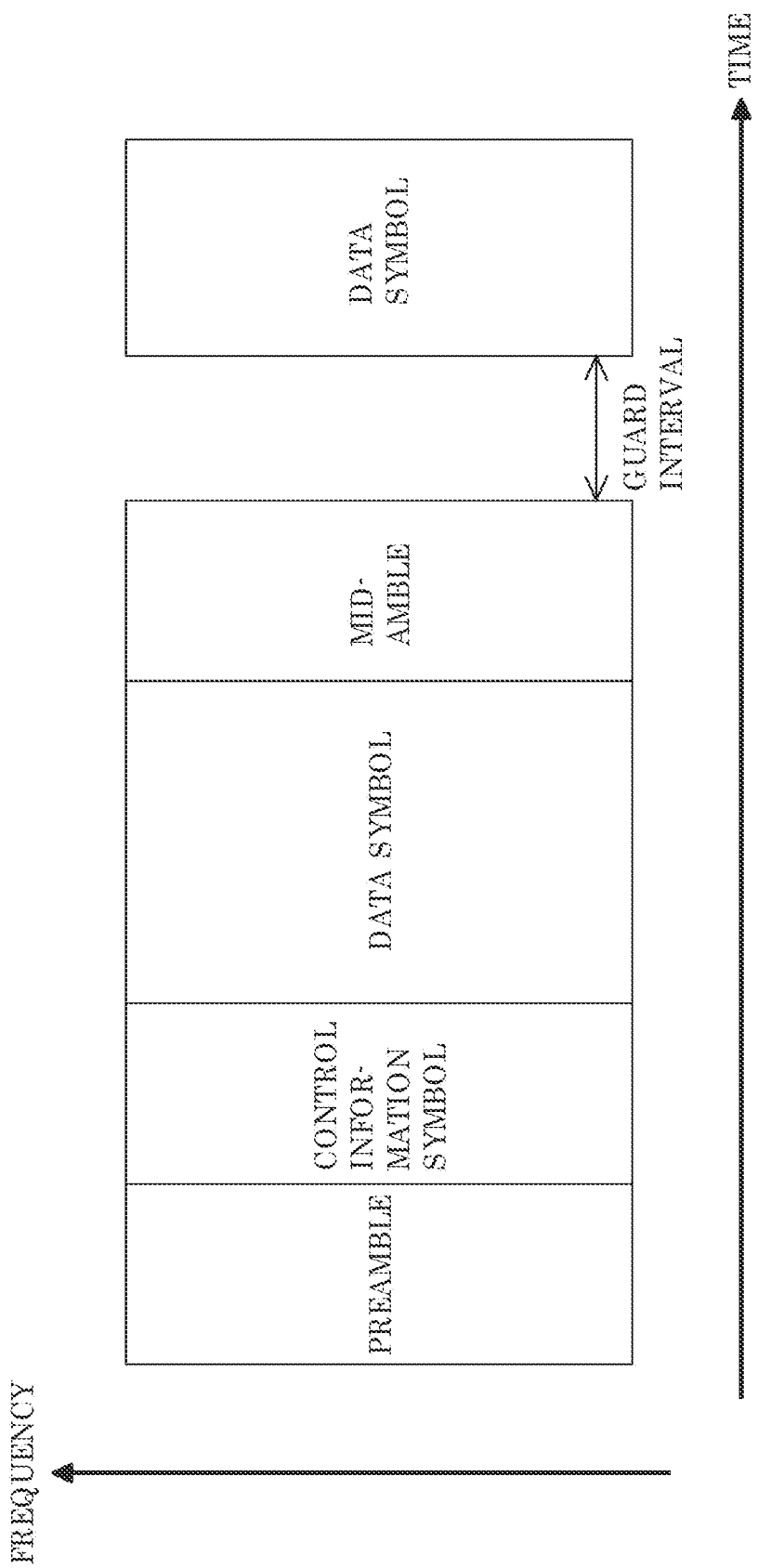
FIG. 23 illustrates one example of a configuration of a frame according to Embodiment 4.

The frame illustrated in FIG. 23 includes a preamble, a control information symbol, a data symbol, a mid-amble, and a data symbol. A guard interval is provided between the mid-amble and a data symbol. The symbol before the guard interval and the symbol after the guard interval may have different transmission directionalities. This applies to other figures as well. Moreover, a guard interval may be provided before the mid-amble. Furthermore, the frame need not include a guard interval. This applies to other figures as well.

Figure 24:
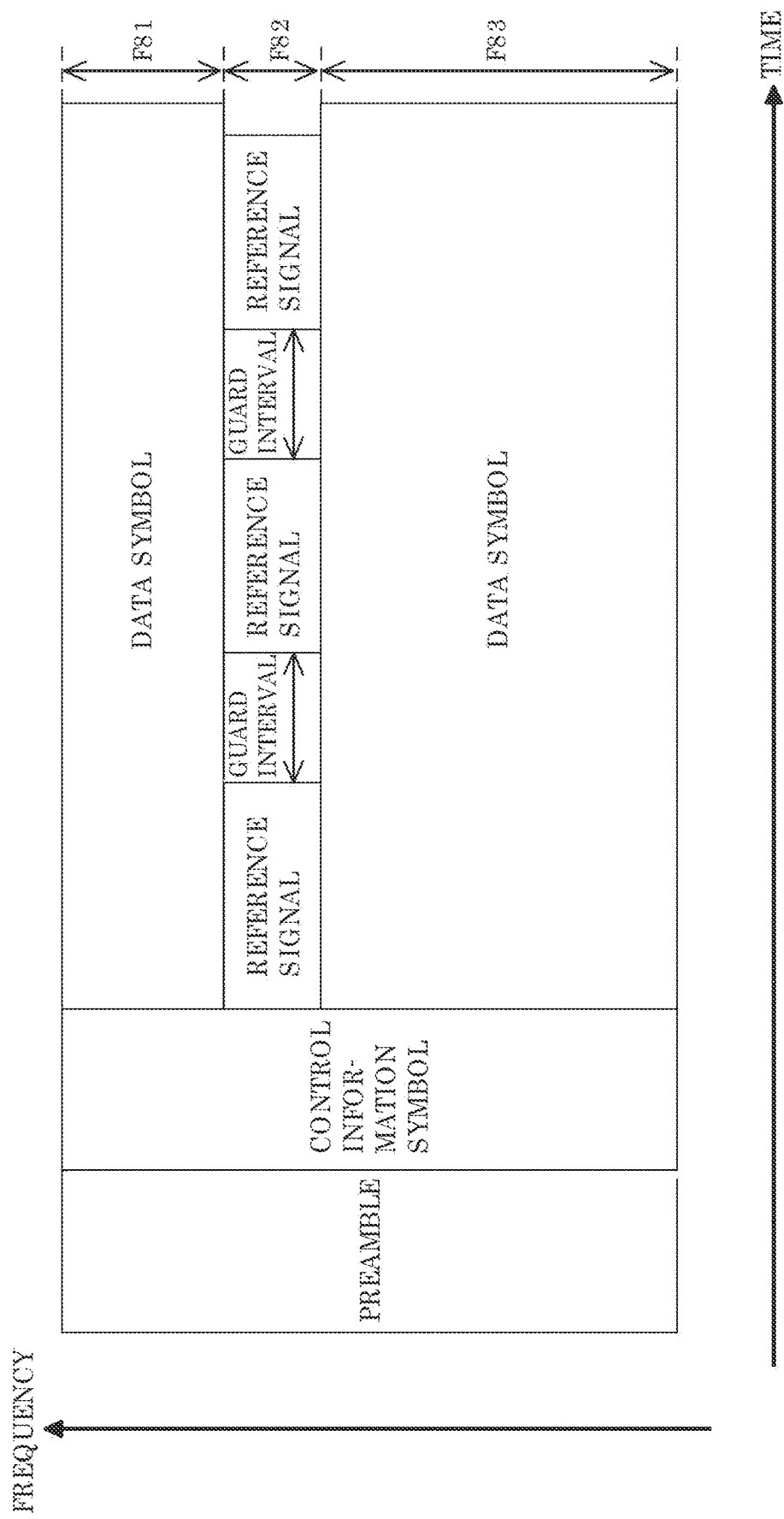
FIG. 24 illustrates one example of a configuration of a frame according to Embodiment 4.

The frame illustrated in FIG. 24 includes a preamble, a control information symbol, data symbols, and reference signals. The data symbols are disposed in two mutually different frequency bands F81 and F83. The reference signals are disposed in frequency band F82 which differs from the frequency bands in which the data symbols are disposed. More specifically, three reference signals are disposed in frequency band F82, in different time slots. Guard intervals are provided between the reference signals. In other words, three reference signals are disposed with guard intervals provided between adjacent reference signals. Note that the reference signals are used for sensing. This applies to other figures as well. Moreover, the reference signal before a guard interval and the reference signal after the guard interval may have different transmission directionalities. This applies to other figures as well.

When data symbols or reference signals are disposed in two or more frequency bands or two or more channels, multiple access may be employed via orthogonal frequency division multiple access (OFDMA). In such cases, the data symbols or reference signals are disposed in a specified range along the time axis and a specified range along the frequency axis. As used herein, the above-described range is also referred to as a time-frequency resource which is a resource defined by time and frequency. A time-frequency resource in which a symbol including communication data is disposed is also referred to as a resource for communication, and a time-frequency resource in which a symbol for sensing via radio waves is disposed is also referred to as a resource for sensing. This applies hereinafter as well.

Figure 25:
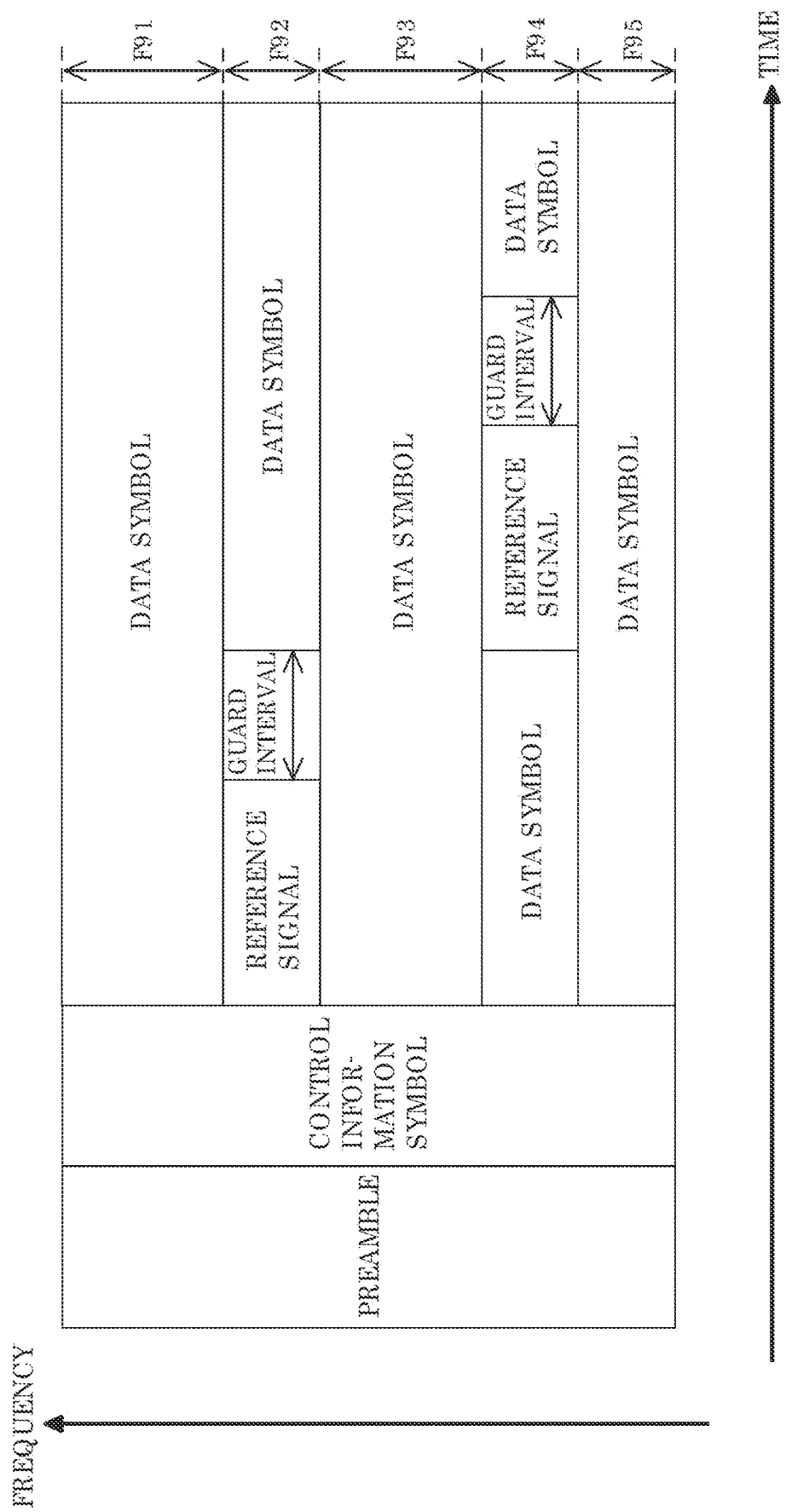
FIG. 25 illustrates one example of a configuration of a frame according to Embodiment 4.

The frame illustrated in FIG. 25 includes a preamble, a control information symbol, data symbols, and reference signals. The data symbols are disposed in five mutually different frequency bands F91 through F95. The reference signals are disposed in frequency bands F92 and F94. In frequency bands F92 and F94, a guard interval is provided between the reference signal and a data symbol. Like frequency bands F92 and F94, both data symbols and reference signals may be provided in some frequency resources. Such a configuration makes it possible to achieve the advantageous effect of an improvement in frequency use efficiency. The reference signal and data symbol before and after the guard interval may have different transmission directionalities. This applies to other figures as well.

Figure 26:
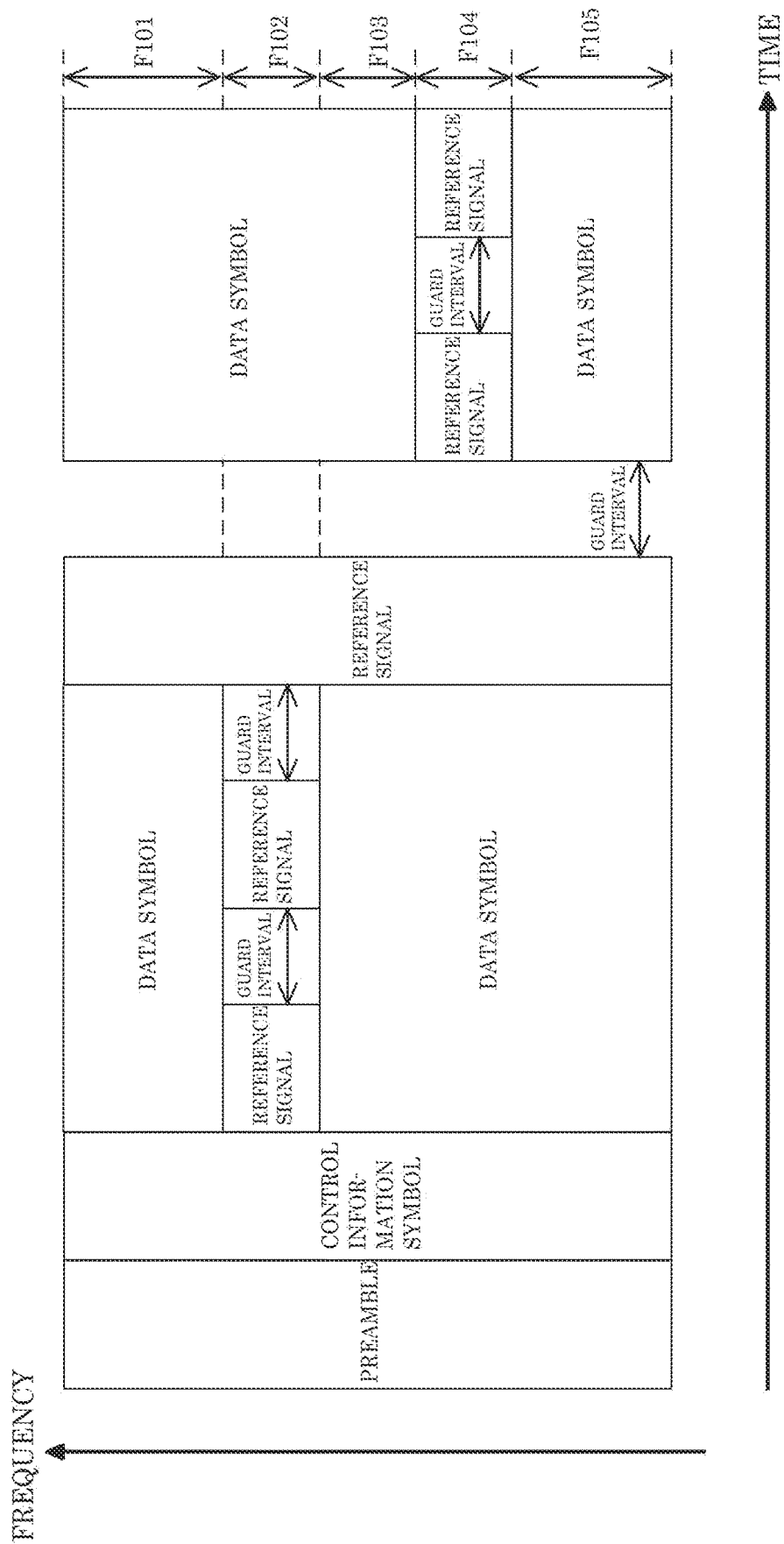
FIG. 26 illustrates one example of a configuration of a frame according to Embodiment 4.

The frame illustrated in FIG. 26 includes a preamble, a control information symbol, data symbols, and reference signals. The data symbols are disposed in frequency bands F101 and F103 through F105. Three reference signals are disposed in frequency band F102 with guard intervals provided between adjacent reference signals. Moreover, a reference signal is disposed spanning across frequency bands F101 through F105. After that reference signal, data symbols are disposed in frequency bands F101 through F103 and F105, and in frequency band F104, two reference signals are disposed with a guard interval provided therebetween. One characteristic feature is that a high bandwidth reference signal and a low bandwidth reference signal are present. This improves the possibility that highly accurate sensing can be performed.

Figure 27:
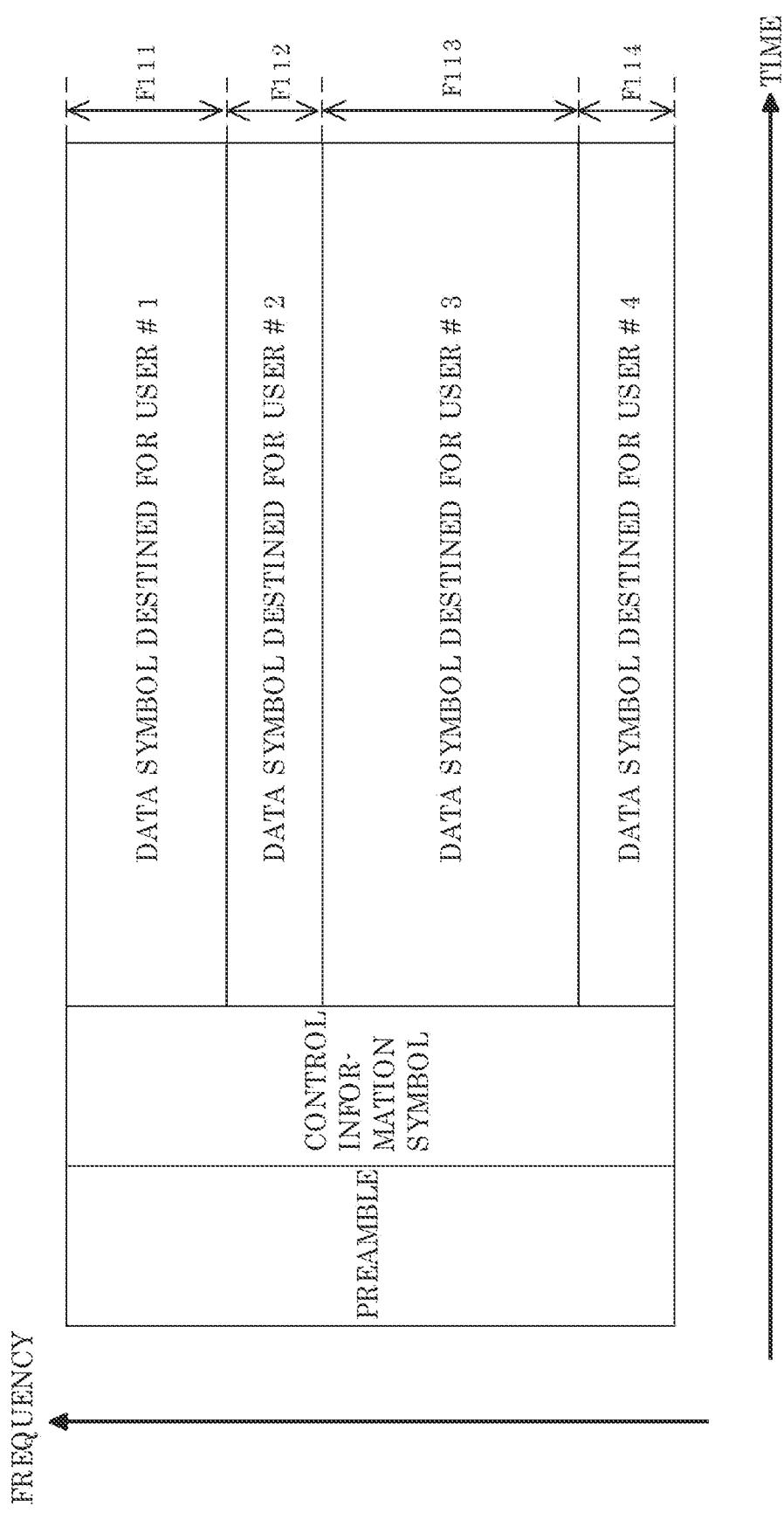
FIG. 27 illustrates one example of a configuration of a frame according to Embodiment 4.

The frame illustrated in FIG. 27 includes a preamble, a control information symbol, and data symbols destined for different users. The data symbols destined for different users include data symbols destined for user #1, user #2, user #3, and user #4 disposed in frequency bands F111, F112, F113, and F114, respectively. This frame configuration can be considered to be an example of an OFDMA frame. For example, this frame configuration can be considered to be a frame transmitted by an AP or repeater or the like.

Figure 28:
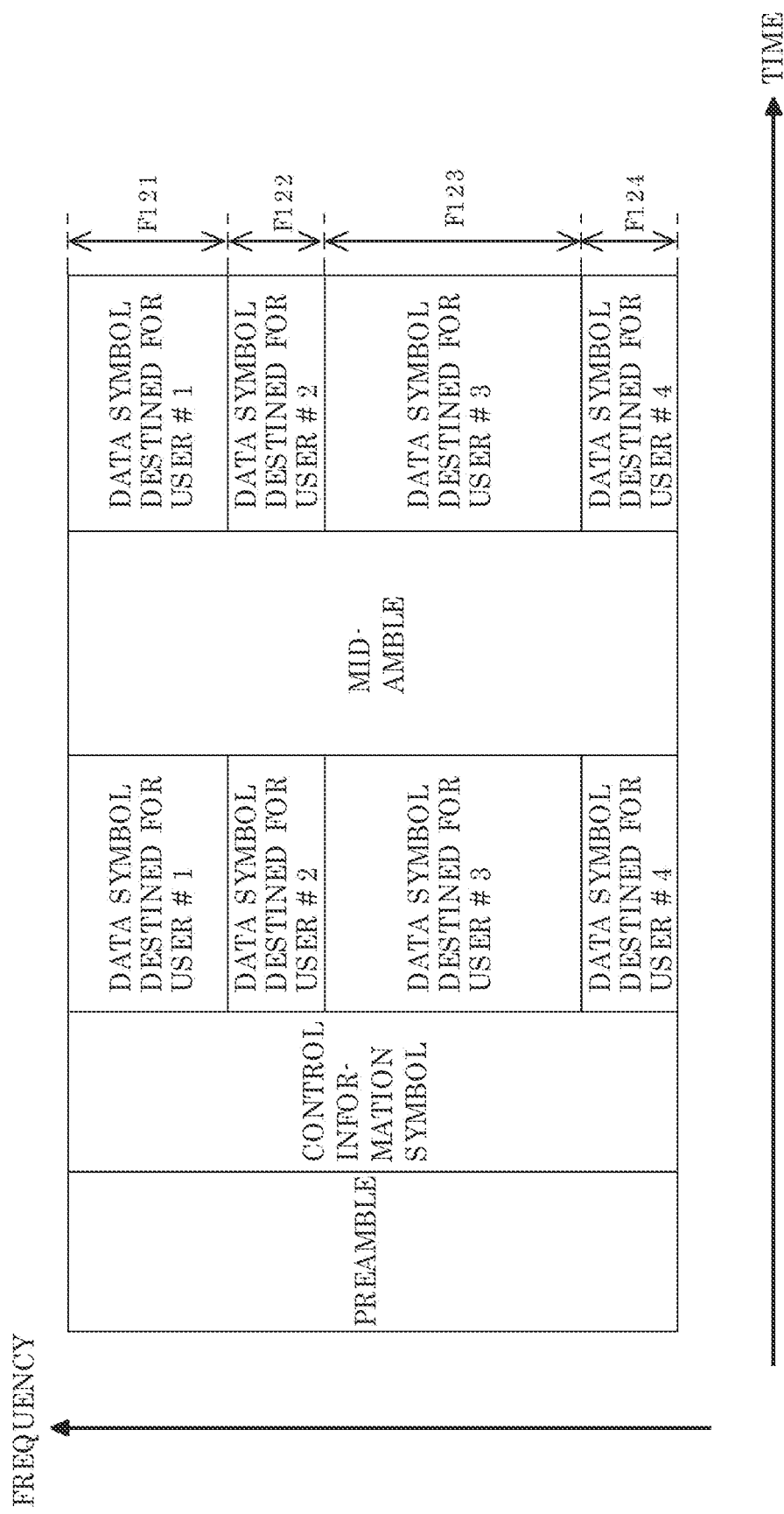
FIG. 28 illustrates one example of a configuration of a frame according to Embodiment 4.

The frame illustrated in FIG. 28 includes a preamble, a control information symbol, data symbols destined for different users, and a mid-amble. The data symbols destined for different users include data symbols destined for user #1, user #2, user #3, and user #4 disposed in frequency bands F121, F122, F123, and F124, respectively. The mid-amble is disposed between data symbols destined for users. This frame configuration can be considered to be an example of an OFDMA frame. For example, this frame configuration can be considered to be a frame transmitted by an AP or repeater or the like.

Figure 29:
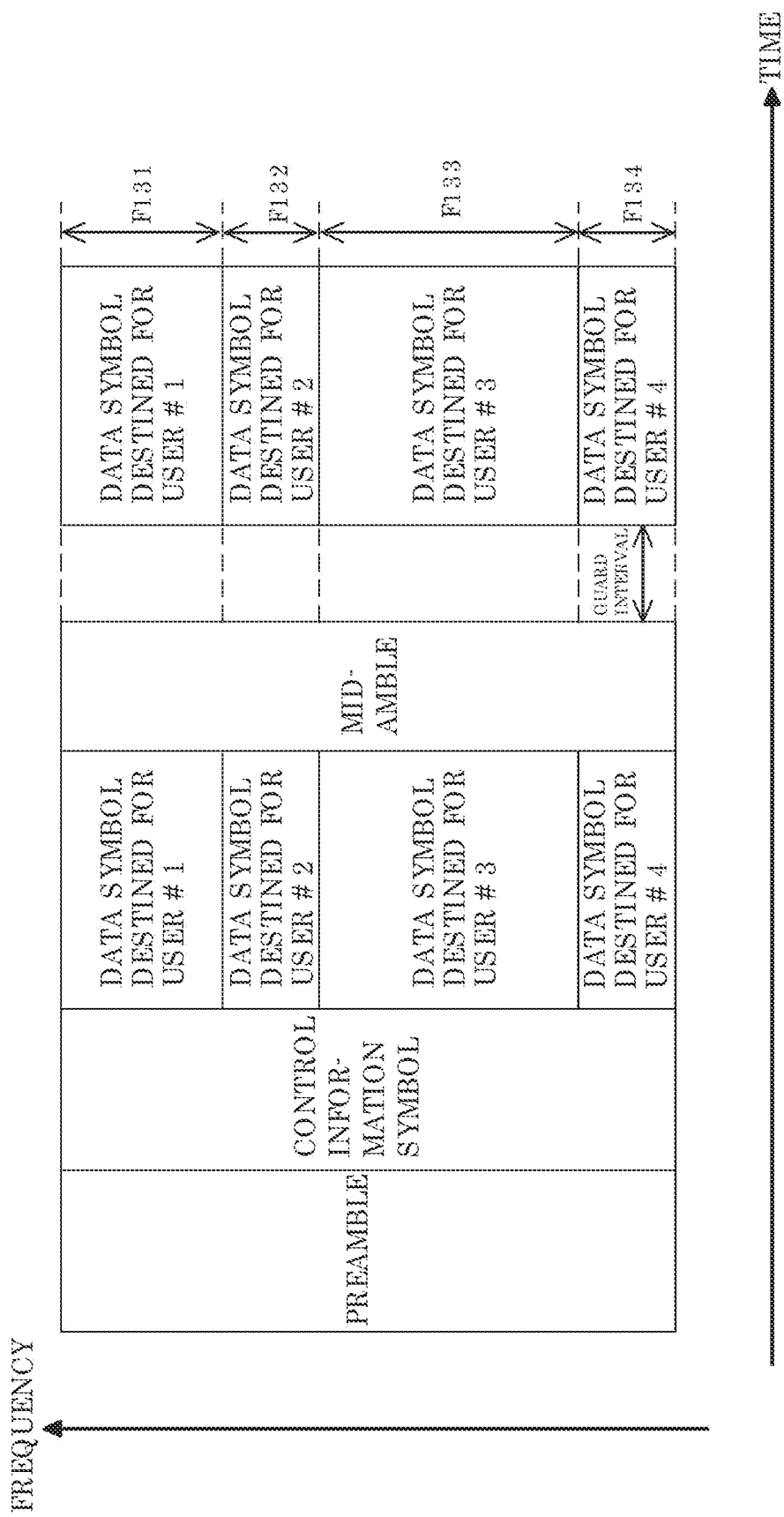
FIG. 29 illustrates one example of a configuration of a frame according to Embodiment 4.

The frame illustrated in FIG. 29 includes a preamble, a control information symbol, data symbols destined for different users, and a mid-amble. The data symbols destined for different users include data symbols destined for user #1, user #2, user #3, and user #4 disposed in frequency bands F131, F132, F133, and F134, respectively. The mid-amble is disposed between data symbols destined for users. A guard interval is provided between the mid-amble and data symbols destined for users. A guard interval may be provided before the mid-amble. This frame configuration can be considered to be an example of an OFDMA frame. For example, this frame configuration can be considered to be a frame transmitted by an AP or repeater or the like.

Figure 30:
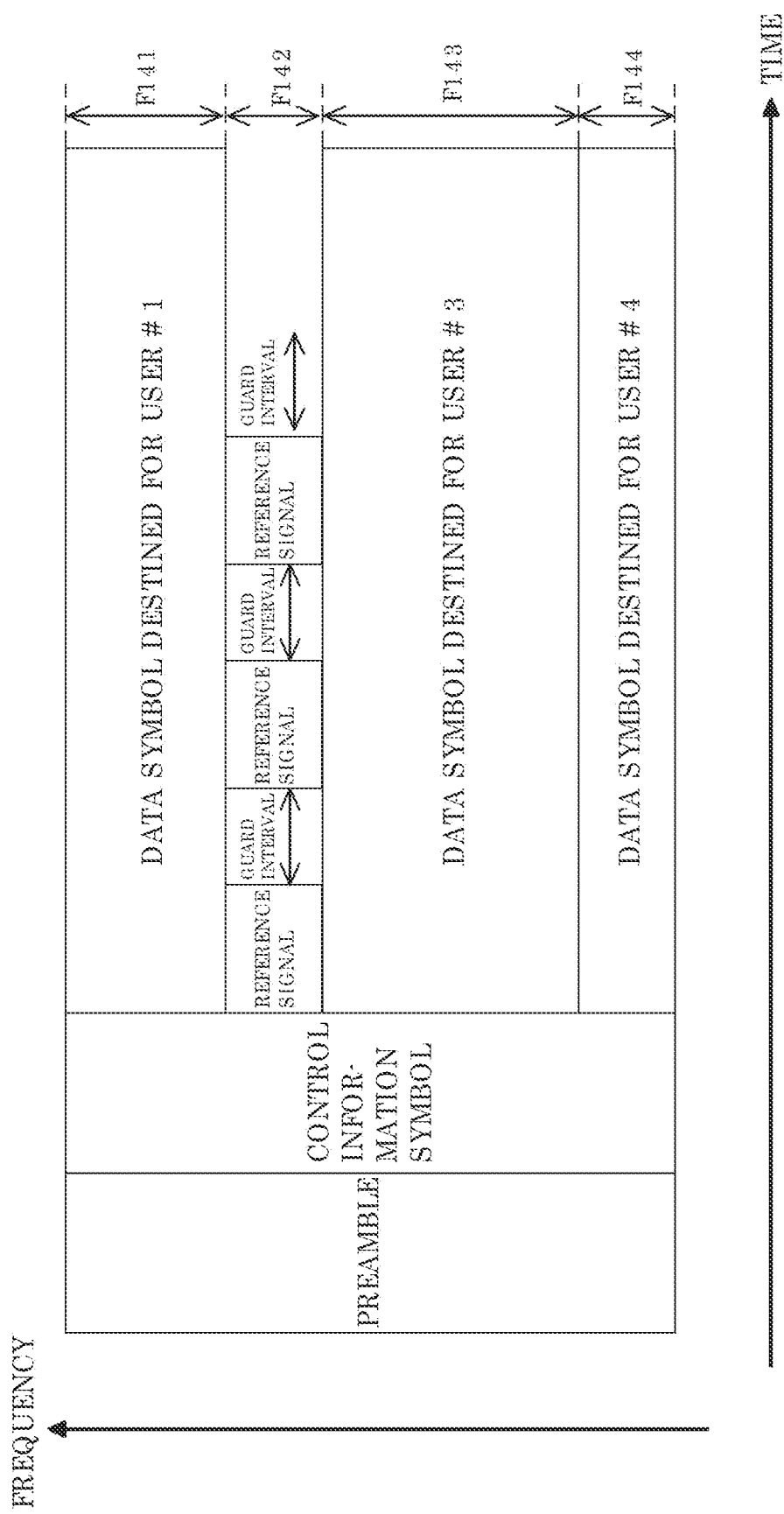
FIG. 30 illustrates one example of a configuration of a frame according to Embodiment 4.
Figure 31:
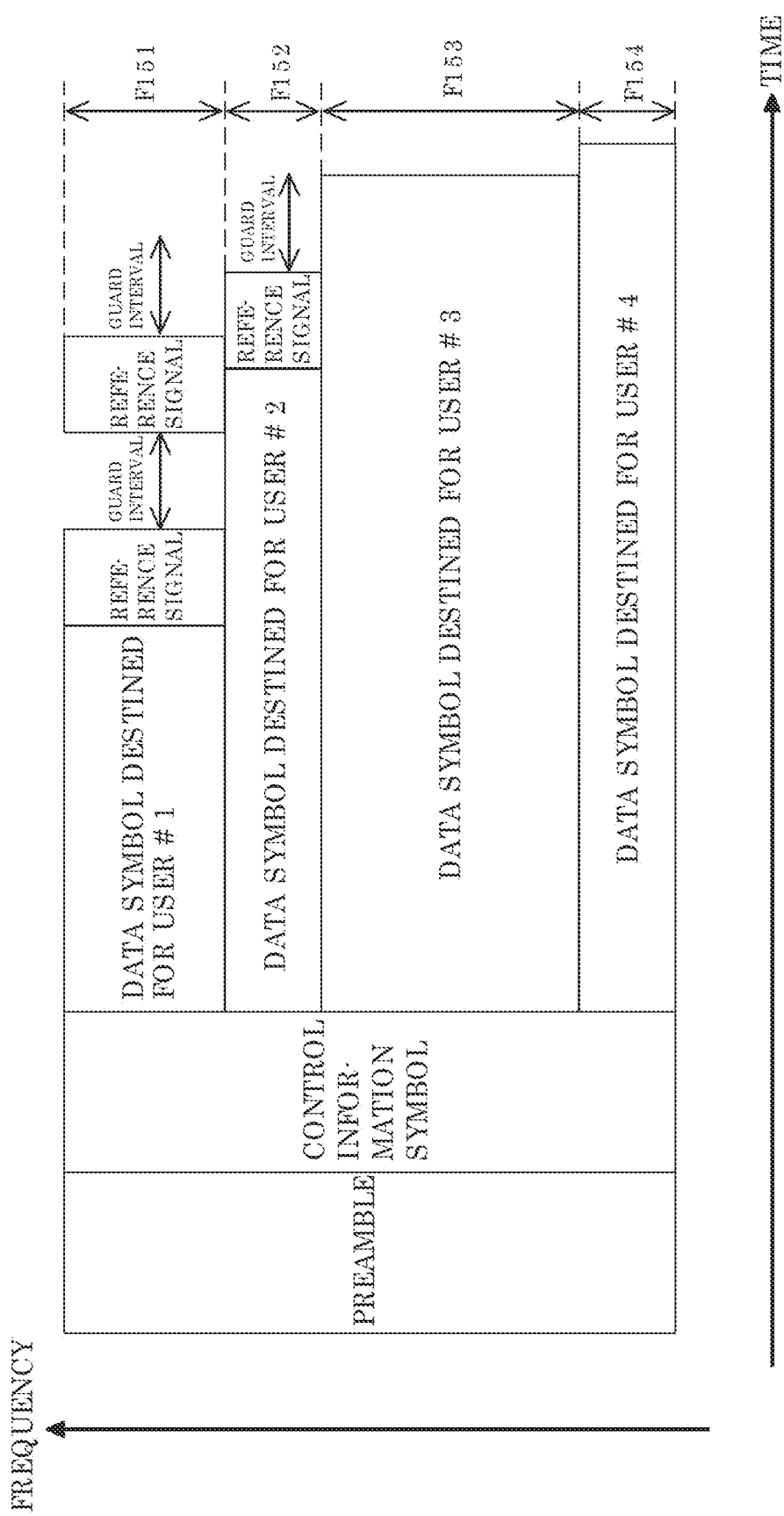
FIG. 31 illustrates one example of a configuration of a frame according to Embodiment 4.
Figure 32:
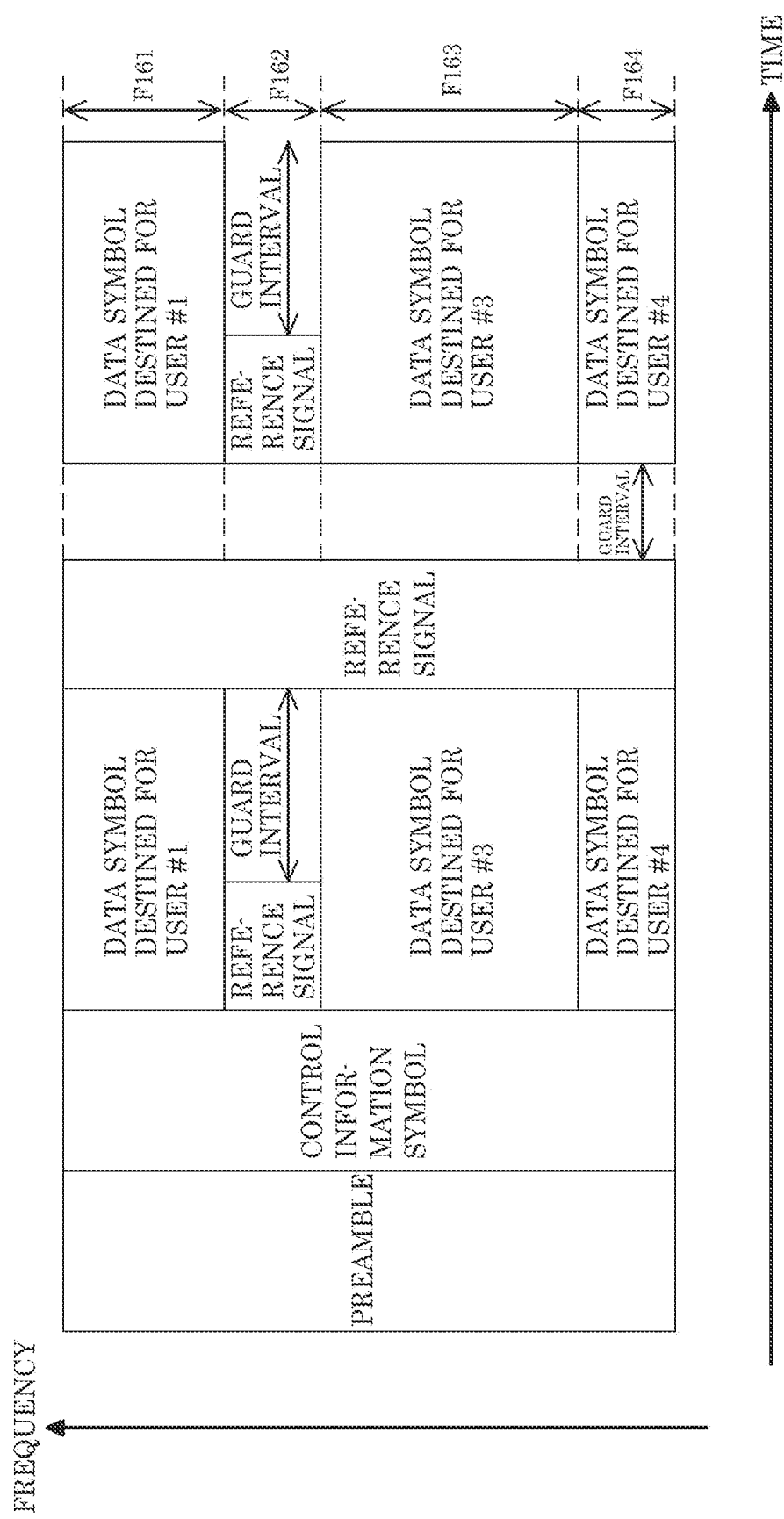
FIG. 32 illustrates one example of a configuration of a frame according to Embodiment 4.

The frame illustrated in FIG. 30 includes a preamble, a control information symbol, data symbols destined for different users, and reference signals. The data symbols destined for different users include data symbols destined for user #1, user #3, and user #4 disposed in frequency bands F141, F143, and F144, respectively. In frequency band F142, three reference signals are disposed with guard intervals provided between adjacent reference signals. When OFDMA is used, there may be a frequency band that is not used for data symbols destined for users (for example, frequency band F142 in FIG. 30), and in such cases, a reference signal is disposed in the frequency band that is not used for data symbols destined for users. Note that frequency band F142 can be used to transmit a data symbol destined for a given user. For example, this frame configuration can be considered to be a frame transmitted by an AP or repeater or the like. The frame illustrated in FIG. 31 includes a preamble, a control information symbol, data symbols destined for different users, and reference signals. The data symbols destined for different users include data symbols destined for user #1, user #2, user #3, and user #4 disposed in frequency bands F151, F152, F153, and F154, respectively. In frequency band F151, after the data symbol destined for user #1, two reference signals are disposed with a guard interval provided therebetween. In frequency band F152, a reference signal is disposed after the data symbol destined for user #2, and a guard interval is provided after that reference signal.

When OFDMA is used, the length of time that a data symbol destined for a user occupies may differ from user to user, and in such cases, a reference signal is disposed in the frequency band and the span of time that are not used for data symbols destined for users. For example, the length of time that the data symbol destined for user #1 occupies is shorter than the length of time that the data symbol destined for user #4 occupies, so it is possible to use the time after the data symbol destined for user #1 for transmitting a reference symbol. For example, this frame configuration can be considered to be a frame transmitted by an AP or repeater or the like. The frame illustrated in FIG. 32 includes a preamble, a control information symbol, data symbols destined for different users, and reference signals. The data symbols destined for different users include data symbols destined for user #1, user #3, and user #4 disposed in frequency bands F161, F163, and F164, respectively. A reference signal is disposed spanning across frequency bands F161 through F164, and a guard interval is provided after that reference signal. In frequency band F162, a guard interval is provided between reference signals. For example, this frame configuration can be considered to be a frame transmitted by an AP or repeater or the like.

Figure 33:
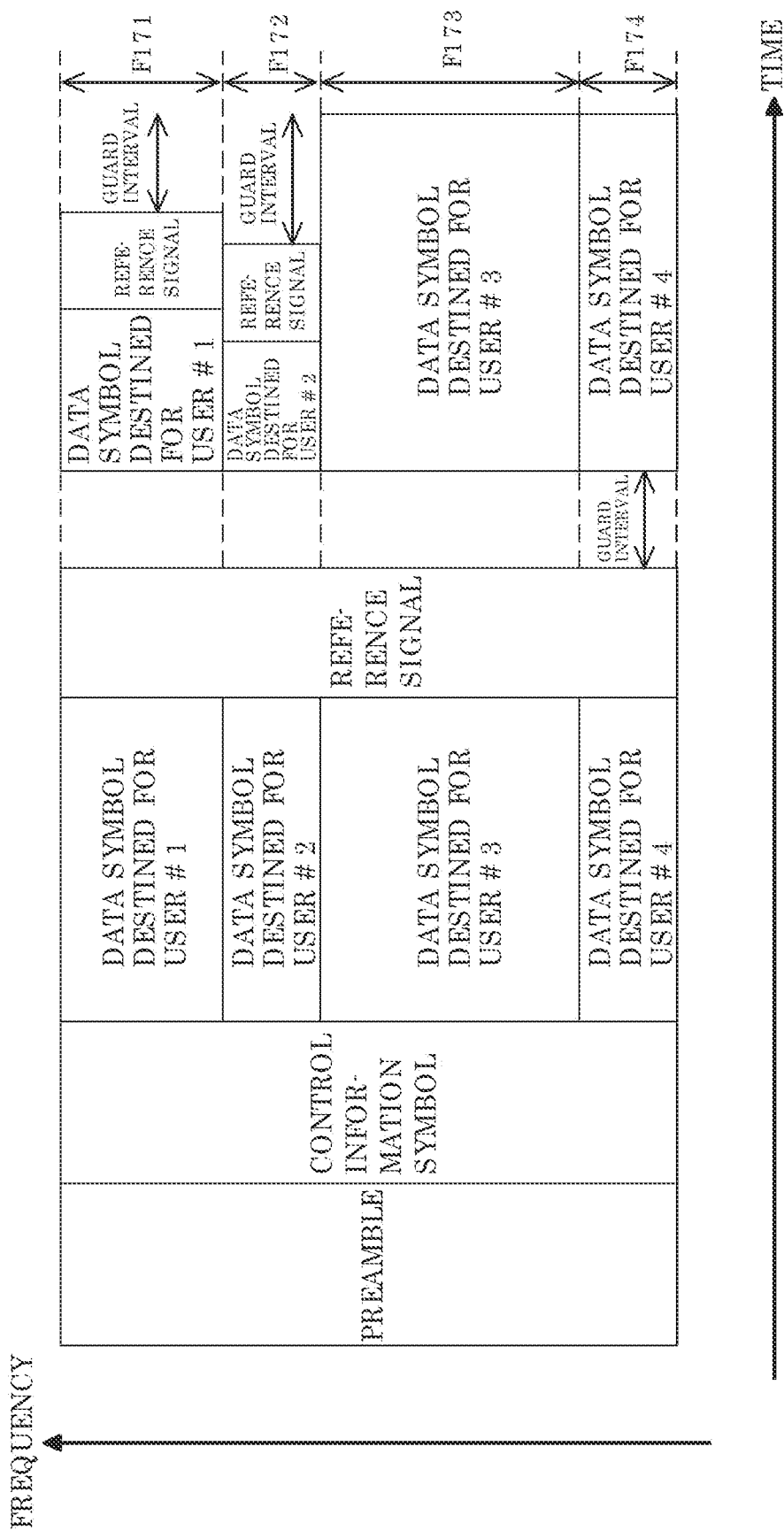
FIG. 33 illustrates one example of a configuration of a frame according to Embodiment 4.

The frame illustrated in FIG. 33 includes a preamble, a control information symbol, data symbols destined for different users, and reference signals. The data symbols destined for different users include data symbols destined for user #1, user #2, user #3, and user #4 disposed in frequency bands F171, F172, F173, and F174, respectively. A reference signal is disposed spanning across frequency bands F171 through F174, and a guard interval is provided after that reference signal. In frequency band F171, a reference signal destined for user #1 is disposed after the guard interval, and another guard interval is disposed after the reference signal. Infrequency band F172, a reference signal destined for user #2 is disposed after the guard interval, and another guard interval is disposed after the reference signal. In frequency bands F171 and F172, the length of time that the data symbols destined for users, the reference signals, and the guard intervals occupy are different. For example, this frame configuration can be considered to be a frame transmitted by an AP or repeater or the like.

Figure 34:
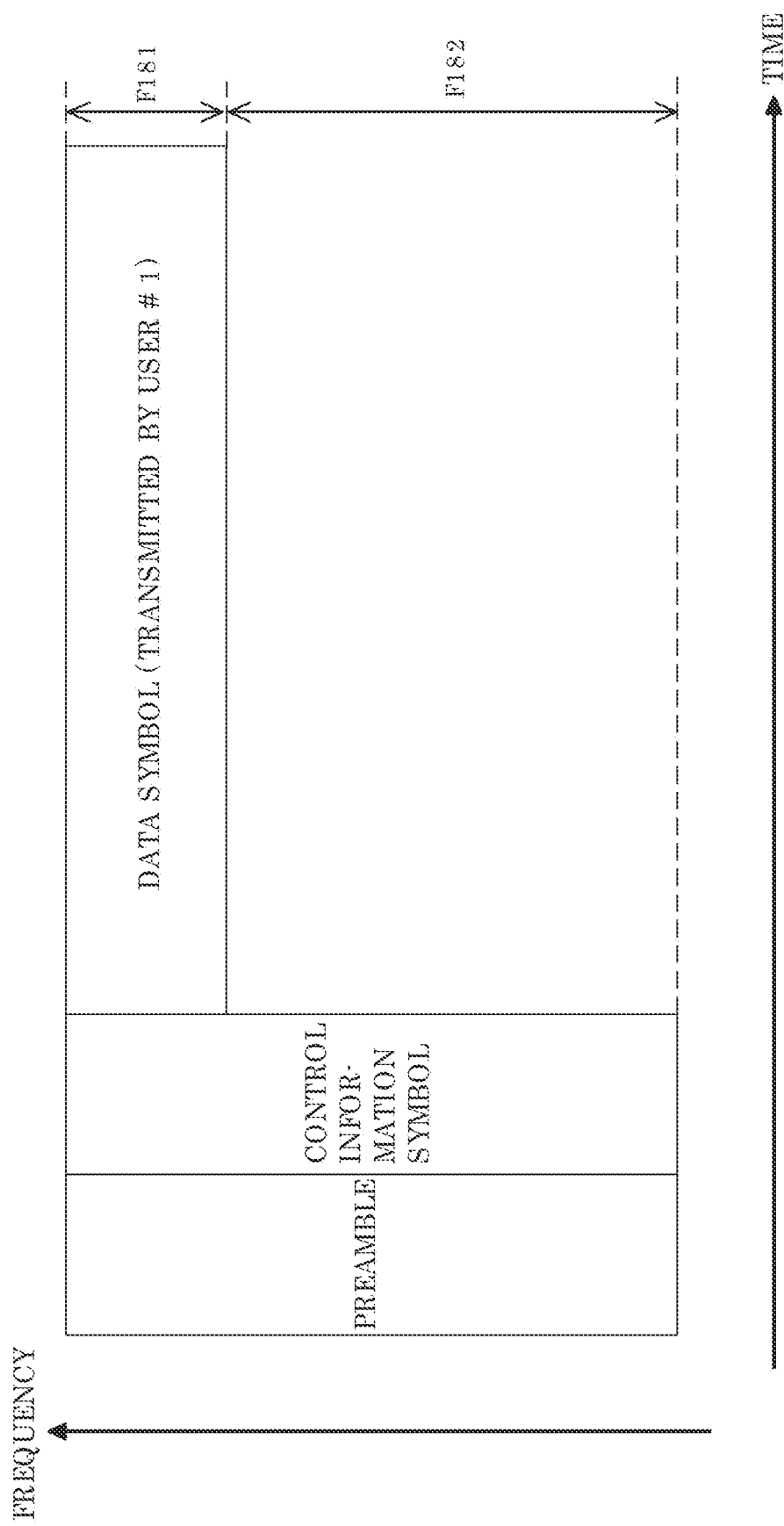
FIG. 34 illustrates one example of a configuration of a frame according to Embodiment 4.

The frame illustrated in FIG. 34 is an example of a configuration of a frame transmitted by a terminal, such as a configuration of a frame transmitted by a terminal possessed by user #1, and includes a preamble, a control information symbol, and a data symbol (transmitted by the terminal possessed by user #1). The data symbol (transmitted by the terminal possessed by user #1) is disposed in frequency band F181. Frequency band F182 is not assigned to the terminal possessed by user #1. However, frequency band F182 can be used by a terminal possessed by another user (a terminal other than user #1's terminal) to transmit data symbols and reference signals.

Figure 35:
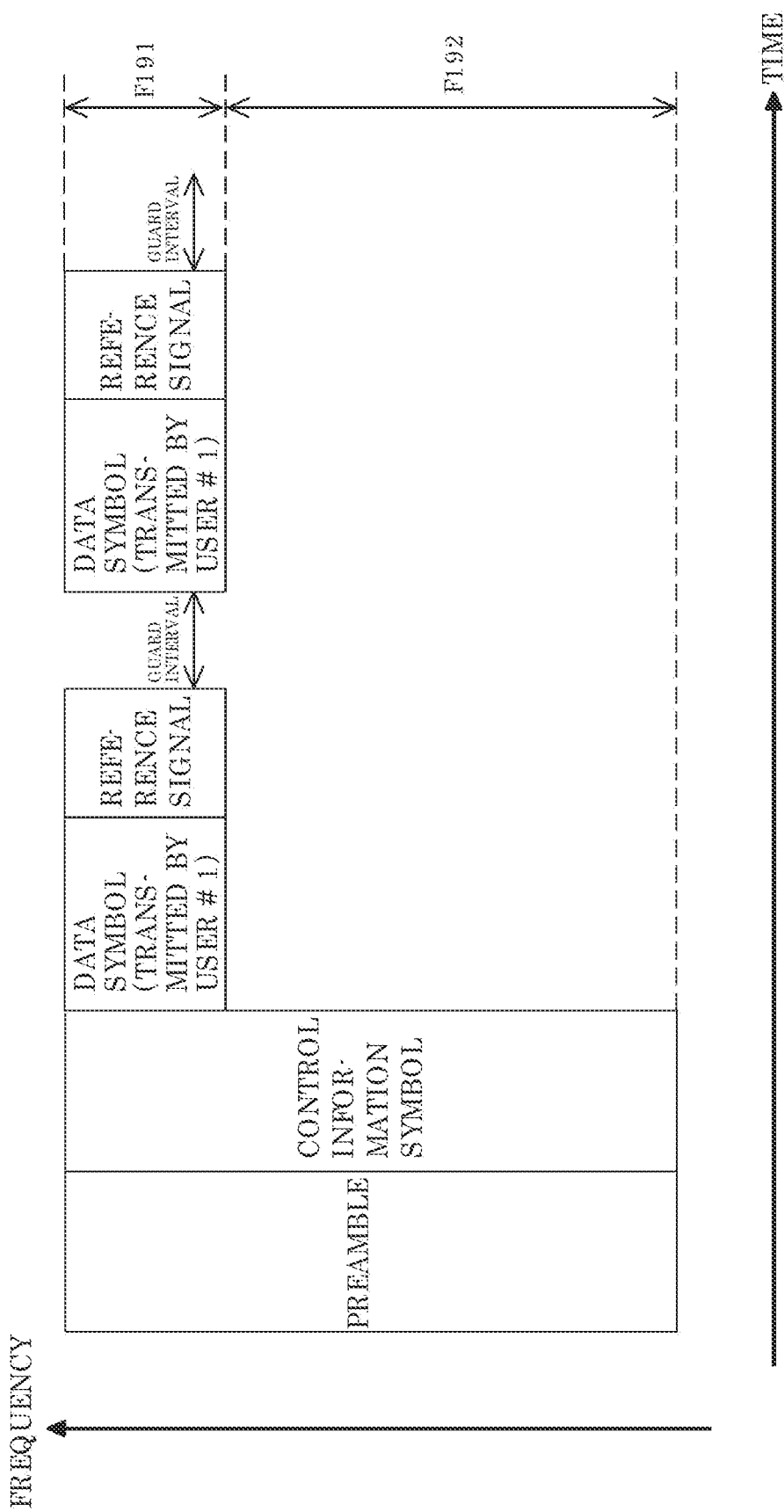
FIG. 35 illustrates one example of a configuration of a frame according to Embodiment 4.

The frame illustrated in FIG. 35 is an example of a configuration of a frame transmitted by a terminal, such as a configuration of a frame transmitted by a terminal possessed by user #1, and includes a preamble, a control information symbol, data symbols (transmitted by the terminal possessed by user #1), and reference signals. The data symbols (transmitted by the terminal possessed by user #1) are disposed in frequency band F191. Frequency band F192 is not assigned to the terminal possessed by user #1. A reference signal and a guard interval are provided after a data symbol (transmitted by the terminal possessed by user #1). Another reference signal and another guard interval are also provided after the next data symbol (transmitted by the terminal possessed by user #1). Note that frequency band F192 can be used by a terminal possessed by another user (a terminal other than user #1's terminal) to transmit data symbols and reference signals.

Figure 36:
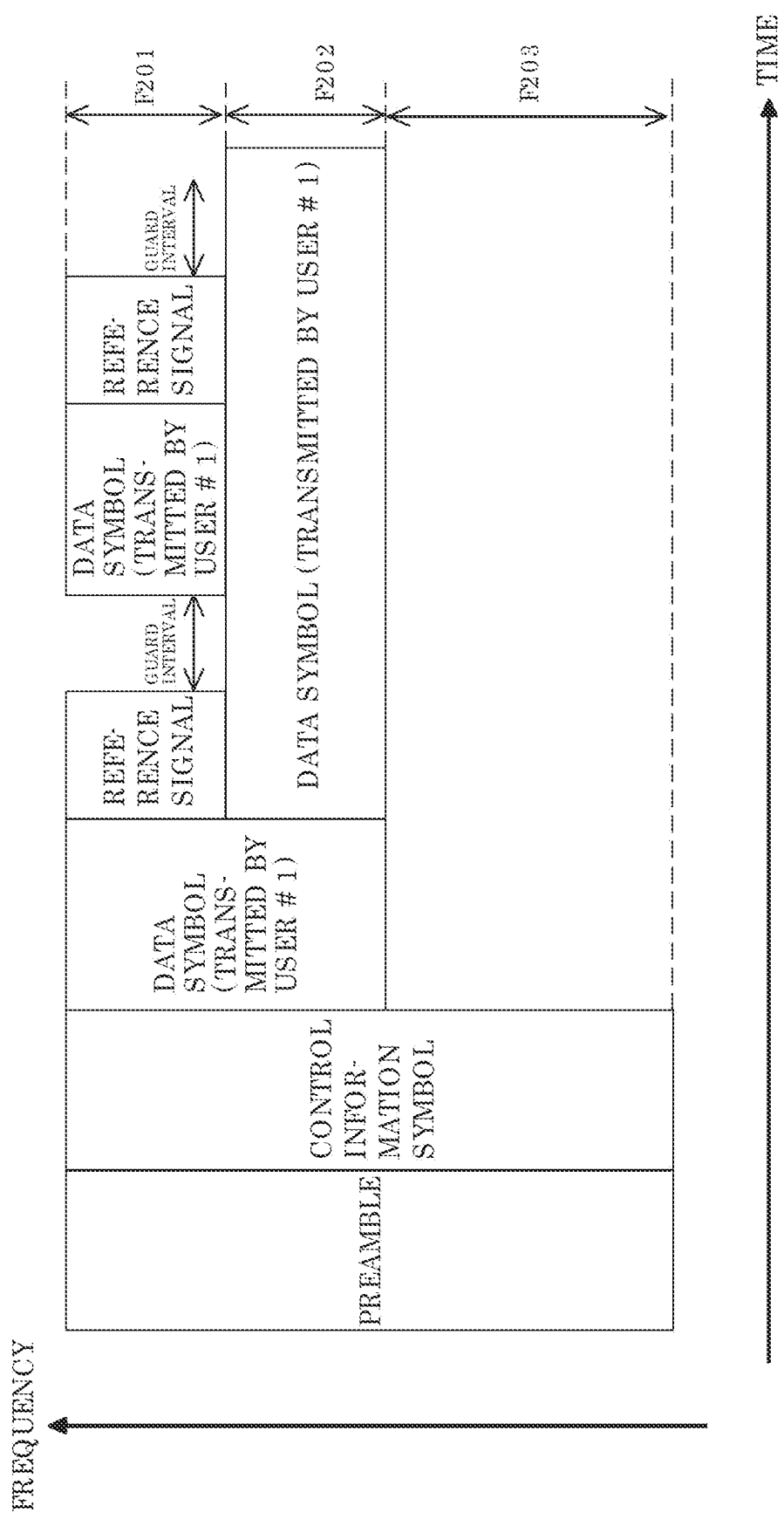
FIG. 36 illustrates one example of a configuration of a frame according to Embodiment 4.

The frame illustrated in FIG. 36 is an example of a configuration of a frame transmitted by a terminal, such as a configuration of a frame transmitted by a terminal possessed by user #1, and includes a preamble, a control information symbol, data symbols (transmitted by the terminal possessed by user #1), and reference signals. Data symbols (transmitted by the terminal possessed by user #1) are disposed in frequency bands F201 and F202. Frequency band F203 is not assigned to the terminal possessed by user #1. In frequency band F201, just like in frequency band F191 illustrated in FIG. 35, a reference signal and a guard interval are provided after a data symbol (transmitted by the terminal possessed by user #1), and another reference signal and another guard interval are also provided after the next data symbol (transmitted by the terminal possessed by user #1). Infrequency band F202, just like in frequency band F181 illustrated in FIG. 34, data symbols (transmitted by the terminal possessed by user #1) are disposed, and no reference signal or guard interval is provided. Note that frequency band F203 can be used by a terminal possessed by another user (a terminal other than user #1's terminal) to transmit data symbols and reference signals.

Figure 37:
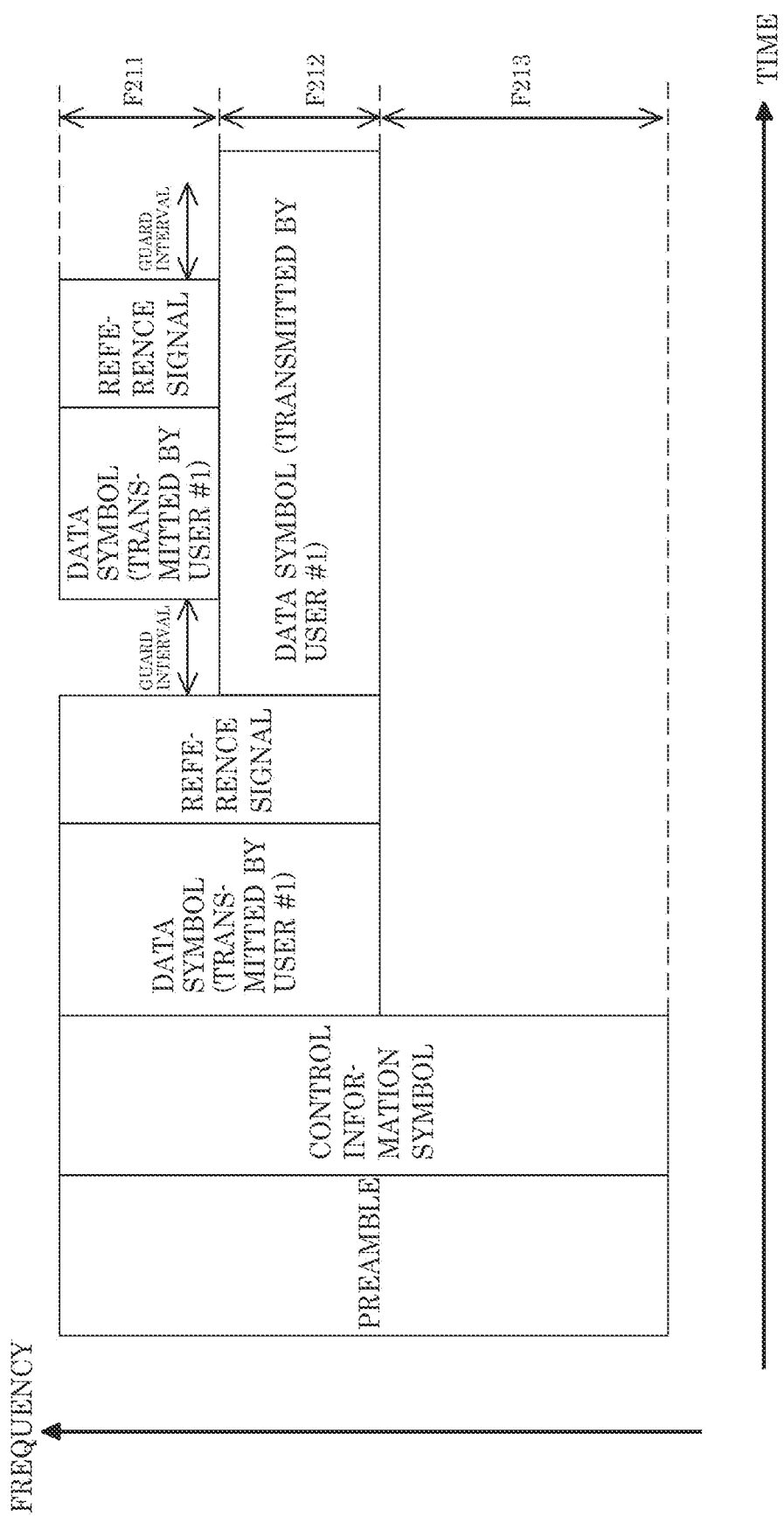
FIG. 37 illustrates one example of a configuration of a frame according to Embodiment 4.

The frame illustrated in FIG. 37 is an example of a configuration of a frame transmitted by a terminal, such as a configuration of a frame transmitted by a terminal possessed by user #1, and includes a preamble, a control information symbol, data symbols (transmitted by the terminal possessed by user #1), and reference signals. Data symbols (transmitted by the terminal possessed by user #1) are disposed in frequency bands F211 and F212. Frequency band F213 is not assigned to the terminal possessed by user #1. In frequency band F211, just like in frequency band F191 illustrated in FIG. 35, a reference signal and a guard interval are provided after a data symbol (transmitted by the terminal possessed by user #1), and another reference signal and another guard interval are also provided after the next data symbol (transmitted by the terminal possessed by user #1). Data symbols (transmitted by the terminal possessed by user #1) and a reference signal are disposed in frequency band F212. Note that frequency band F213 can be used by a terminal possessed by another user (a terminal other than user #1's terminal) to transmit data symbols and reference signals. One characteristic feature is that a high bandwidth reference signal and a low bandwidth reference signal are present. This improves the possibility that highly accurate sensing can be performed.

The apparatus according to the present embodiment may be an apparatus that is capable of performing processing for transmitting and receiving the frame illustrated in FIG. 19 or the frame illustrated in FIG. 20.

The apparatus according to the present embodiment may be an apparatus that is capable of performing processing for transmitting and receiving the frame illustrated in FIG. 19 and the frames illustrated in FIG. 22 through FIG. 37.

The apparatus according to the present embodiment may be an apparatus that is capable of performing processing for transmitting and receiving the frame illustrated in FIG. 20 and the frames illustrated in FIG. 22 through FIG. 37.

The apparatus according to the present embodiment may be an apparatus that is capable of performing processing for transmitting and receiving the frame illustrated in FIG. 19, the frame illustrated in FIG. 20, and the frames illustrated in FIG. 22 through FIG. 37.

Note that when the apparatus according to the present embodiment transmits, for example, the frames illustrated in FIG. 19 through FIG. 37, the apparatus according to the present embodiment may transmit the frames illustrated in FIG. 19 through FIG. 37 from a single antenna, and, alternatively, the apparatus according to the present embodiment may transmit the frames illustrated in FIG. 19 through FIG. 37 from a plurality of antennas.

Moreover, when the apparatus according to the present embodiment receives a modulated signal of the frames from FIG. 19 through FIG. 37, the apparatus according to the present embodiment may receive the signal of the frames from FIG. 19 through FIG. 37 using a single antenna, and alternatively, the apparatus according to the present embodiment may receive the signal of the frames from FIG. 19 through FIG. 37 using a plurality of antennas. Accordingly, the transmission scheme may be any one of single-input single-output (SISO), multiple-input single-output (MISO), single-input multiple-output (SIMO), and multiple-input multiple-output (MIMO).

This achieves the advantageous effect that an AP (or repeater) and terminal can implement sensing and communication.

As described above, the transmitting apparatus includes: a frame configuration unit configured to configure a frame conforming to orthogonal frequency-division multiple access (OFDMA) and including a plurality of time-frequency resources, each being a resource defined by time and frequency; and a transmitter configured to transmit the frame configured by the frame configuration unit over radio waves. The frame configuration unit is configured to configure, as the frame, a frame including a resource for communication and a resource for sensing, the resource for communication being a time-frequency resource in which a symbol including communication data is disposed, and the resource for sensing being a time-frequency resource in which a symbol for sensing via radio waves transmitted by the transmitter is disposed.

For example, the frame may include at least two of the resources for sensing, the at least two resources for sensing being defined by different times and a same frequency, and disposed temporally adjacent to one another with a guard interval therebetween. For example, reference signals in frequency band F142 illustrated in FIG. 30 correspond to the at least two resources for sensing.

For example, the frame may include two guard intervals of different lengths of time and different frequencies. For example, the guard interval in frequency band F171 and the guard interval in frequency band F172 illustrated in FIG. 33 correspond to the two guard intervals.

For example, the frame may include at least two of the resources for sensing, the at least two resources for sensing being of different frequencies and different lengths of time. For example, reference signal in frequency band F171 and the reference signal in frequency band F172 illustrated in FIG. 33 correspond to the at least two resources for sensing.

Furthermore, the sensing processing may include at least one of processing of detecting a position of an object, processing of detecting presence or absence of an object, or processing of detecting a shape of an object, by analyzing the reflected wave received by the receiver.

Embodiment 5

In the present embodiment, a control system that uses the detecting apparatus and the like described in Embodiments 1 through 4 to control operation of a device will be described.

The detecting apparatus according to the present embodiment further includes a controller that controls the driving of an electronic device based on a result of sensing processing performed by a processor. The control system according to the present embodiment includes the detecting apparatus and the electronic device.

Figure 38:
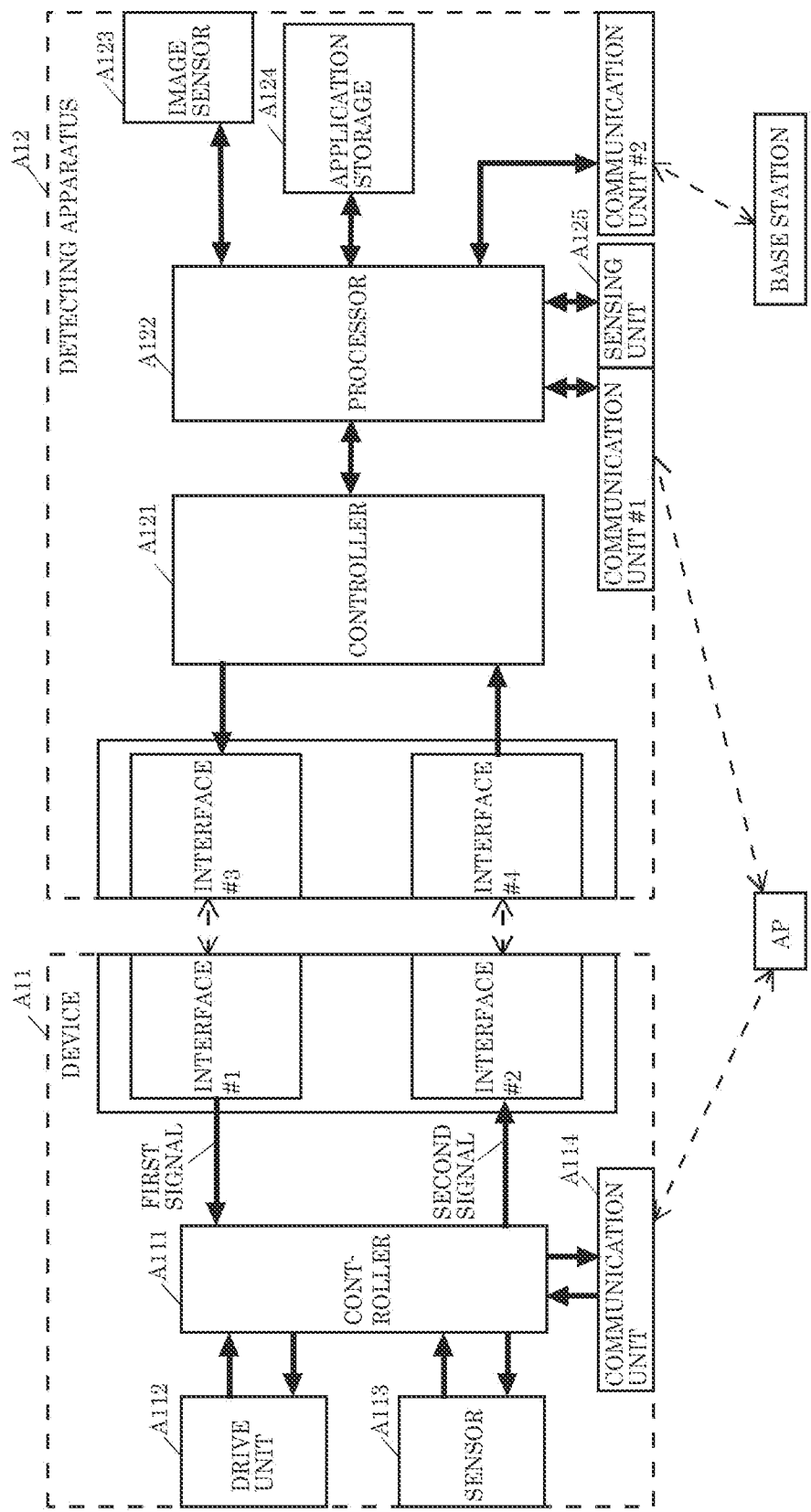
FIG. 38 illustrates one example of a configuration of a control system according to Embodiment 5.

FIG. 38 illustrates one example of a configuration of the control system according to the present embodiment.

The control system illustrated in FIG. 38 includes device A11 and detecting apparatus A12. In this example, device A11 is an electronic device that can operate under control from apparatuses included in device A11, and examples of device A11 include an electric motorcycle, an electric kick scooter, a vacuum cleaner, and an electric automobile. Detecting apparatus A12 is an information processing apparatus such as a smartphone or tablet.

Device A11 includes interface #1, interface #2, controller A111, drive unit A112, sensor A113, and communication unit A114.

Interface #1 and interface #2 are interface apparatuses for communicating with detecting apparatus A12. In the example illustrated in FIG. 38, interface #1 and interface #2 are interfaces that communicate without the aid of an intervening apparatus such as a repeater apparatus. Note that the communication in this case may be wireless communication, such as Bluetooth (registered trademark), wireless LAN, or optical communication or the like, and may be wired communication, such as universal serial bus (USB) or power line communication (PLC) or the like. Moreover, unlike the example illustrated in FIG. 38, an intervening device such as a repeater may be provided. Interface #1 receives a signal from interface #3 included in detecting apparatus A12 (this signal is also referred to as a first signal). Interface #2 transmits a signal to interface #4 included in detecting apparatus A12 (this signal is also referred to as a second signal). Note that interface #1 may receive a supply of power from detecting apparatus A12.

Controller A111 is a processor that controls the driving of drive unit A112 and controls sensor A113. Controller A111 receives a signal from detecting apparatus A12 via interface #1, and controls the driving of drive unit A112 and controls sensor A113 based on the received signal. Controller A111 also obtains information indicating, for example, the states of drive unit A112 and sensor A113, and transmits this information to detecting apparatus A12 via interface #2. Note that controller A111 may obtain, via communication unit A114, a software program for operating controller A111.

Drive unit A112 is a processor that drives device A11. For example, drive unit A112 includes a wheel for moving device A11, a steering apparatus for controlling the direction of the wheel, and an acceleration apparatus or a braking device for controlling the rotational speed of the wheel. Drive unit A112 may further include a battery or the like as a power source for driving the wheel. Drive unit A112 increases or decreases the movement speed of, or changes the movement direction of device A11 by operating under control by controller A111. Drive unit A112 also outputs information indicating, for example, the state of drive unit A112 to controller A111.

Sensor A113 is a sensor that performs sensing in the surrounding area of device A11. For example, sensor A113 is a sensor that measures, for example, temperature, humidity, or illuminance, or a distance sensor that measures distance to an object in the surrounding area. Sensor A113 operates under control by controller A111, and outputs a sensor value or the like to controller A111.

Communication unit A114 is a communication interface that wirelessly communicates with an access point (AP). Although an AP is exemplified above, this may be a base station or communication apparatus or the like instead.

Detecting apparatus A12 includes interface #3, interface #4, controller A121, processor A122, image sensor A123, application storage A124, communication unit #1, communication unit #2, and sensing unit A125.

Interface #3 and interface #4 are interface apparatuses for communicating with device A11. In the example illustrated in FIG. 38, interface #3 and interface #4 are interfaces that communicate without the aid of an intervening apparatus such as a repeater apparatus. Note that the communication in this case may be wireless communication, such as Bluetooth (registered trademark), wireless LAN, or optical communication or the like, and may be wired communication, such as USB or PLC or the like. Moreover, unlike the example illustrated in FIG. 38, an intervening device such as a repeater may be provided. Interface #3 transmits a signal to interface #1 of device A11. Interface #4 receives a signal from interface #2 of device A11. Note that interface #3 may supply power to device A11.

Controller A121 is a processor that controls operation of device A11. For example, controller A121 obtains, from device A1 via interface #4, a sensor value obtained from sensor A113 or information indicating, for example, the state of drive unit A112, and based on the obtained sensor value or information, generates a signal for controlling the driving of drive unit A112 and/or controlling controller A111. Controller A121 transmits the generated signal to device A11 via interface #3, and, for example, controls controller A111 and/or controls drive unit A112.

Next, another method will be described. Controller A121 is a processor that controls operation of device A11. Controller A121 obtains, via processor A122, a sensor value obtained by sensing unit A125, and based on the obtained sensor value, generates a signal for controlling the driving of drive unit A112 and/or controlling controller A111. Note that controller A121 may use information obtained from drive unit A112 and/or sensor A113 when generating the signal for controlling the driving of drive unit A112 and/or controlling controller A111. Controller A121 transmits the generated signal to device A11 via interface #3, and, for example, controls controller A111 and/or controls drive unit A112.

Processor A122 is a computing apparatus that performs information processing in detecting apparatus A12. Processor A122 is configured as, for example, a CPU.

Image sensor A123 is a sensor that captures and generates an image of the surrounding area of detecting apparatus A12. Image sensor A123 supplies the data of the generated image to processor A122.

Application storage A124 is a storage apparatus that stores an application (software program) for controlling device A11 or detecting apparatus A12. Application storage A124 obtains the application (software program) via, for example, communication unit #1 or communication unit #2.

Note that when the accuracy of control carried out by controller A121 is improved as a result of an application update, it is possible to achieve the advantageous effect that safety related to the driving of the system of device A11 and detecting apparatus A12 can be improved.

Communication unit #1 is a communication interface that wirelessly communicates with an access point (AP).

Communication unit #2 is a communication interface that wirelessly communicates with a base station of a mobile telephone carrier network.

Sensing unit A125 is a processor that performs sensing using radio waves for communication. Sensing unit A125 recognizes an object in the surrounding area of detecting apparatus A12. More specifically, sensing unit A125 detects a person, vehicle, automobile, or obstacle or the like in the surrounding area of detecting apparatus A12, and recognizes an action made by the object. Sensing unit A125 may be configured to transmit radio waves on the same frequency as communication unit #1.

In the control system illustrated in FIG. 38, detecting apparatus A12 may be mounted to device A11, and, alternatively, device A11 may be disposed in a location distanced from detecting apparatus A12.

When detecting apparatus A12 is mounted to device A11, device A11 is controlled by signals transmitted and received via communication unit A114 or interfaces #1 or #2.

For example, when device A11 is controlled via interface #1 or interface #2, when device A11 is used when the user is outside his or her home, detecting apparatus A12 can be mounted to device A11.

Moreover, for example, when device A11 is controlled via communication unit A114, device A11 is controlled based on a signal transmitted from detecting apparatus A12 via an access point (AP). However, when device A11 is controlled via communication unit A114, there is a possibility of a functionality restriction. Note that when device A11 communicates with detecting apparatus A12 via communication unit A114, device A11 may communicate with communication unit #1 of detecting apparatus A12 directly, without the aid of an intervening access point (AP).

With this configuration, by updating the application on the detecting apparatus A12 side, it is possible to update functionality and update the control algorithm. This achieves the advantageous effect that it is possible to provide new functionality via an application update.

Moreover, by installing a new application in detecting apparatus A12, it is possible to use a device such as a smartphone or tablet which previously could not be used to control a conventional device A11, to control the conventional device A11. This configuration makes it possible use to an already existing device to control device A11. As a result, it is possible to use an unused device that is not being used, which makes it possible to achieve the advantageous effect that it is possible to utilize wasted resources such as the CPU, GPU, memory, storage, modem, and/or display of an unused device.

Note that firmware or an application can be updated on the device A11 side in addition to the detecting apparatus A12 side as well. This configuration makes it possible to provide new functionality that cannot be provided by updating an application on the detecting apparatus A12 side alone, or when a security problem is found on the device A11, quickly address the security problem by providing device A11 with firmware or an application removed of the security problem. An application is obtained from an external apparatus such as a cloud server via communication unit #1 and/or communication unit #2.

Next, an example of a configuration of a control system that controls device A11 when detecting apparatus A12 is mounted to device A11 and the user is outside his or her home will be given.

Figure 39:
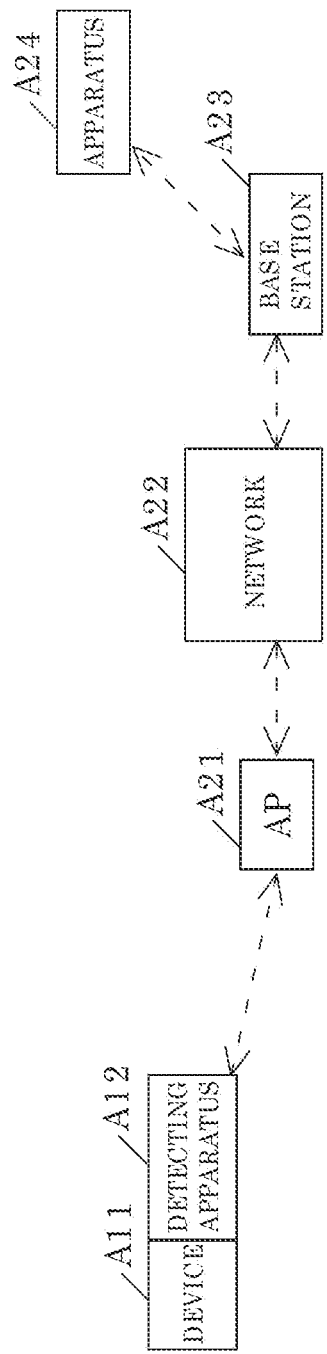
FIG. 39 illustrates one example of a configuration of the control system according to Embodiment 5.

FIG. 39 illustrates one example of a configuration of the control system according to the present embodiment.

The control system illustrated in FIG. 39 includes device A11, detecting apparatus A12, AP A21, network A22, base station A23, and apparatus A24.

Device A11 and detecting apparatus A12 transmit and receive signals via interface #1, interface #2, interface #3, and interface #4. Details regarding the configuration are as described above.

AP A21 is an access point that can connect to communication unit #1 of detecting apparatus A12.

Network A22 is a network that is connected to AP A21 and base station A23. Network A22 may include part of a mobile phone carrier network or part of the internet. Network A22 may be connected to a cloud including a server that executes information processing.

Base station A23 is, for example, a base station apparatus that is connected to a mobile phone carrier network, and is connected to apparatus A24.

Apparatus A24 is, for example, a portable information processing apparatus possessed by the user, such as a smartphone or tablet.

In the control system, detecting apparatus A12 is communicably connected to apparatus A24 via AP A21, network A22, and base station A23, using communication unit #1.

For example, device A11, one example of which is a vacuum cleaner, detecting apparatus A12 is connected to device A11 via interface #1, interface #2, interface #3, and interface #4. For example, apparatus A24 accesses detecting apparatus A12 mounted to device A11 via one or more networks, and controls device A11 via detecting apparatus A12.

One characterizing feature of the control system is that device A11 is controlled using data obtained by sensing using sensing unit A125 included in detecting apparatus A12. This configuration enables the use of data obtained by sensing using a sensor that is not included in device A11 to control device A11. This makes it possible to realize functionality that could not be realized with device A11 alone.

Moreover, by device A11 obtaining, via interface #1 and/or interface #2, data obtained by sensing using sensing unit A125 included in detecting apparatus A12, security can be improved compared to when data is obtained over a network via communication unit A114, and it is possible to provide functionality that could not be provided if there were security restrictions.

One characterizing feature of the control system is that device A11 is controlled via detecting apparatus A12 mounted to device A11. This configuration allows detecting apparatus A12 to determine whether or not to receive an instruction for control transmitted from apparatus A24. For example, by performing processing for, for example, authentication between apparatus A24 and detecting apparatus A12, security against unauthorized access can be improved.

Furthermore, as described above, when the accuracy of control carried out by controller A121 is improved as a result of an application in application storage A124 being updated, it is possible to achieve the advantageous effect that safety related to the driving of the system of device A11 and detecting apparatus A12 can be improved.

Figure 40:
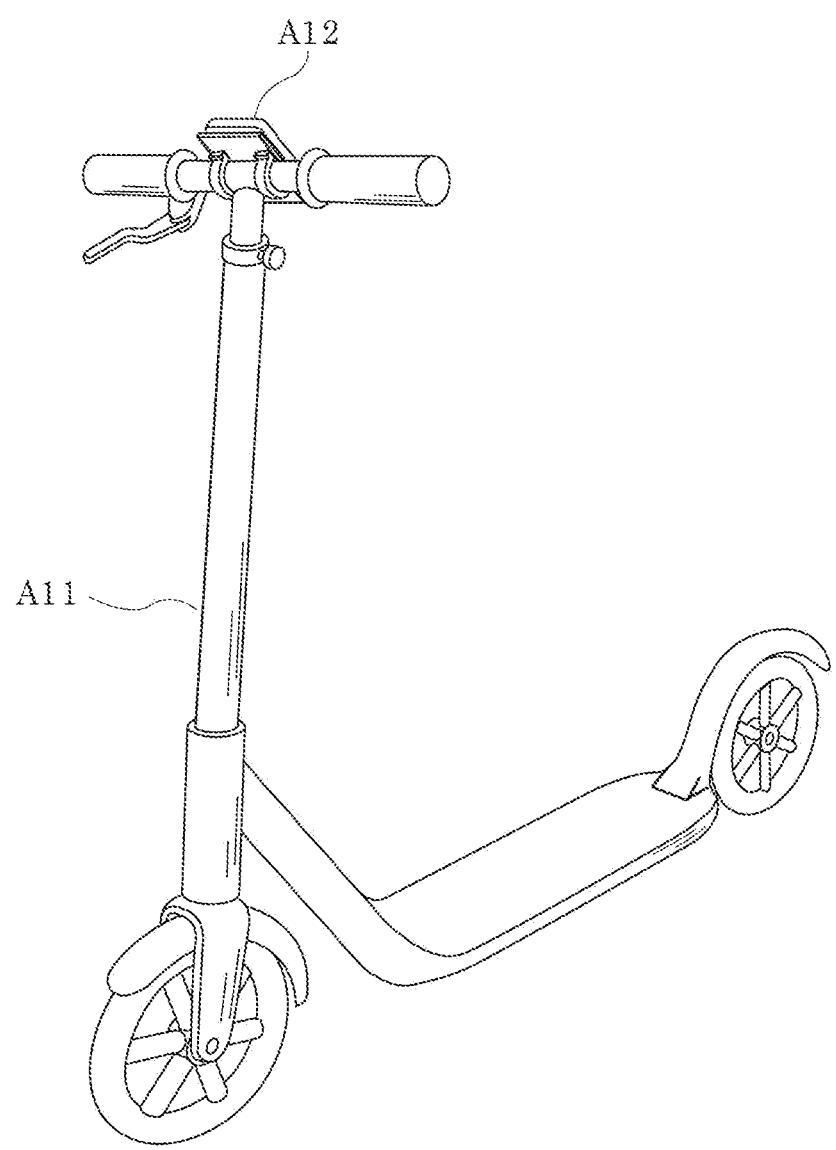
FIG. 40 illustrates one example of an external appearance of the control system according to Embodiment 5.

FIG. 40 illustrates one example of an external appearance of the control system according to the present embodiment.

The control system illustrated in FIG. 40 includes detecting apparatus A12 mounted to an electric kick scooter that corresponds to device A11. Detecting apparatus A12 controls, for example, the acceleration and deceleration of device A11 based on a sensing result of sensing unit A125.

The electric kick scooter may be enabled to control drive unit A112 in accordance with an input from the user made using an input unit for operation input on the device A11 (i.e., electric kick scooter) side or the detecting apparatus A12 side.

Controller A121 controls drive unit A112 to perform operations such as increasing the speed of device A11 (i.e., the electric kick scooter) or changing the direction of travel. Controller A121 may control drive unit A112 to reduce the speed of device A11. The speed of device A11 may be reduced by the use of a brake or the use of braking force by a generator or the like.

Here, controller A121 may control drive unit A112 in accordance with an input from the input unit, and may control drive unit A112 based on sensing data obtained from device A11 and/or sensing unit A125.

For example, sensing unit A125 performs sensing using radio waves. Note that the sensing method using radio waves has already been described in another embodiment. For example, assume sensing unit A125 performs sensing, and detects a person. Based on information indicating "person detected" obtained from sensing unit A125, controller A121 transmits a control signal including information indicating to decelerate to device A11 via interface #3 and interface #4. Accordingly, controller A1 and drive unit A112 included in device A11 perform control of decelerating.

Assume sensing unit A125 performs sensing using radio waves and detects that there is no obstacle ahead. Based on information indicating "no obstacle" obtained from sensing unit A125, controller A121 transmits a control signal including information indicating to accelerate and then continue travelling at a constant speed to device A11 via interface #3 and interface #4. Accordingly, controller A111 and drive unit A112 included in device A11 perform control of accelerating and then continuing to travel at a constant speed.

Assume sensing unit A125 performs sensing using radio waves and detects an obstacle to the right. Based on information indicating "obstacle to the right" obtained from sensing unit A125, controller A121 transmits a control signal including information indicating to operate so as to avoid the obstacle to device A11 via interface #3 and interface #4. Accordingly, controller A111 and drive unit A112 included in device A11 perform control of operating so as to avoid an obstacle.

Next, another operation example will be given. Sensing unit A125 may perform sensing using radio waves, and based on information indicating the result of the sensing, controller A121 may estimate its own position or perform obstacle detection, and output a control signal for performing control of accelerating or decelerating. In this example, controller A121 is capable of estimating its own position or performing obstacle detection using image information obtained from image sensor A123 and information obtained from sensor A113. Controller A121 transmits this control signal to device A11 via interface #3 and interface #4. Accordingly, controller A111 and drive unit A112 included in device A11 perform control based on a control signal.

As yet another example of control based on sensing data obtained from sensing unit A125, controller A121 detects an action of a user based on speed or acceleration data obtained by a speed sensor or an acceleration sensor, and performs control of acceleration or deceleration. In this example, the action of the user detected using sensing unit A125 is the act of the user kicking the ground, but the action is not limited to this example. For example, the action may be the user shifting the center of gravity of his or her body, and may be the orientation of the users face or the user changing the orientation of his or her face. In this example, a sensor that can be used as sensing unit A125 may be a weight sensor or wireless radar.

By performing such control, it is possible to achieve the advantageous effect of an improvement in the safety of the user.

Figure 41:
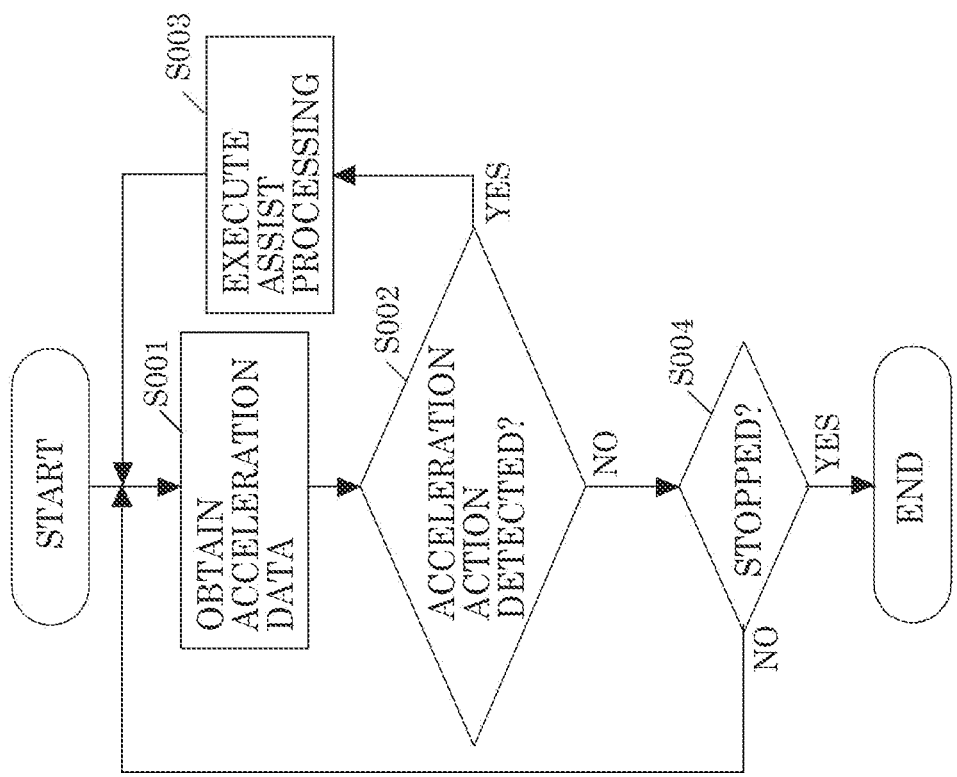
FIG. 41 illustrates one example of processes performed by of the control system according to Embodiment 5.

FIG. 41 illustrates one example of processes performed by the control system according to the present embodiment. One example of control in the above examples of control operations performed by controller A121 will be given with reference to this flow chart.

At the point in time that a user instructs start of a control operation via a switch or button, at the point in time that the user turns on the power of device A11, at the point in time that the user attaches detecting apparatus A12 to device A11, or at the point in time of detection of the user mounting the kick scooter that device A11 is embodied as, device A11 starts the control operation depicted in the flow chart.

In step S001, when controller A121 starts the control operation, controller A121 obtains acceleration data from sensor A113 included in device A11 or sensing unit A125 included in detecting apparatus A12.

In step S002, controller A121 performs detection for an acceleration action of device A11 from the acceleration data. When an acceleration action is detected (yes in step S002), processing proceeds to step S003, and when an acceleration action is not detected (no in step S002), processing proceeds to step S004.

In step S003, controller A121 controls drive unit A112, and executes assist processing such as revving the motor and generating an accelerating force in the direction of travel. For example, the generation of acceleration force may be performed across a span of a determined amount of time to further increase acceleration at the point in time of determination that acceleration was performed based on the acceleration data, or may be performed so as to maintain speed across a span of a determined amount of time at the point in time that acceleration is completed after being performed or at the point in time that deceleration begins after acceleration being performed. When the assist processing of step S003 completes, processing returns to step S001.

In step S004, controller A121 determines whether to end control of drive unit A112 or not, ends processing if determining to end control of drive unit A112, and returns to step S001 if determining to not end control of drive unit A112. In regard to the determination of whether to end control of drive unit A112 or not, for example, controller A121 may determine to end control of drive unit A112 when device A11 has come to a complete stop, and may determine to end control of drive unit A112 when the user has powered device A11 off, when the user has detached detecting apparatus A12 from device A11, or when it is detected that the user has gotten off the kick scooter that device A11 is embodied as.

Next, another operation pertaining to FIG. 41 will be described. At the point in time that a user instructs start of a control operation via a switch or button, at the point in time that the user turns on the power of device A11, at the point in time that the user attaches detecting apparatus A12 to device A11, or at the point in time of detection of the user mounting the kick scooter that device A11 is embodied as, device A11 starts the control operation depicted in the flow chart.

In step S001, when controller A11 starts the control operation, controller A121 obtains acceleration data from sensor A113 included in device A11.

In step S002, controller A111 performs detection for an acceleration action of device A11 from the acceleration data. When an acceleration action is detected (yes in step S002), processing proceeds to step S003, and when an acceleration action is not detected (no in step S002), processing proceeds to step S004.

In step S003, controller A111 controls drive unit A112, and executes assist processing such as revving the motor and generating an accelerating force in the direction of travel. For example, the generation of acceleration force may be performed across a span of a determined amount of time to further increase acceleration at the point in time of determination that acceleration was performed based on the acceleration data, or may be performed so as to maintain speed across a span of a determined amount of time at the point in time that acceleration is completed after being performed or at the point in time that deceleration begins after acceleration being performed. When the assist processing of step S003 completes, processing returns to step S001.

In step S004, controller A111 determines whether to end control of drive unit A112 or not, ends processing if determining to end control of drive unit A112, and returns to step S001 if determining to not end control of drive unit A112. In regard to the determination of whether to end control of drive unit A112 or not, for example, controller A111 may determine to end control of drive unit A112 when device A11 has come to a complete stop, and may determine to end control of drive unit A112 when the user has powered device A11 off, when the user has detached detecting apparatus A12 from device A11, or when it is detected that the user has gotten off the kick scooter that device A11 is embodied as.

By assisting acceleration based on an action of the user, it is possible to carry out minute control in accordance with the user's action, which makes it possible to achieve the advantageous effect of improved safety since unintended acceleration can be prevented.

Embodiment 6

In the present embodiment, another aspect of the configuration and processes performed by the transmitting apparatus according to the above embodiment will be described.

Figure 42:
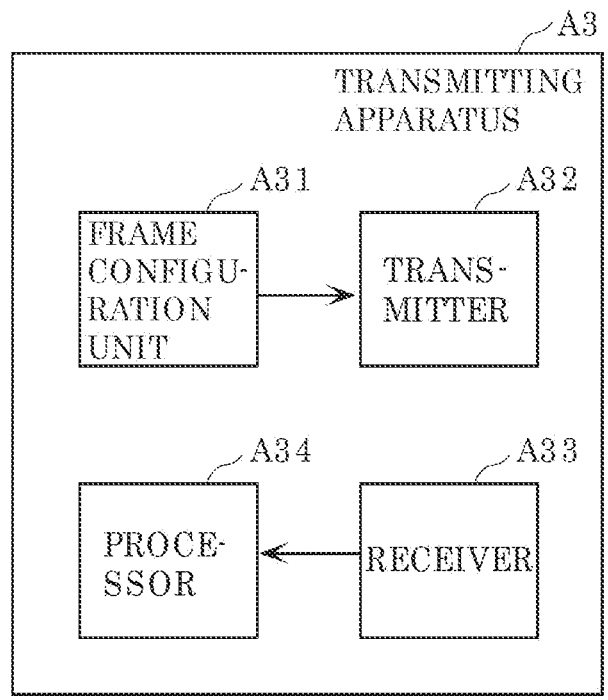
FIG. 42 illustrates one example of a configuration of a transmitting apparatus according to Embodiment 6.

FIG. 42 illustrates one example of a configuration of transmitting apparatus A3 according to Embodiment 6.

As illustrated in FIG. 42, transmitting apparatus A3 includes frame configuration unit A31, transmitter A32, receiver A33, and processor A34.

Frame configuration unit A31 configures a frame that conforms to a single carrier scheme, a multi-carrier scheme such as OFDM, or an orthogonal frequency-division multiple access (OFDMA) scheme, and includes a plurality of time-frequency resources which are resources defined by time and frequency.

Frame configuration unit A31 configures, as the frame, a frame including a resource for communication and a resource for sensing, the resource for communication being a time-frequency resource in which a symbol including communication data is disposed, and the resource for sensing being a time-frequency resource in which a symbol for sensing via radio waves transmitted by transmitter A32 is disposed.

Transmitter A32 transmits the frame configured by frame configuration unit A31 over radio waves.

Figure 43:
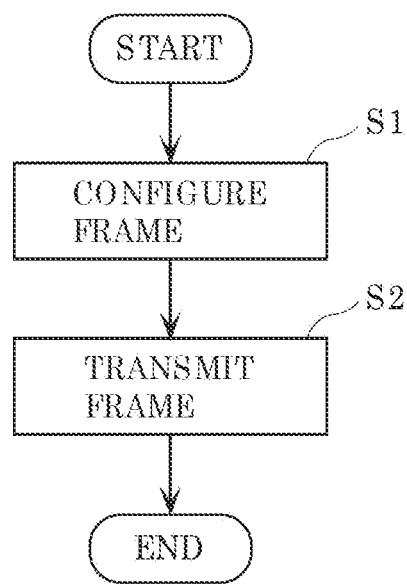
FIG. 43 illustrates one example of processes performed by the transmitting apparatus according to Embodiment 6.

FIG. 43 illustrates one example of processes performed by the transmitting apparatus according to Embodiment 6.

As illustrated in FIG. 43, in step S1 (frame configuration step), a frame is configured that conforms to a single carrier scheme, a multi-carrier scheme such as OFDM, or an OFDMA scheme, and includes a plurality of time-frequency resources which are resources defined by time and/or frequency. Here, in the frame configuration step, the frame that is configured includes a resource for communication and a resource for sensing, the resource for communication being a time-frequency resource in which a symbol including communication data is disposed, and the resource for sensing being a time-frequency resource in which a symbol for sensing via radio waves transmitted in a transmitting step.

In step S2 (transmitting step), the frame configured in the frame configuration step is transmitted over radio waves.

This makes it possible for the transmitting apparatus to perform sensing in the surrounding area.

Embodiment 7

In the present embodiment, a specific implementation example of an apparatus that can perform sensing will be given.

Figure 44:
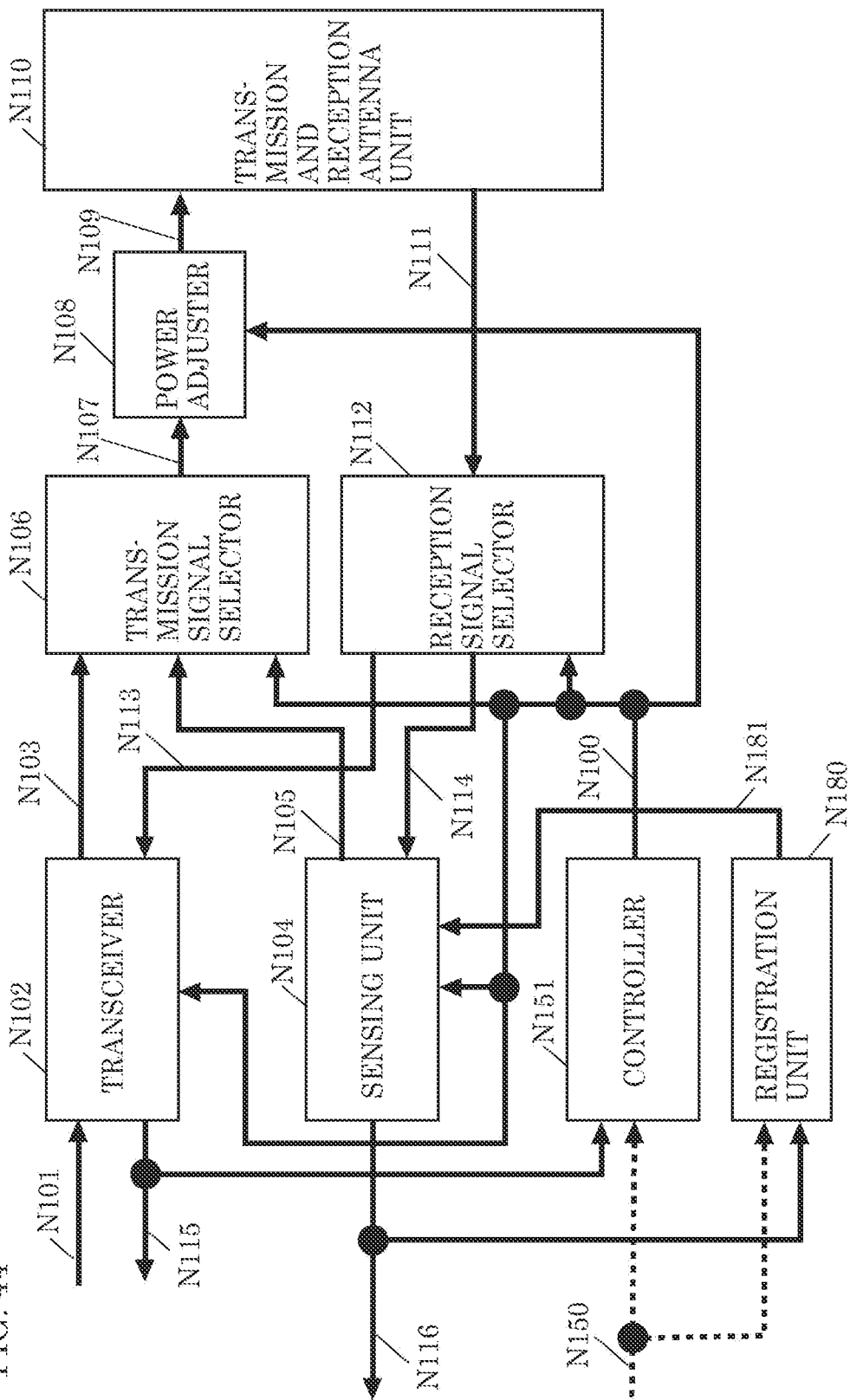
FIG. 44 illustrates one example of a configuration of an apparatus according to Embodiment 7.

FIG. 44 illustrates one example of a configuration of an apparatus having both a communication function and a sensing function.

Transceiver N102 receives inputs of data N101 and control signal N100. When control signal N100 indicates to implement communication, transceiver N102 performs processing on data N101 such as error correction coding, modulation and the like, and outputs modulated signal N103. When control signal N100 indicates to implement sensing, transceiver N102 does not operate.

Sensing unit N104 receives an input of control signal N100, and when control signal N100 indicates to implement sensing, sensing unit X204 outputs signal for sensing N105. When control signal N100 indicates to implement communication, sensing unit N104, for example, does not operate.

Sensing unit N104 receives an input of signal N181 related to an operation, determines a sensing operation based on signal N181 related to an operation, and performs an operation based on that determination. This will be described in greater detail later.

Transmission signal selector N106 receives inputs of control signal N100, modulated signal N103, and signal for sensing N105. When control signal N100 indicates to implement communication, transmission signal selector N106 outputs modulated signal N103 as selected signal N107. When control signal N100 indicates to implement sensing, transmission signal selector N106 outputs signal for sensing N105 as selected signal N107.

Power adjuster N108 receives inputs of selected signal N107 and control signal N100. When control signal N100 indicates to implement communication, power adjuster N108 performs power adjustment for communication on selected signal N107 (for example, the coefficient that selected signal N107 is multiplied by is a), and outputs transmission signal N109.

When control signal N100 indicates to implement sensing, power adjuster N108 performs power adjustment for communication on selected signal N107 (for example, the coefficient that selected signal N107 is multiplied by is B), and outputs transmission signal N109.

Note that $\alpha$ and $\beta$ are, for example, real numbers that are greater than or equal to 0. In this example, $\alpha > \beta$ ($\alpha$ is greater than $\beta$). This makes it possible to achieve the advantageous effects that transmission power can be reduced when sensing is performed, which inhibits sensing through walls for example and increase the probability that privacy can be maintained, and that when communication is performed, high data reception quality can be achieved.

Note that $\alpha$ and $\beta$ may be complex numbers. In such cases, $|\alpha| > |\beta|$. Here as well, it possible to achieve the advantageous effects that transmission power can be reduced when sensing is performed, which inhibits sensing through walls for example and increase the probability that privacy can be maintained, and that when communication is performed, high data reception quality can be achieved.

Transmission signal N109 is then output from transmission and reception antenna unit N110 as radio waves.

Note that power adjuster N108 may be omitted. In such cases, selected signal N107 is output from transmission and reception antenna unit N110 as radio waves.

Transmission and reception antenna unit N110 outputs reception signal N111. Reception signal selector N112 receives inputs of control signal N100 and reception signal N111. When control signal N100 indicates to implement communication, reception signal selector N112 outputs reception signal N111 as signal N113.

When control signal N100 indicates to implement sensing, reception signal selector N112 outputs reception signal N111 as signal N114.

Transceiver N102 receives inputs of control signal N100 and signal N113. When control signal N100 indicates to implement communication, transceiver N102 performs processing such as demodulation and error correction decoding on signal N113, and outputs reception data N115.

Sensing unit N104 receives inputs of control signal N100 and signal N114. When control signal N100 indicates to implement sensing, sensing unit N104 performs sensing using signal N114 and the like, and outputs sensing result N116.

Controller N151 generates and outputs control signal N100 based on external signal N150 and reception data N115 and the like.

Controller N151 generates and outputs control signal N100 based on external signal N150 and reception data N115 and the like.

Registration unit N180 receives inputs of external signal N150 and sensing result N116. For example, when external signal N150 indicates to perform an operation for registering an operation, registration unit N180 outputs signal N181 related to an operation that includes information indicating to implement the operation registration.

When signal N181 related to an operation includes information indicating to implement the operation registration, sensing unit N104 generates and outputs a signal for sensing N105 for sensing, for example, a target gesture.

This signal for sensing N105 is then transmitted as radio waves. An apparatus capable of sensing then receives the signal, sensing unit N104 performs sensing estimation on the received signal, and outputs sensing result N116.

Registration unit N180 registers sensing result N116.

Hereinafter, detailed examples will be given.

Example 1

In his or her home, a first person takes out a device capable of sensing, or an apparatus capable of sensing that includes communication functionality, and loses it somewhere. Here, "a device capable of sensing, or an apparatus capable of sensing that includes communication functionality" will be referred to as apparatus #A. Detailed examples of apparatus #A have already been given above.

The first person desires an easy way to search for the lost apparatus #A. Hereinafter, an example of an operation that addresses this desire will be given.

Figure 45:
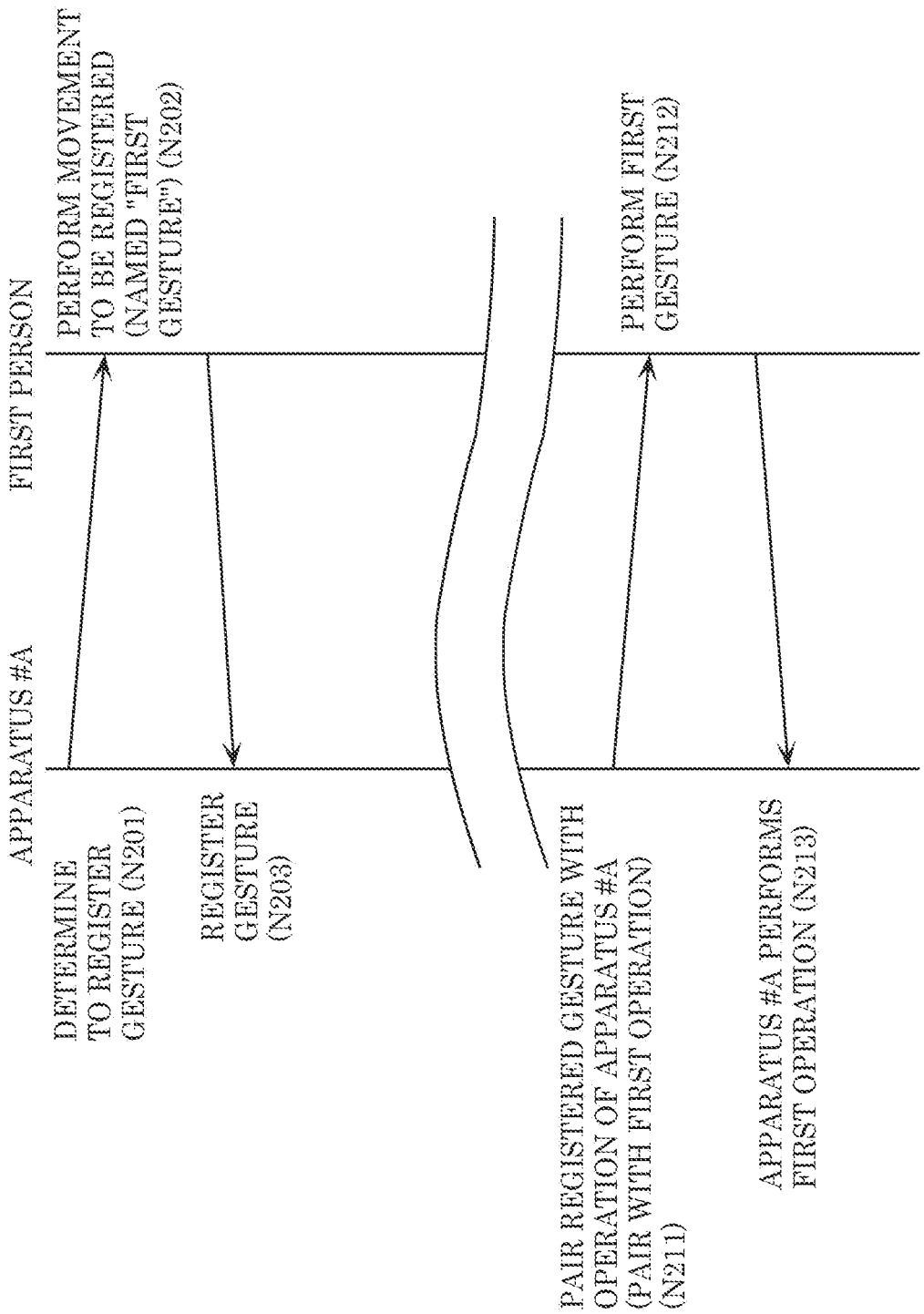
FIG. 45 illustrates one example of a relation between an apparatus and a person according to Embodiment 7.

FIG. 45 illustrates an example of the relationship between apparatus #A and the first person. As illustrated in FIG. 45, first, apparatus #A determines to register a gesture (N201). Accordingly, apparatus #A transmits a signal for sensing.

In response, the first person performs a movement to be registered in apparatus #A (N202). This gesture is referred to as a first gesture.

Apparatus #A then registers the first gesture (N203). Apparatus #A may be equipped with a function for confirming whether the gesture was correctly registered or not. Apparatus #A may also be equipped with a function for editing a registered gesture. For example, the first person may use these functions to correctly register the first gesture in apparatus #A.

Next, a registered gesture (for example, the first gesture) and an operation of apparatus #A are paired (N211). As one example, when a person who cannot find apparatus #A performs the first gesture, apparatus #A performs an operation of emitting a sound or vibrating. For example, the above operation of emitting a sound or vibrating is referred to as a first operation. Note that apparatus #A registers the content associated (paired) with the first operation.

Thereafter, apparatus #A implements sensing periodically, regularly, or irregularly.

Then, for example, since the first person lost apparatus #A, first person performs the first gesture (N212). Although the person who performs the first gesture is exemplified as the first person, some other person may perform the first gesture.

In response, apparatus #A recognizes the first gesture through sensing, and performs the first operation (N213).

This makes it possible to achieve the advantageous effect that it is possible to easily find apparatus #A. This also has the advantageous effect that the person is not required to have a special device.

Next, a method for preventing false recognition of a gesture will be given.

As described above, apparatus #A can register a gesture performed by a person via steps N201, N202, and N203 illustrated in FIG. 45. Assume apparatus #A registers a plurality of gestures using this method. For example, apparatus #A registers a first gesture, a second gesture, a third gesture, and a fourth gesture.

However, as described above, apparatus #A emits a sound or vibrates as a result of a person merely performing the first gesture, so there is a possibility that apparatus #A will emit a sound or vibrate even when a person inadvertently performs a first gesture (hereinafter this is referred to as a false operation).

To prevent such a false operation, a method of pairing a plurality of gestures with an operation of apparatus #A may be employed.

For example, the first person registers, in apparatus #A, that apparatus #A is to perform an operation of emitting a sound or vibrating when a first gesture and a fourth gesture registered in apparatus #A are performed successively.

With this configuration, when the first person performs the first gesture and the fourth gesture, apparatus #A recognizes these gestures and emits a sound or vibrates.

By using a combination of plurality of gestures, there is a lower probability that a person other than the first person who registered the gestures will perform the combination of gestures by chance, which makes it possible to achieve the advantageous effect that apparatus #A performing false operation can be drastically reduced.

Note that the number of gestures registered in apparatus #A is not limited to the above example; the same advantageous effects can be achieved so long as a plurality of gestures are registered. The number of gestures used in a combination is also not limited to the above example; it is sufficient so long as a combination of a plurality of gestures is paired with an operation of the apparatus #A.

Note that the number of gestures registered in apparatus #A is not limited to the above example; the same advantageous effects can be achieved so long as a plurality of gestures are registered. The number of gestures used in a combination is also not limited to the above example; it is sufficient so long as a combination of a plurality of gestures is paired with an operation of the apparatus #A. In the above example, the operation performed by apparatus #A is exemplified as emitting a sound or vibrating, but the pairing of a plurality of gestures with an operation of an apparatus is not limited to this example. As will be described later, a plurality of gestures may be paired with an operation of an apparatus (terminal) using FIG. 46 through FIG. 49.

Although the above exemplifies the operation performed by apparatus #A when a person performs a plurality of gestures and apparatus #A recognizes these plurality of gestures as emitting sound or vibrating, the operation is not limited to this example; an apparatus (terminal) may operate as will be described later by way of example with reference to FIG. 46 through FIG. 49.

In FIG. 45, a gesture is registered, and then the gesture and an operation of apparatus #A are paired, but the procedure is not limited to this order; an operation of apparatus #A may be specified, and then a gesture to be paired may be registered. Moreover, a gesture to be paired with an operation of apparatus #A may be a gesture that is (already) provided in the apparatus #A. The important point here is that one or a plurality of gestures is paired with an operation of terminal #A.

Example 2

In Example 1, a gesture is paired with an operation performed by apparatus #A such as emitting sound or vibrating, but in this example, a gesture is paired with an operation related to a communication function of apparatus #A (terminal #A).

Figure 46:
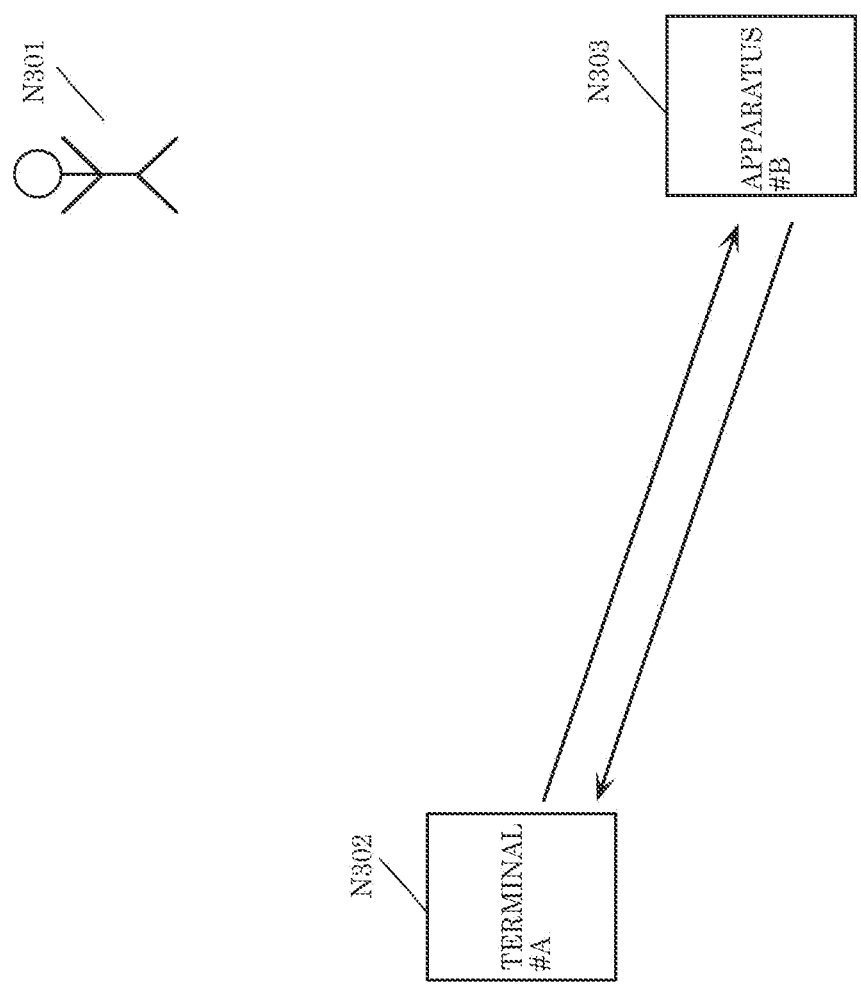
FIG. 46 illustrates one example of a state between a person, a terminal, and an apparatus according to Embodiment 7.

FIG. 46 illustrates an example of states of first person N301, terminal #A labeled N302 that is capable of sensing and includes communication functionality, and apparatus #B labeled N303. In the example illustrated in FIG. 46, terminal #A labeled N302 and apparatus #B labeled N303 are capable of communicating.

Figure 47:
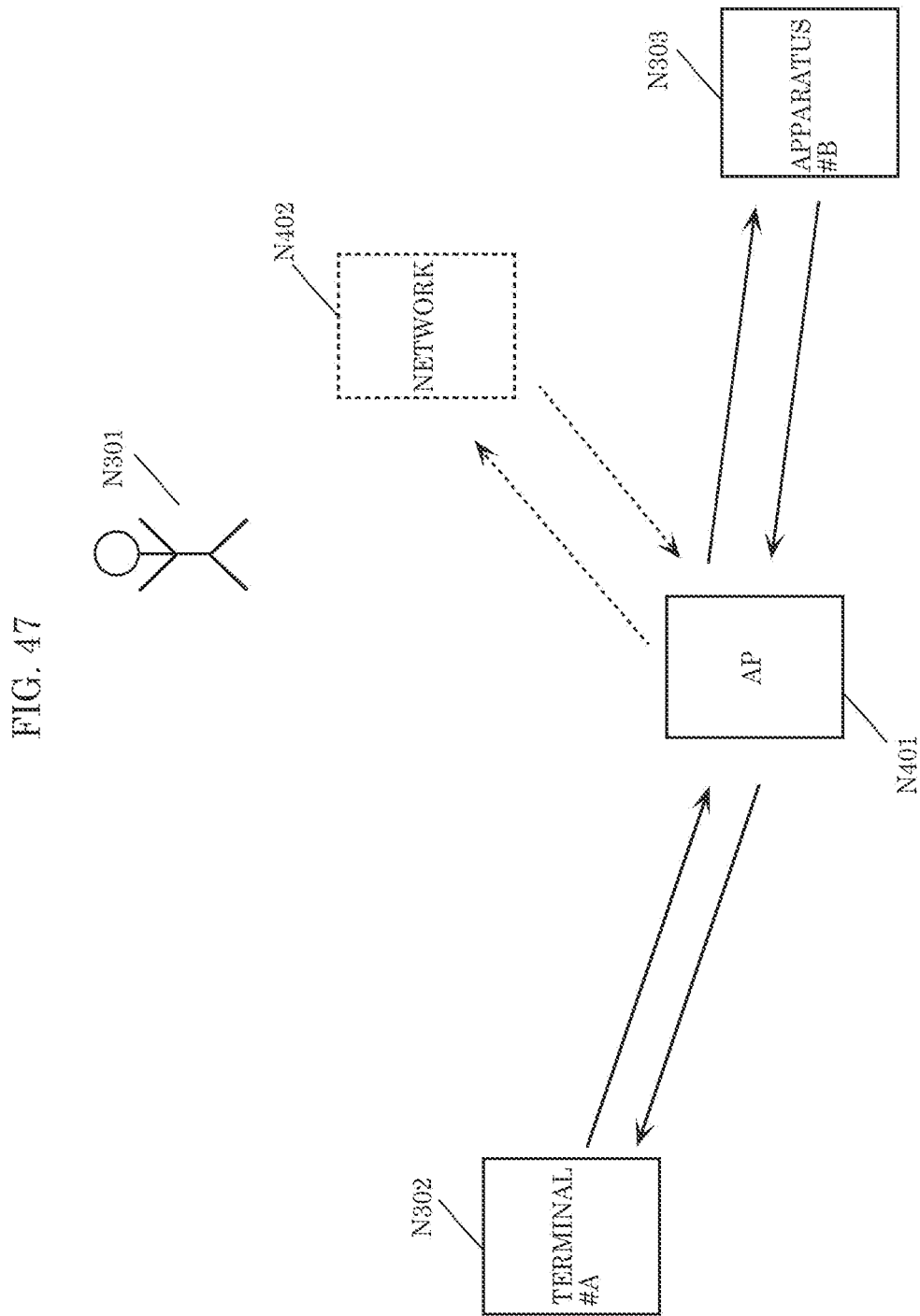
FIG. 47 illustrates one example of a state between a person, a terminal, and an apparatus according to Embodiment 7.

FIG. 47 illustrates an example that differs from FIG. 46. In FIG. 47, elements that operate the same as in FIG. 46 have the same reference signs. In FIG. 47, first person N301, terminal #A labeled N302 that is capable of sensing and includes a communication apparatus, access point (AP) N401, and apparatus #B labeled N303 are present. Network N402 may also be present. In the example illustrated in FIG. 47, terminal #A labeled N302 and AP labeled N401 are capable of communicating, and apparatus #B labeled N303 and AP labeled N401 are capable of communicating.

Figure 48:
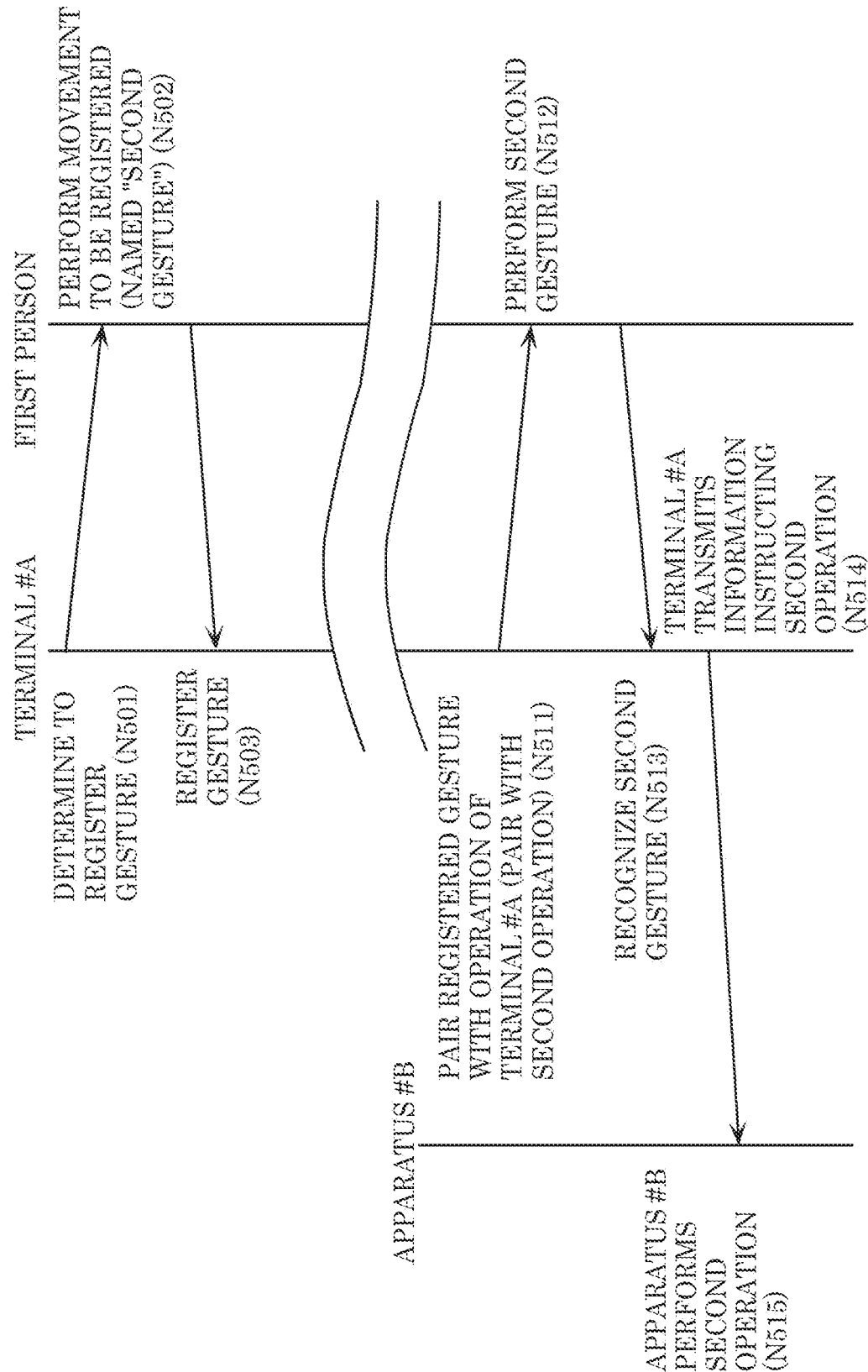
FIG. 48 illustrates one example of a relation between an apparatus, a terminal, and a person according to Embodiment 7.

Operations performed by each of the apparatuses illustrated in FIG. 46 will be described with reference to FIG. 48.

First, terminal #A labeled N302 determines to register a gesture (N501). Accordingly, terminal #A labeled N302 transmits a signal for sensing.

In response, the first person N301 performs a movement to be registered in terminal #A labeled N302 (N502). This gesture is referred to as a second gesture.

Terminal #A labeled N302 then registers the second gesture (N503). As described above, terminal #A labeled N302 may be equipped with a function for confirming whether the gesture was correctly registered or not. Terminal #A labeled N302 may also be equipped with a function for editing a registered gesture. For example, first person N301 may use these functions to correctly register the second gesture in terminal #A labeled N302.

Next, a registered gesture (for example, the second gesture) and an operation of terminal #A labeled N302 are paired (N511). One example of such a pairing is as follows. When a person, including first person N301, performs the second gesture, terminal #A labeled N302 instructs apparatus #B labeled N303 to perform the second operation. Accordingly, terminal #A labeled N302 performs pairing like described above, such as transmitting, to apparatus #B labeled N303, information instructing the second operation to be performed.

Thereafter, terminal #A labeled N302 implements sensing periodically, regularly, or irregularly.

Assume first person N301 performed the second gesture (N512) because they wanted to request apparatus #B labeled N303 to perform the second operation. Although the person who performs the second gesture is exemplified as first person N301, some other person may perform the second gesture.

Terminal labeled N0302 then recognizes the second gesture by performing sensing (N513), and transmits, to apparatus #B labeled N303, information instructing the performing of the second operation (N514).

Apparatus #B labeled N303 then performs the second operation (N515).

This makes it possible to achieve the advantageous effect that apparatus #B can be easily instructed to perform an operation. This also has the advantageous effect that the person is not required to have a special device.

Figure 49:
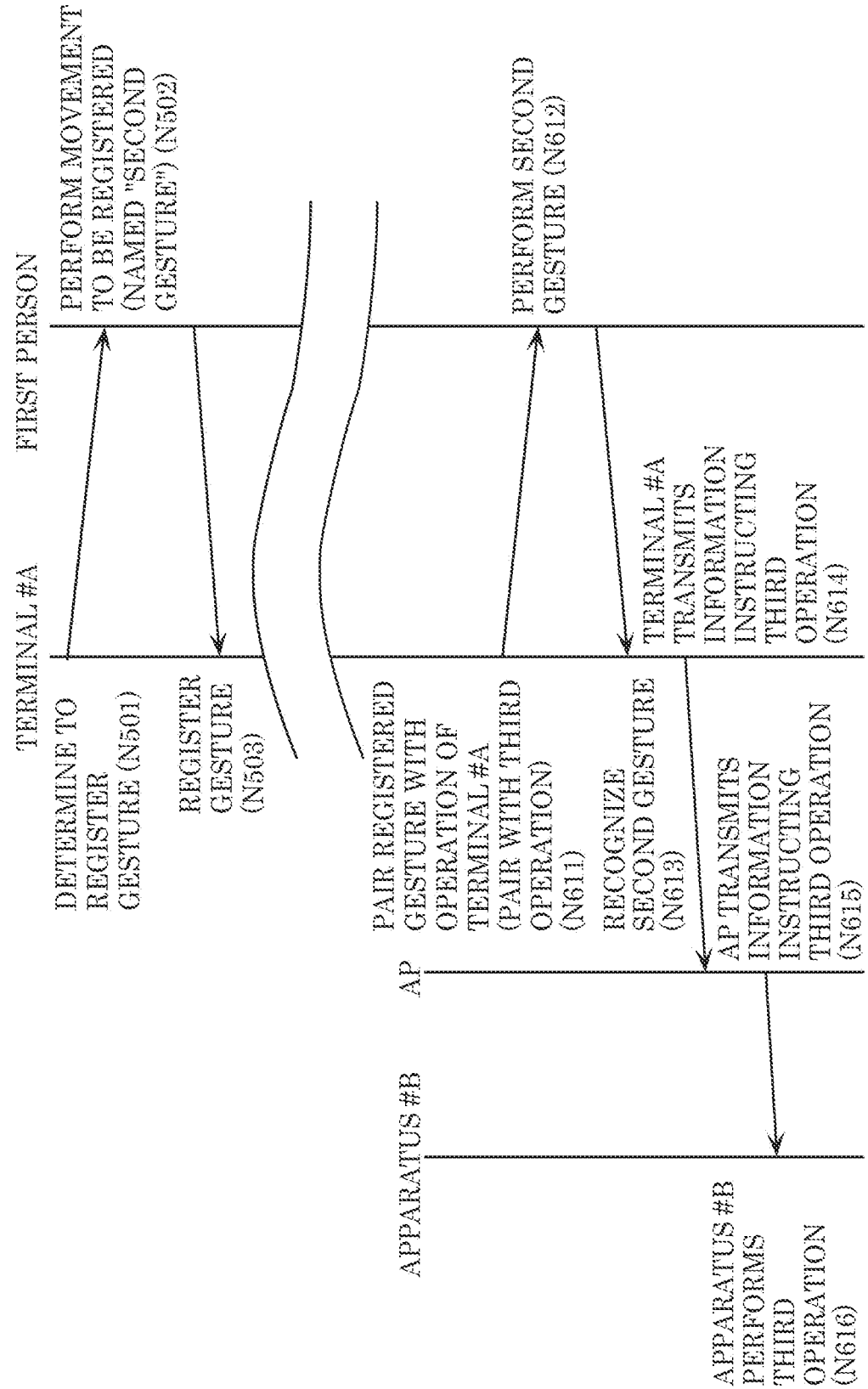
FIG. 49 illustrates one example of a relation between an apparatus, a terminal, and a person according to Embodiment 7.

Operations performed by each of the apparatuses illustrated in FIG. 47 will be described with reference to FIG. 49. In FIG. 49, elements that operate the same as in FIG. 48 have the same reference signs, and repeated description will be omitted.

First, terminal #A labeled N302 determines to register a gesture (N501). Accordingly, terminal #A labeled N302 transmits a signal for sensing.

In response, the first person N301 performs a movement to be registered in terminal #A labeled N302 (N502). This gesture is referred to as a second gesture.

Terminal #A labeled N302 then registers the second gesture (N503). As described above, terminal #A labeled N302 may be equipped with a function for confirming whether the gesture was correctly registered or not. Terminal #A labeled N302 may also be equipped with a function for editing a registered gesture. For example, first person N301 may use these functions to correctly register the second gesture in terminal #A labeled N302.

Next, a registered gesture (for example, the second gesture) and an operation of terminal #A labeled N302 are paired (N611). One example of such a pairing is as follows. When a person, including first person N301, performs the second gesture, terminal #A labeled N302 instructs apparatus #B labeled N303 to perform a third operation. Accordingly, terminal #A labeled N302 transmits, to AP labeled N401, information instructing the third operation to be performed. AP labeled N401 then transmits, to apparatus #B labeled N303, a modulated signal including this information (i.e., an instruction to perform the third operation).

Thereafter, terminal #A labeled N302 implements sensing periodically, regularly, or irregularly.

Assume first person N301 performed the second gesture (N612) because they wanted to request apparatus #B labeled N303 to perform the third operation. Although the person who performs the second gesture is exemplified as first person N301, some other person may perform the second gesture.

Terminal #A labeled N302 then recognizes the second gesture by performing sensing (N613), and transmits, to AP labeled N401, information instructing the performing of the third operation (N614).

AP labeled N401 then transmits, to apparatus #B labeled N303, a modulated signal including this information (i.e., an instruction to perform the third operation) (N615).

Apparatus #B labeled N303 then performs the third operation (N616).

In FIG. 47, AP labeled N401 may be communicating with network N402. For example, AP labeled N401 may communicate with a cloud server via network N402. AP labeled N401 may receive instruction from the cloud server.

For example, the cloud server may obtain information related to sensing from, for example, terminal #A labeled N302, apparatus #B labeled N303, and/or AP labeled N401.

In such cases, the cloud server itself may know the registered content of a gesture, and perform computation for recognizing a gesture. However, terminal #A labeled N302 needs to upload information that will serve as a basis for this to the cloud server. Moreover, the cloud server may know the content that is paired to a gesture, and may instruct terminal #A labeled N302, apparatus #B labeled N303, and/or AP labeled N401 based on known content.

This makes it possible to achieve the advantageous effect that apparatus #B can be easily instructed to perform an operation. Here, it is possible to achieve the advantageous effect that a person can instruct a device without the person being required to have a special device.

Although the term "gesture" is used in the above description, instead of a gesture, the following may be used: movement of a person, the shape of part of a body, movement of part of a body, detection of a person, detection of part of a person, authentication of a person, authentication of part of a person, movement of an object, the shape of an object, detection of an object, authentication of an object.

Moreover, for the sensing method, an example described in the present specification may be used, and, alternatively, some other method may be used.

Embodiment 8

In the present embodiment, a specific example of sensing performed in a space in which an apparatus capable of performing sensing is present will be given.

Figure 50:
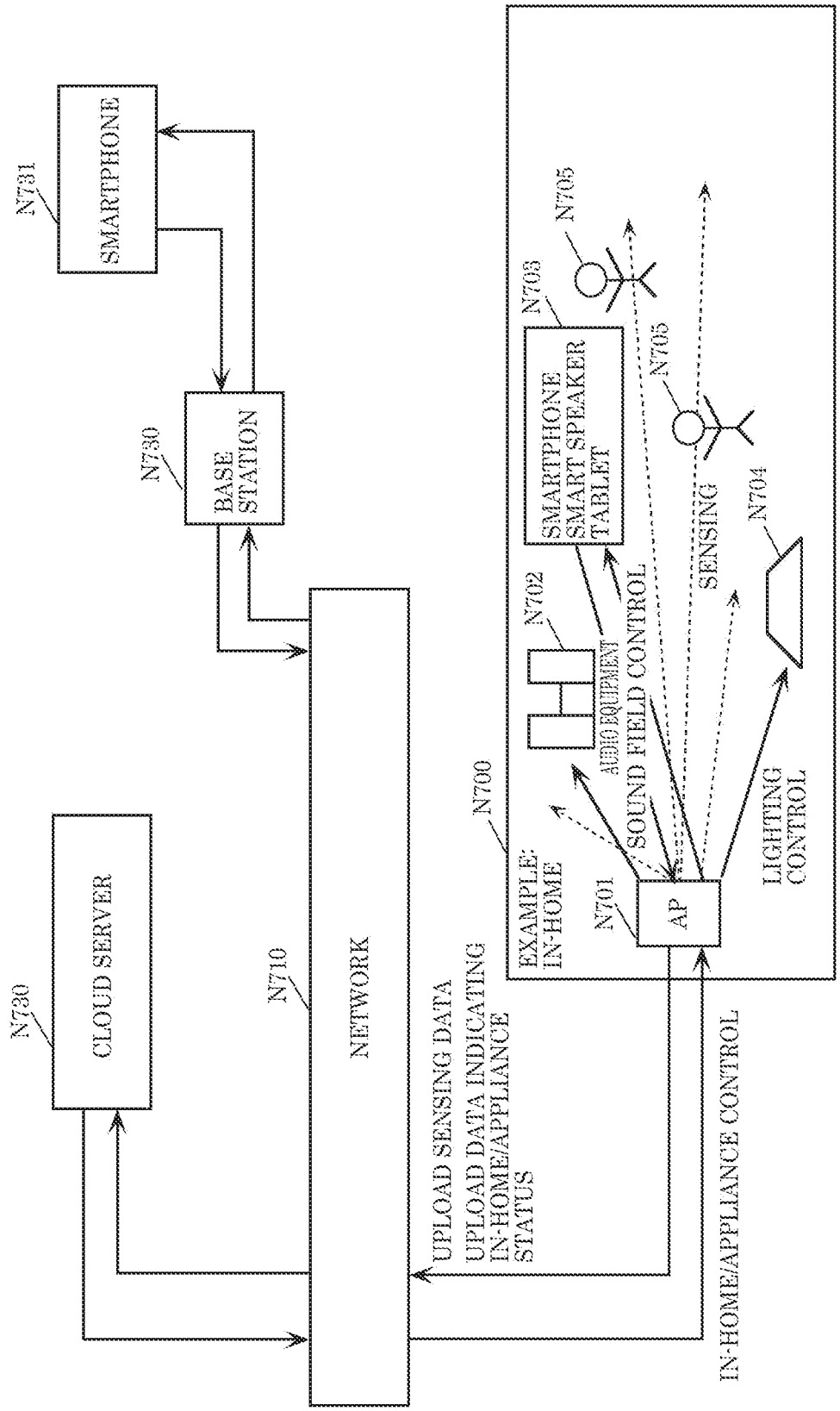
FIG. 50 illustrates one example of a state of apparatuses according to Embodiment 8.

FIG. 50 illustrates one example of states of apparatuses according to the present embodiment. N700 indicates the inside of a home as an example of the space. As illustrated in FIG. 50, for example, access point (AP) N701, audio equipment N702, device N703, which is a terminal such as a smartphone, smart speaker, tablet, computer, or mobile phone or the like, and luminaire N704 are present in-home space N700. Hereinafter, device N703 will be referred to as device #C.

Moreover, in this example, person N705 is living in in-home space N700.

AP labeled N701 is capable of performing sensing and capable of communicating, as described in other embodiments.

For example, AP labeled N701 communicates with audio equipment N702, device #C labeled N703, and luminaire N704. AP labeled N701 may communicate with other apparatuses as well.

AP labeled N701 is communicating with (cloud) server N720 via network N710.

AP labeled N701 is further communicating with base station N730 via network N710.

Base station N730 is communicating with device N731, which is a terminal such as a smartphone, tablet, computer, or mobile phone or the like. Hereinafter, device N731 will be referred to as device #D.

Next, a detailed example of operations performed by AP labeled N701 illustrated in FIG. 50 will be given.

Figure 51:
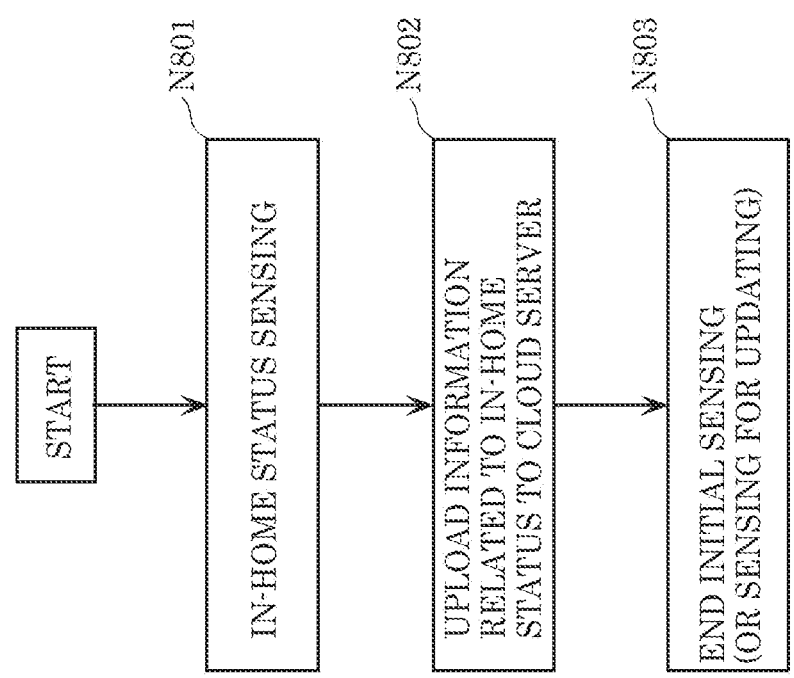
FIG. 51 illustrates a flow chart of an example of operations performed when an AP is first set up inside home according to Embodiment 8.

FIG. 51 illustrates a flow chart of an example of operations performed when AP labeled N701 is first set up inside the home.

First, AP labeled N701 performs sensing (N801), and uploads, to a cloud server, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device (including device #C labeled N703), information indicating the shape of an electronic device, etc. (N802).

With this, AP labeled N701 concludes initial sensing (N803). Although the term "initial sensing" is used, after AP labeled N701 is initially set up, the operations illustrated in FIG. 51 may be performed by AP labeled N701 periodically, aperiodically, regularly, or irregularly.

Next, another example in which device #C labeled N703 performs the operations illustrated in FIG. 51 will be given.

First, device #C labeled N703 performs sensing (N801), and uploads, to a cloud server via AP labeled N701, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device, information indicating the shape of an electronic device, etc. (N802).

With this, device #C labeled N703 concludes initial sensing (N803). Although the term "initial sensing" is used, device #C labeled N703 may perform the operations illustrated in FIG. 51 periodically, aperiodically, regularly, or irregularly.

Figure 52:
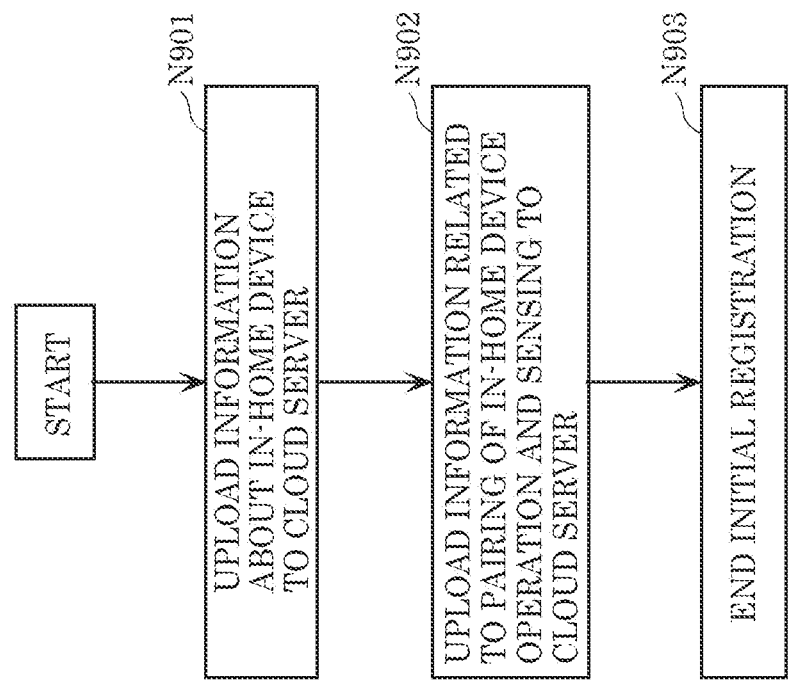
FIG. 52 illustrates a flow chart of an example of operations performed by the AP according to Embodiment 8.

FIG. 52 illustrates a flow chart of one example of operations performed by AP labeled N701.

AP labeled N701 uploads, to a cloud server, information about in-home devices obtained via sensing, such as information about an appliance (including audio equipment N702 and luminaire N704) and information about an electronic device (including device #C labeled N703) (N901).

Next, information related to the pairing of an operation performed by an in-home device and sensing performed by AP labeled N701 is uploaded to the cloud server (N902). The pairing of an operation performed by an in-home device and sensing performed a device capable of sensing (AP labeled N701 in this example) as well as the registering of the pairing, are exemplified in Embodiment 7. Hereinafter, points of difference from Embodiment 7, in particular in regard to a pairing operation example, will be described.

Next, another example in which device #C labeled N703 performs the operations illustrated in FIG. 52 will be given.

Device #C labeled N703 uploads, to a cloud server via AP labeled N701, information about in-home devices obtained via sensing, such as information about an appliance (including audio equipment N702 and luminaire N704) and information about an electronic device (N901).

Next, information related to the pairing of an operation performed by an in-home device and sensing performed by device #C labeled N703 is uploaded to the cloud server (N902). The pairing of an operation performed by an in-home device and sensing performed a device capable of sensing (device #C labeled N703 in this example) as well as the registering of the pairing, are exemplified in Embodiment 7. Hereinafter, points of difference from Embodiment 7, in particular in regard to a pairing operation example, will be described.

Figure 53:
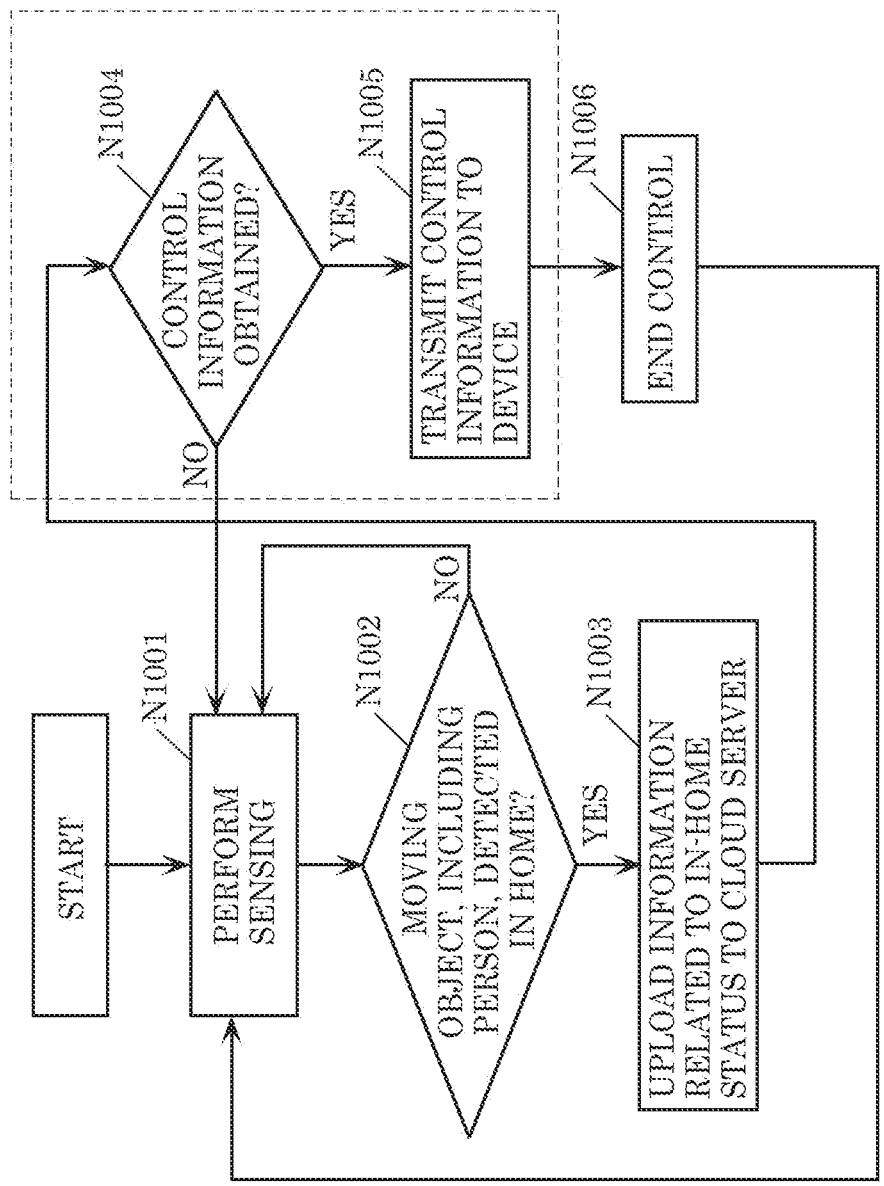
FIG. 53 illustrates a flow chart of an example of operations performed by a system according to Embodiment 8.

FIG. 53 illustrates a flow chart of an example of operations related to the system. Hereinafter, examples of the pairing of audio equipment N702 and sensing, the pairing of device #C and sensing, and the pairing of luminaire N704 and sensing will be given with reference to FIG. 53.

AP labeled N701 performs sensing (N1001).

As a result of the sensing, AP labeled N701 confirms whether a moving object, including a person, was detected in the home (N1002).

When AP labeled N701 does not detect a moving object, including a person, in the home (no in N1002), the processing returns to the "perform sensing" step N1001.

When AP labeled N701 does detect a moving object, including a person, in the home (yes in N1002), AP labeled N701 uploads, to cloud server N720 via network N710, information related to in-home status (N1003).

In response, cloud server N720 transmits, to AP labeled N701, information related to control of audio equipment N702, information related to control of device #C labeled N703, or information related to control of luminaire N704. AP labeled N701 then obtains information related to control (control information) (yes in N1004).

AP labeled N701 then transmits the control information to the target device (in the example illustrated in FIG. 50, audio equipment N702, device #C labeled N703, or luminaire N704) (N1005).

In response, the target device carries out control based on the control information, and ends control (N1006).

AP labeled N701 then performs the next iteration of sensing (N1001).

On the other hand, consider a case in which AP labeled N701 detects a moving object, including a person, in the home (yes in N1002), uploads, to cloud server N720 via network N710, information related to in-home status (N1003), but does not obtain control information from cloud server N720 (no in N1004). In such cases, AP labeled N701 performs the next iteration of sensing (N1001).

For example, consider a case in which AP labeled N701 transmits control information to audio equipment N702 in step N1005. In such cases, cloud server N720 transmits, to AP labeled N701, information related to directionality control for sound/audio of audio equipment N702, based on information indicating the position of a person obtained by sensing by AP labeled N701. AP labeled N701 transmits information related to directionality control for sound/audio to audio equipment N702, and based on the information related to directionality control for sound/audio, audio equipment N702 performs directionality control for sound/audio.

As another example, consider a case in which AP labeled N701 transmits control information to luminaire N704 in step N1005. In such cases, cloud server N720 transmits, to AP labeled N701, information related to the lighting of luminaire N704, such as ON/OFF or light emission directionality control, based on information indicating the position of a person or moving object obtained by sensing by AP labeled N701. AP labeled N701 then transmits information related to ON/OFF or light emission directionality control to luminaire N704, and luminaire N704 carries out control for turning ON/OFF the lighting or control of the direction of light emission, based on the information related to ON/OFF or light emission directionality control.

As described above, by controlling a device present in the home based on the in-home state, it is possible to achieve the advantageous effect that comfortable, safe living can be provided.

Next, another example of FIG. 53 will be given.

Device #C labeled N703 performs sensing (N1001).

As a result of the sensing, device #C labeled N703 confirms whether a moving object, including a person, was detected in the home (N1002).

When device #C labeled N703 does not detect a moving object, including a person, in the home (no in N1002), the processing returns to the "perform sensing" step N1001.

When device #C labeled N703 detects a moving object, including a person, in the home (yes in N1002), device #C labeled N703 uploads, to cloud server N720 via AP labeled N701 and network N710, information related to in-home status (N1003).

In response, cloud server N720 transmits, to device #C labeled N703 via network N710 and AP labeled N701, information related to control of audio equipment N702 or information related to control of luminaire N704. Device #C labeled N703 then obtains information related to control (control information) (yes in N1004).

Device #C labeled N703 then transmits the control information to the target device (in the example illustrated in FIG. 50, audio equipment N702 or luminaire N704) (N1005). However, this transmission is performed via AP labeled N701.

In response, the target device carries out control based on the control information, and ends control (N1006).

Device #C labeled N703 then performs the next iteration of sensing (N1001).

On the other hand, consider a case in which device #C labeled N703 detects a moving object, including a person, in the home (yes in N1002), uploads, to cloud server N720 via AP labeled N701 and network N710, information related to in-home status (N1003), but does not obtain control information from cloud server N720 (no in N1004). In such cases, device #C labeled N703 performs the next iteration of sensing (NO).

For example, consider a case in which device #C labeled N703 transmits control information to audio equipment N702 in step N1005. In such cases, cloud server N720 transmits, to device #C labeled N703 via AP labeled N701, information related to directionality control for sound/audio of audio equipment N702, based on information indicating the position of a person obtained by sensing by device #C labeled N703. Device #C labeled N703 transmits information related to directionality control for sound/audio to audio equipment N702 via AP labeled N701, and based on the information related to directionality control for sound/audio, audio equipment N702 performs directionality control for sound/audio.

As another example, consider a case in which device #C labeled N703 transmits control information to luminaire N704 in step N1005. In such cases, cloud server N720 transmits, to device #C labeled N703 via AP labeled N701, information related to the lighting of luminaire N704, such as ON/OFF or light emission directionality control, based on information indicating the position of a person or moving object obtained by sensing by device #C labeled N703. Device #C labeled N703 then transmits information related to ON/OFF or light emission directionality control to luminaire N704 via AP labeled N701, and luminaire N704 carries out control for turning ON/OFF the lighting or control of the direction of light emission, based on the information related to ON/OFF or light emission directionality control.

As described above, by controlling a device present in the home based on the in-home state, it is possible to achieve the advantageous effect that comfortable, safe living can be provided.

Figure 54:
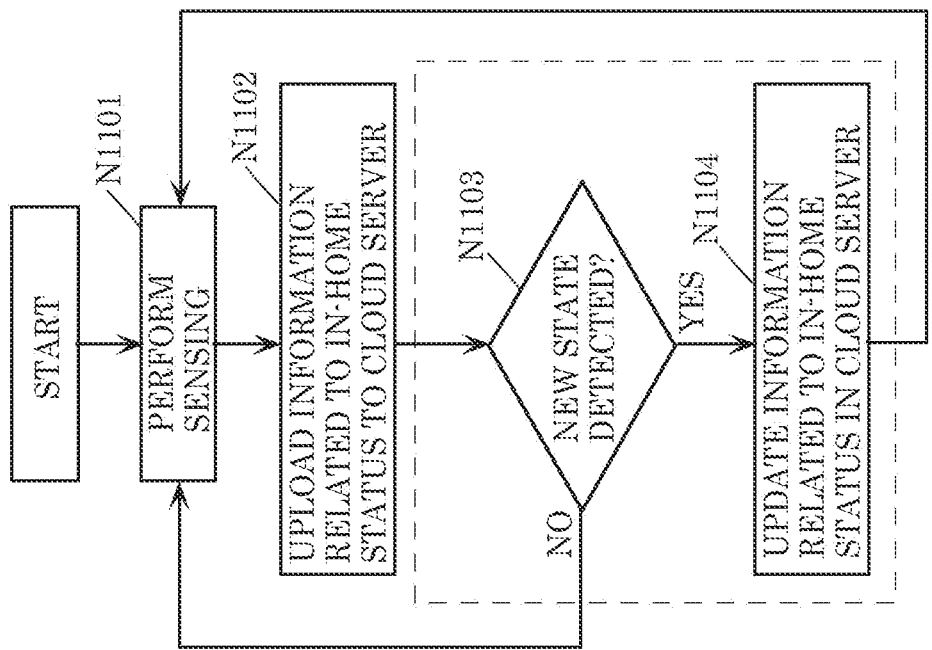
FIG. 54 illustrates a flow chart of an example of operations performed by the AP and a cloud server according to Embodiment 8.

FIG. 54 illustrates a flow chart of one example of operations performed by in-home AP labeled N701 and cloud server N720.

AP labeled N701 performs sensing (N1101), and uploads, to a cloud server, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device (including device #C labeled N703), information indicating the shape of an electronic device, etc. (N1102).

Cloud server N720 compares stored information related to in-home status with the newly obtained information related to in-home status. Cloud server N720 then confirms whether a new state has been detected or not (N1103).

When cloud server N720 confirms that a new state has been detected (yes in N1103), cloud server N720 updates the information related to in-home status (N1104). Then, the next iteration of AP labeled N701 sensing is performed (N1101).

When cloud server N720 does not confirm that a new state has been detected (no in N1103), the next iteration of AP labeled N701 sensing is performed (N1101).

Next, another example in which device #C labeled N703 and cloud server N720 perform the operations illustrated in FIG. 54 will be given.

Device #C labeled N703 performs sensing (N1101), and uploads, to a cloud server via AP labeled N701, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device, information indicating the shape of an electronic device, etc. (N1102).

Cloud server N720 compares stored information related to in-home status with the newly obtained information related to in-home status. Cloud server N720 then confirms whether a new state has been detected or not (N1103).

When cloud server N720 confirms that a new state has been detected (yes in N1103), cloud server N720 updates the information related to in-home status (N1104). Then, the next iteration of device #C labeled N703 sensing is performed (N1101).

When cloud server N720 does not confirm that a new state has been detected (no in N1103), the next iteration of device #C labeled N703 sensing is performed (N1101).

As described above, by controlling a device present in the home based on the in-home state, it is possible to achieve the advantageous effect that comfortable, safe living can be provided. It is also possible to achieve the advantageous effect that more favorable control is possible by updating information obtained via sensing as needed.

Note that in FIG. 53, operations pertaining to the cloud server are indicated via the dashed-line box. Similarly, in FIG. 54, operations pertaining to the cloud server are indicated via the dashed-line box.

Embodiment 9

In the present embodiment, a specific example of sensing performed in a space in which an apparatus capable of performing sensing is present will be given.

Figure 55:
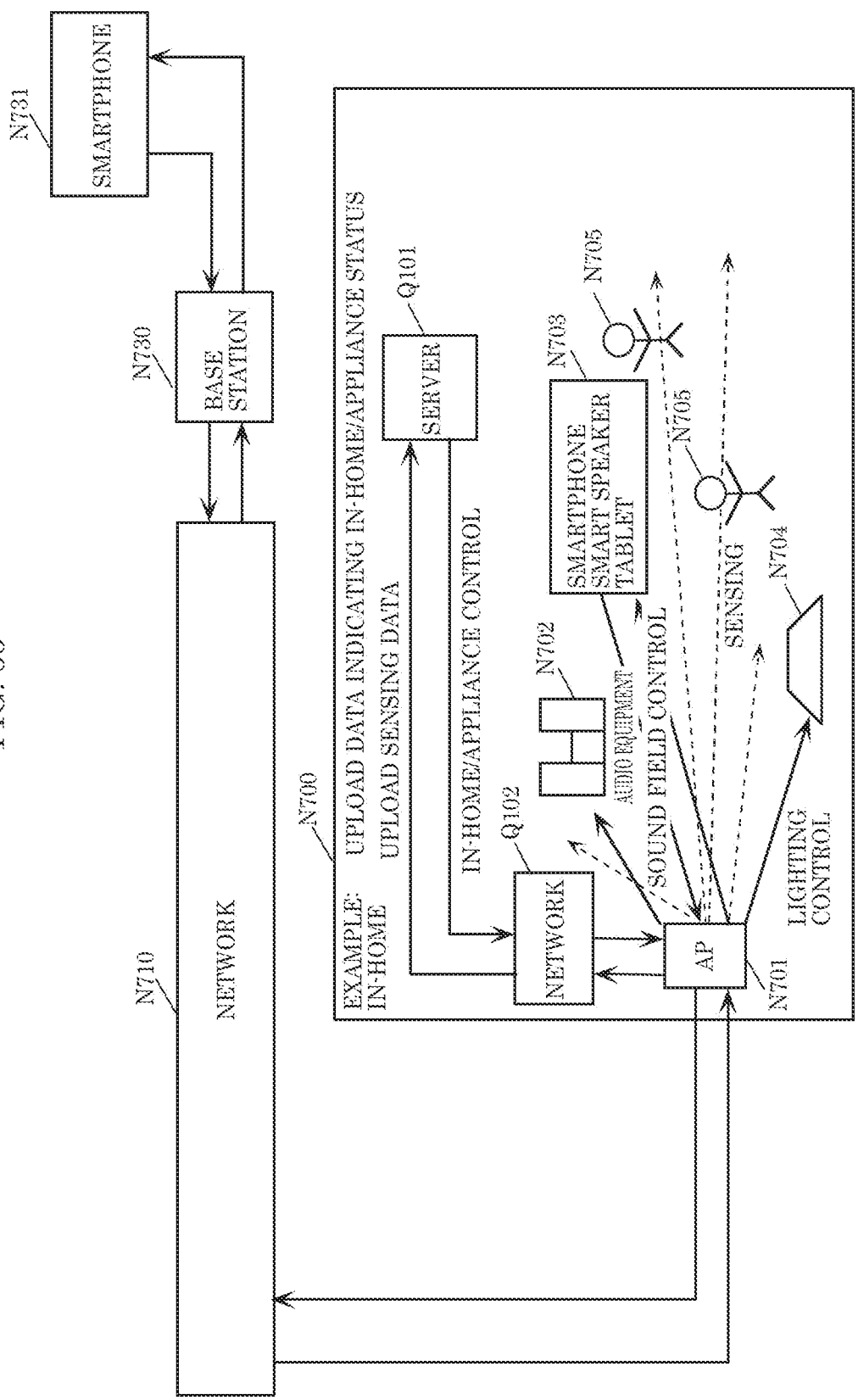
FIG. 55 illustrates one example of a state of apparatuses according to Embodiment 9.

FIG. 55 illustrates one example of states of apparatuses according to the present embodiment. In FIG. 55, elements that operate the same as in FIG. 50 have the same reference signs.

N700 indicates the inside of a home as an example of the space. As illustrated in FIG. 55, for example, access point (AP) N701, audio equipment N702, device N703, which is a terminal such as a smartphone, smart speaker, tablet, computer, or mobile phone or the like, and luminaire N704 are present in-home space N700. Hereinafter, device N703 will be referred to as device #C. For example, assume server Q101 is present in in-home space N700.

Moreover, in this example, person N705 is living in in-home space N700.

AP labeled N701 is capable of performing sensing and capable of communicating, as described in other embodiments.

For example, AP labeled N701 communicates with audio equipment N702, device #C labeled N703, and luminaire N704. AP labeled N701 may communicate with other apparatuses as well.

AP labeled N701 is communicating with server Q101 via network Q102.

AP labeled N701 is further communicating with base station N730 via network N710.

Base station N730 is communicating with device N731, which is a terminal such as a smartphone, tablet, computer, or mobile phone or the like. Hereinafter, device N731 will be referred to as device #D.

Next, a detailed example of operations performed by AP labeled N701 illustrated in FIG. 55 will be given.

Figure 56:
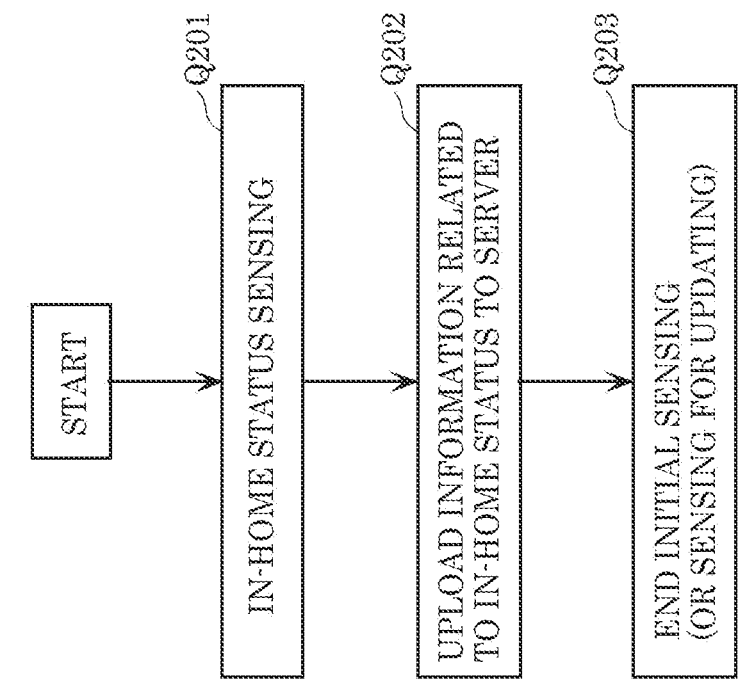
FIG. 56 illustrates a flow chart of an example of operations performed when an AP is first set up inside home according to Embodiment 9.

FIG. 56 illustrates a flow chart of an example of operations performed when AP labeled N701 is first set up inside the home.

First, AP labeled N701 performs sensing (Q201), and uploads, to server Q101, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device (including device #C labeled N703), information indicating the shape of an electronic device, etc. (Q202).

With this, AP labeled N701 concludes initial sensing (Q203). Although the term "initial sensing" is used, after AP labeled N701 is first set up, the operations illustrated in FIG. 56 may be performed by AP labeled N701 periodically, aperiodically, regularly, or irregularly.

Next, another example in which device #C labeled N703 performs the operations illustrated in FIG. 56 will be given.

First, device #C labeled N703 performs sensing (Q201), and uploads, to server Q101 via AP labeled N701, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device, information indicating the shape of an electronic device, etc. (Q202).

With this, device #C labeled N703 concludes initial sensing (Q203). Although the term "initial sensing" is used, device #C labeled N703 may perform the operations illustrated in FIG. 56 periodically, aperiodically, regularly, or irregularly.

Figure 57:
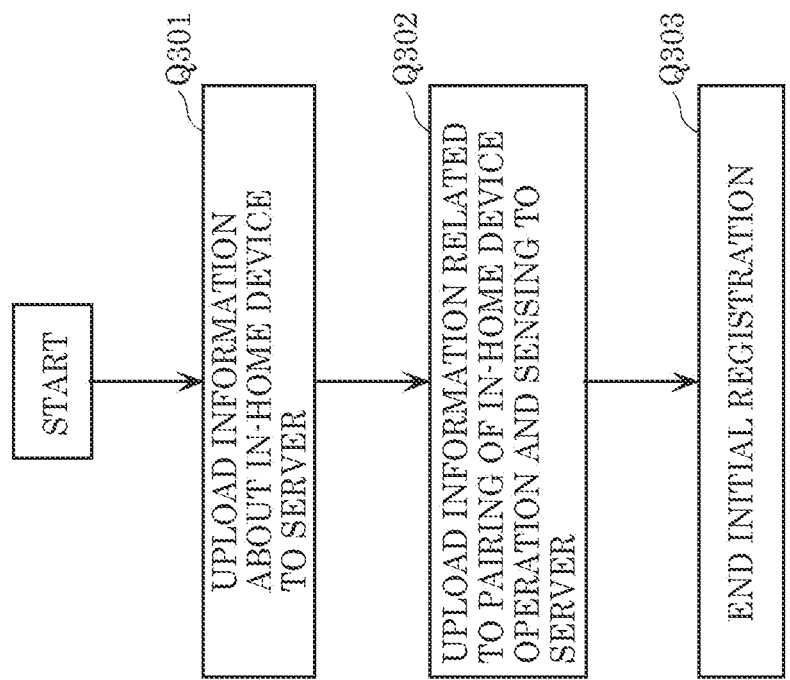
FIG. 57 illustrates a flow chart of an example of operations performed by the AP according to Embodiment 9.

FIG. 57 illustrates a flow chart of one example of operations performed by AP labeled N701.

AP labeled N701 uploads, to server Q101, information about in-home devices obtained via sensing, such as information about an appliance (including audio equipment N702 and luminaire N704) and information about an electronic device (including device #C labeled N703) (Q301).

Next, information related to the pairing of an operation performed by an in-home device and sensing performed by AP labeled N701 is uploaded to server Q101 (Q302). The pairing of an operation performed by an in-home device and sensing performed a device capable of sensing (AP labeled N701 in this example) as well as the registering of the pairing, are exemplified in Embodiment 7. Hereinafter, points of difference from Embodiment 7, in particular in regard to a pairing operation example, will be described.

Next, another example in which device #C labeled N703 performs the operations illustrated in FIG. 57 will be given.

Device #C labeled N703 uploads, to server Q101 via AP labeled N701, information about in-home devices obtained via sensing, such as information about an appliance (including audio equipment N702 and luminaire N704) and information about an electronic device (Q301).

Next, information related to the pairing of an operation performed by an in-home device and sensing performed by device #C labeled N703 is uploaded to the cloud server (Q302). The pairing of an operation performed by an in-home device and sensing performed a device capable of sensing (device #C labeled N703 in this example) as well as the registering of the pairing, are exemplified in Embodiment 7. Hereinafter, points of difference from Embodiment 7, in particular in regard to a pairing operation example, will be described.

Figure 58:
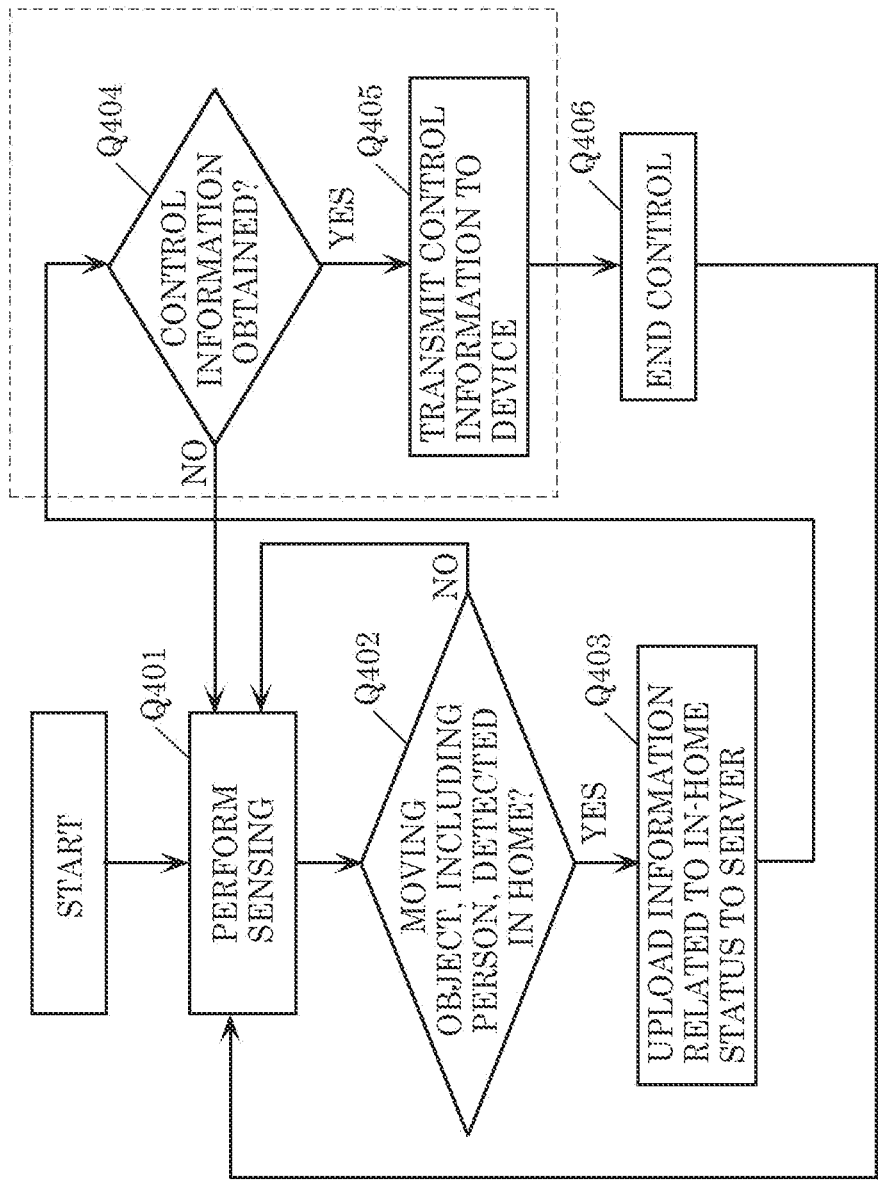
FIG. 58 illustrates a flow chart of an example of operations performed by a system according to Embodiment 9.

FIG. 58 illustrates a flow chart of an example of operations related to, for example, the system illustrated in FIG. 55. Hereinafter, examples of the pairing of audio equipment N702 and sensing, the pairing of device #C and sensing, and the pairing of luminaire N704 and sensing will be given with reference to FIG. 58. Note that in FIG. 58, operations pertaining to the server are indicated via the dashed-line box.

AP labeled N701 performs sensing (Q401).

As a result of the sensing, AP labeled N701 confirms whether a moving object, including a person, was detected in the home (Q402).

When AP labeled N701 does not detect a moving object, including a person, in the home (no in Q402), the processing returns to the "perform sensing" step Q401.

When AP labeled N701 does detect a moving object, including a person, in the home (yes in Q402), AP labeled N701 uploads information related to in-home status to server Q101 via network Q102 (Q403).

In response, server Q101 transmits, to AP labeled N701, information related to control of audio equipment N702, information related to control of device #C labeled N703, or information related to control of luminaire N704. AP labeled N701 then obtains information related to control (control information) (yes in Q404).

AP labeled N701 then transmits the control information to the target device (in the example illustrated in FIG. 55, audio equipment N702, device #C labeled N703, or luminaire N704) (Q405).

In response, the target device carries out control based on the control information, and ends control (Q406).

AP labeled N701 then performs the next iteration of sensing (Q401).

On the other hand, consider a case in which AP labeled N701 detects a moving object, including a person, in the home (yes in Q402), uploads, to server Q101 via network Q102, information related to in-home status (Q403), but does not obtain control information from server Q101 (no in Q404). In such cases, AP labeled N701 performs the next iteration of sensing (Q401).

For example, consider a case in which AP labeled N701 transmits control information to audio equipment N702 in step Q405. In such cases, server Q101 transmits, to AP labeled N701, information related to directionality control for sound/audio of audio equipment N702, based on information indicating the position of a person obtained by sensing by AP labeled N701. AP labeled N701 transmits information related to directionality control for sound/audio to audio equipment N702, and based on the information related to directionality control for sound/audio, audio equipment N702 performs directionality control for sound/audio.

As another example, consider a case in which AP labeled N701 transmits control information to luminaire N704 in step Q405. In such cases, server Q101 transmits, to AP labeled N701, information related to the lighting of luminaire N704, such as ON/OFF or light emission directionality control, based on information indicating the position of a person or moving object obtained by sensing by AP labeled N701. AP labeled N701 then transmits information related to ON/OFF or light emission directionality control to luminaire N704, and luminaire N704 carries out control for turning ON/OFF the lighting or control of the direction of light emission, based on the information related to ON/OFF or light emission directionality control.

As described above, by controlling a device present in the home based on the in-home state, it is possible to achieve the advantageous effect that comfortable, safe living can be provided.

Next, another example of FIG. 58 will be given.

Device #C labeled N703 performs sensing (Q401).

As a result of the sensing, device #C labeled N703 confirms whether a moving object, including a person, was detected in the home (Q402).

When device #C labeled N703 does not detect a moving object, including a person, in the home (no in Q402), the processing returns to the "perform sensing" step Q401.

When device #C labeled N703 does detect a moving object, including a person, in the home (yes in Q402), device #C labeled N703 uploads, to server Q101 via AP labeled N701 and network Q102, information related to in-home status (Q403).

In response, server Q101 transmits, to device #C labeled N703 via network Q102 and AP labeled N701, information related to control of audio equipment N702 or information related to control of luminaire N704. Device #C labeled N703 then obtains information related to control (control information) (yes in Q404).

Device #C labeled N703 then transmits the control information to the target device (in the example illustrated in FIG. 55, audio equipment N702 or luminaire N704) (Q405). However, this transmission is performed via AP labeled N701.

In response, the target device carries out control based on the control information, and ends control (Q406).

Device #C labeled N703 then performs the next iteration of sensing (Q401).

On the other hand, consider a case in which device #C labeled N703 detects a moving object, including a person, in the home (yes in Q402), uploads, to server Q101 via AP labeled N701 and network Q102, information related to in-home status (Q403), but does not obtain control information from server Q101 (no in Q404). In such cases, device #C labeled N703 performs the next iteration of sensing (Q401).

For example, consider a case in which device #C labeled N703 transmits control information to audio equipment N702 in step Q405. In such cases, server Q101 transmits, to device #C labeled N703 via AP labeled N701, information related to directionality control for sound/audio of audio equipment N702, based on information indicating the position of a person obtained by sensing by device #C labeled N703. Device #C labeled N703 transmits information related to directionality control for sound/audio to audio equipment N702 via AP labeled N701, and based on the information related to directionality control for sound/audio, audio equipment N702 performs directionality control for sound/audio.

As another example, consider a case in which device #C labeled N703 transmits control information to luminaire N704 in step Q405. In such cases, server Q101 transmits, to device #C labeled N703 via AP labeled N701, information related to the lighting of luminaire N704, such as ON/OFF or light emission directionality control, based on information indicating the position of a person or moving object obtained by sensing by device #C labeled N703. Device #C labeled N703 then transmits information related to ON/OFF or light emission directionality control to luminaire N704 via AP labeled N701, and luminaire N704 carries out control for turning ON/OFF the lighting or control of the direction of light emission, based on the information related to ON/OFF or light emission directionality control.

As described above, by controlling a device present in the home based on the in-home state, it is possible to achieve the advantageous effect that comfortable, safe living can be provided.

Figure 59:
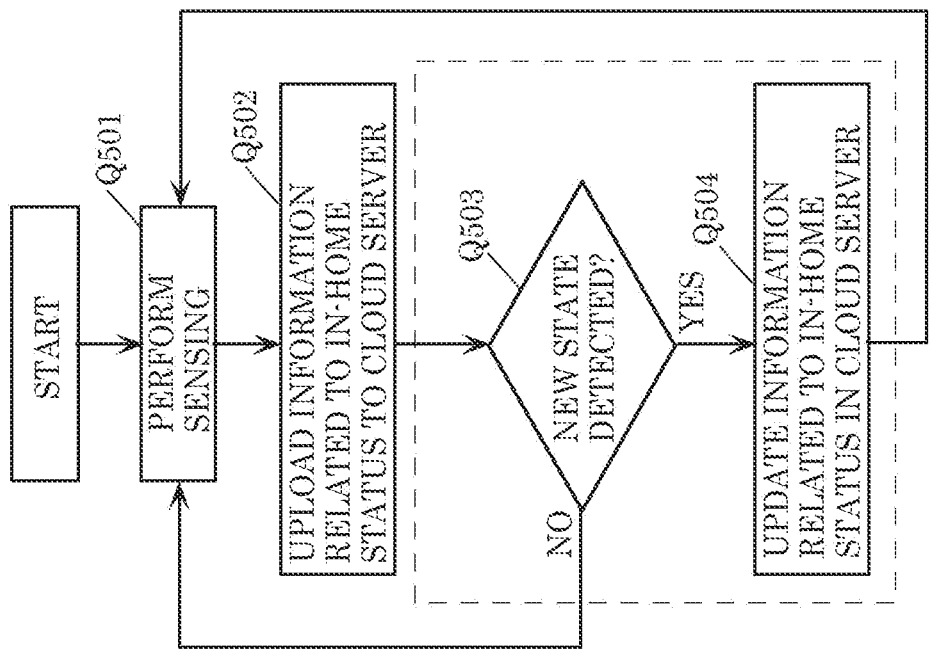
FIG. 59 illustrates a flow chart of an example of operations performed by the AP and a cloud server according to Embodiment 9.

FIG. 59 illustrates a flow chart of one example of operations performed by in-home AP labeled N701 and server Q101. Note that in FIG. 59, operations pertaining to the server are indicated via the dashed-line box.

AP labeled N701 performs sensing (Q501), and uploads, to server Q101, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device (including device #C labeled N703), information indicating the shape of an electronic device, etc. (Q502).

Server Q101 compares stored information related to in-home status with the newly obtained information related to in-home status. Server Q101 then confirms whether a new state has been detected or not (Q503).

When server Q101 confirms that a new state has been detected (yes in Q503), server Q101 updates the information related to in-home status (Q504). Then, the next iteration of AP labeled N701 sensing is performed (Q501).

When server Q101 does not confirm that a new state has been detected (no in Q503), the next iteration of AP labeled N701 sensing is performed (Q501).

Next, another example in which device #C labeled N703 and server Q101 perform the operations illustrated in FIG. 59 will be given.

Device #C labeled N703 performs sensing (Q501), and uploads, to server Q101 via AP labeled N701, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device, information indicating the shape of an electronic device, etc. (Q502).

Server Q101 compares stored information related to in-home status with the newly obtained information related to in-home status. Server Q101 then confirms whether a new state has been detected or not (Q503).

When server Q101 confirms that a new state has been detected (yes in Q503), server Q101 updates the information related to in-home status (Q504). Then, the next iteration of device #C labeled N703 sensing is performed (Q501).

When server Q101 does not confirm that a new state has been detected (no in Q503), the next iteration of device #C labeled N703 sensing is performed (Q501).

As described above, by controlling a device present in the home based on the in-home state, it is possible to achieve the advantageous effect that comfortable, safe living can be provided. It is also possible to achieve the advantageous effect that more favorable control is possible by updating information obtained via sensing as needed.

In FIG. 55, AP labeled N701, network labeled Q102, and server Q101 may be configured as a single apparatus. In such cases, network Q102 may be wired or wireless, and thus AP labeled N701 and server Q101 may be connected by wire or wirelessly in the single apparatus.

Embodiment 10

In the present embodiment, examples of specific usage methods of an apparatus having at least sensing functionality will be given.

Example 1

A character is generated based on an object obtained via sensing, and the character is displayed on a screen.

Using the character in an application diversifies the application, and achieves such an advantageous effect.

Figure 60:
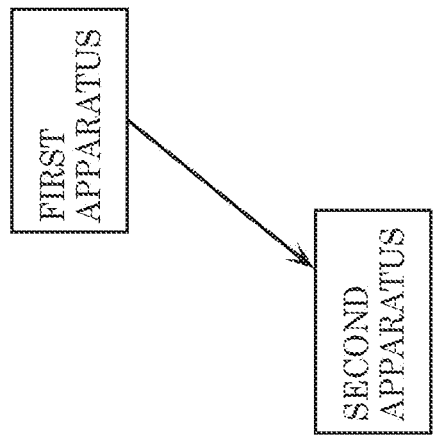
FIG. 60 illustrates one example of a system configuration according to Embodiment 10.

FIG. 60 illustrates one example of a configuration of a system according to the present embodiment.

In FIG. 60, assume the second apparatus is equipped with a monitor.

The first apparatus at least has sensing functionality. The first apparatus performs sensing, generates, for example, information by capturing a characterizing feature of a first person, and transmits the generated information to the second apparatus.

The second apparatus then generates a first character to be displayed on the monitor included in the second apparatus, based on the information on a characterizing feature of the first person. The first character can then be displayed on the monitor included in the second apparatus. Note that the first character may be customized by being transformed in some way.

As an example of another method, the first apparatus performs sensing, generates, for example, second character information by capturing a characterizing feature of a second object, and transmits the generated information to the second apparatus.

The second apparatus then displays, on the monitor included in the second apparatus, the second character based on the second character information. Note that the second character may be customized by being transformed in some way.

Note that the first apparatus and the second apparatus may be configured as a single apparatus.

Figure 61:
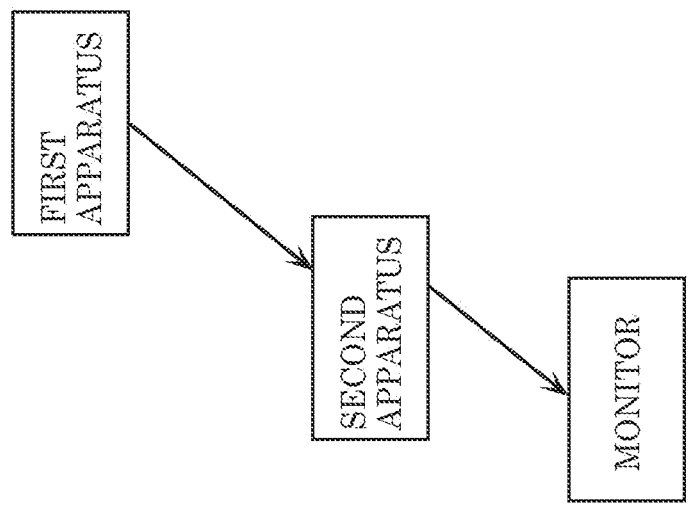
FIG. 61 illustrates one example of a system configuration according to Embodiment 10.

FIG. 61 illustrates one example of a system configuration according to the present embodiment that differs from the example illustrated in FIG. 60.

In FIG. 61, assume the second apparatus is connectable to an external monitor.

The first apparatus at least has sensing functionality. The first apparatus performs sensing, generates, for example, information by capturing a characterizing feature of a first person, and transmits the generated information to the second apparatus.

The second apparatus then generates a first character to be displayed on the monitor connected to the second apparatus, based on the information on a characterizing feature of the first person. It is then possible to display the first character on the monitor. Note that the first character may be customized by being transformed in some way.

As an example of another method, the first apparatus performs sensing, generates, for example, second character information by capturing a characterizing feature of a second object, and transmits the generated information to the second apparatus.

The second apparatus then displays the second character based on the second character information on the monitor. Note that the second character may be customized by being transformed in some way.

Example 2

It is possible to reproduce the three-dimensional space that an object occupies by using object estimation information obtained from an image (still image or video) of an object obtained by a sensor capable of capturing an image, such as a camera, and, for example, by performing sensing using wireless technology.

Figure 62:
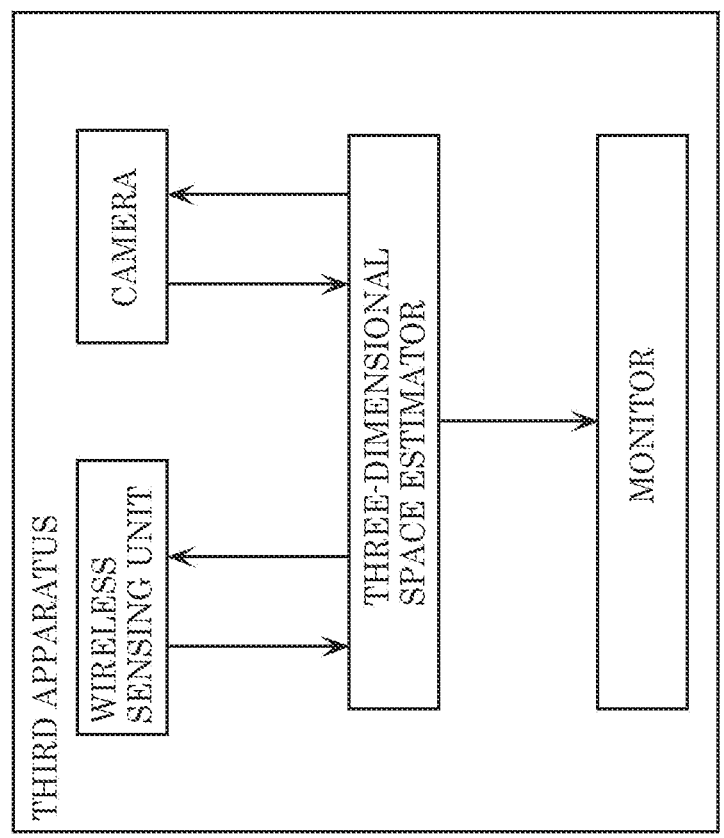
FIG. 62 illustrates one example of a system configuration according to Embodiment 10.

FIG. 62 illustrates one example of a configuration of a system according to the present embodiment.

In FIG. 62, assume the third apparatus is equipped with a monitor.

Assume the third apparatus includes a sensor capable of capturing an image, such as a camera, and a wireless sensing unit.

Three-dimensional space estimation information for the object is obtained by the wireless sensing unit.

Two-dimensional (or three-dimensional) image information and color information of the object are obtained by capturing an image using a sensor capable of capturing an image, such as a camera.

The three-dimensional space estimator generates three-dimensional space (colorized) estimation information for the object from the three-dimensional space estimation information for the object and the two-dimensional (or three-dimensional) image information and color information of the object, and displays the generated information on the monitor.

Note that since three-dimensional information has been obtained, when the three-dimensional space (colorized) estimation information for the object is displayed on the monitor, the viewpoint from which the object is viewed can be changed freely.

Figure 63:
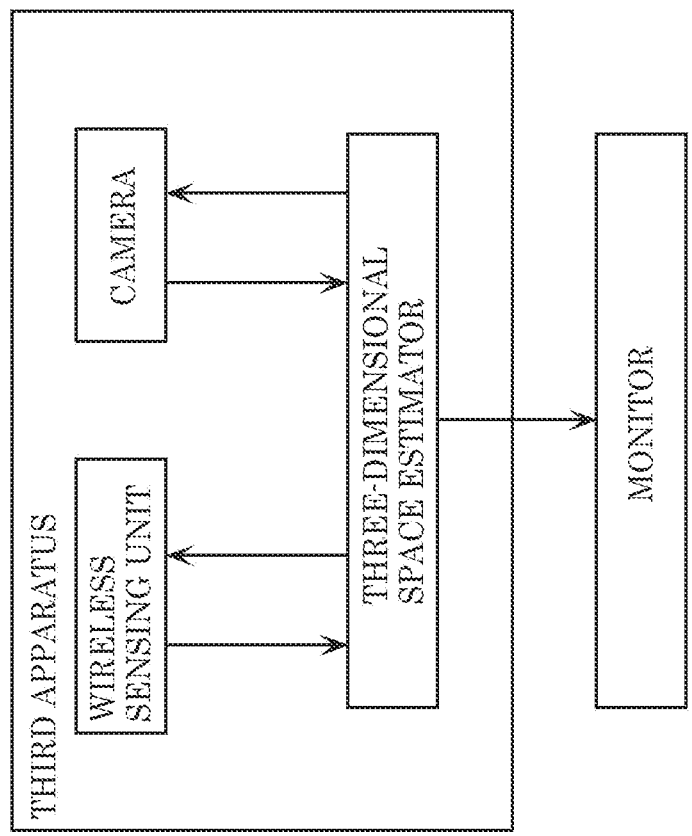
FIG. 63 illustrates one example of a system configuration according to Embodiment 10.

FIG. 63 illustrates one example of a system configuration according to the present embodiment that differs from the example illustrated in FIG. 62.

In FIG. 63, assume the third apparatus is connectable to an external monitor.

Basic operations performed by the elements are as described with reference to FIG. 62.

Note that the sensing methods in the embodiments will be described supplementally.

Figure 64:
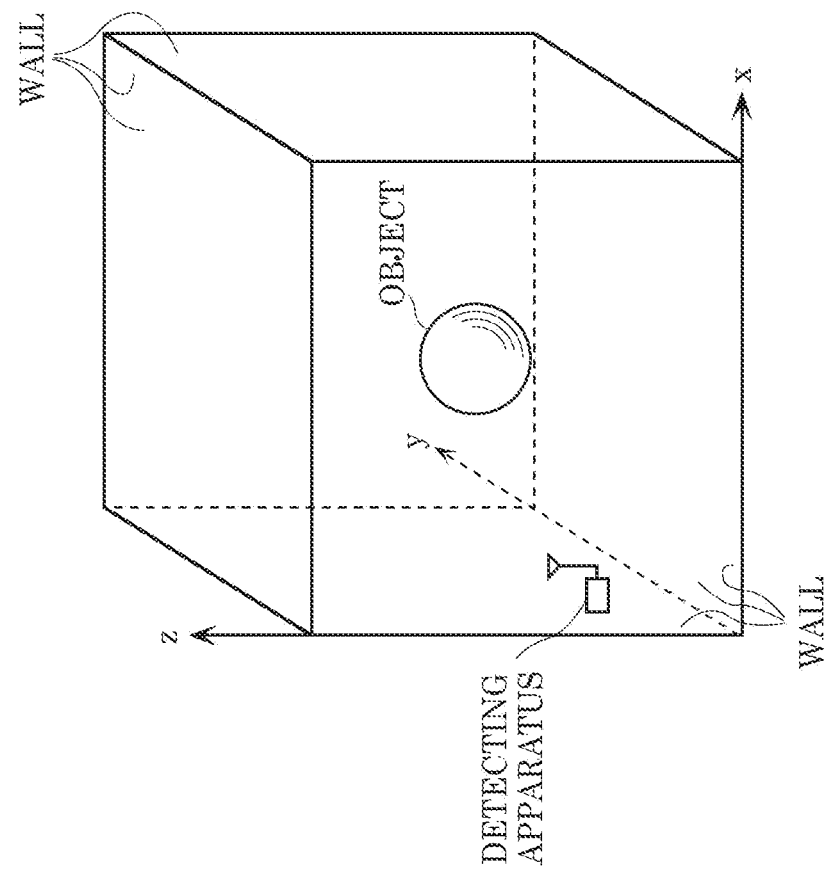
FIG. 64 illustrates a sensing method described in the embodiments.
Figure 65:
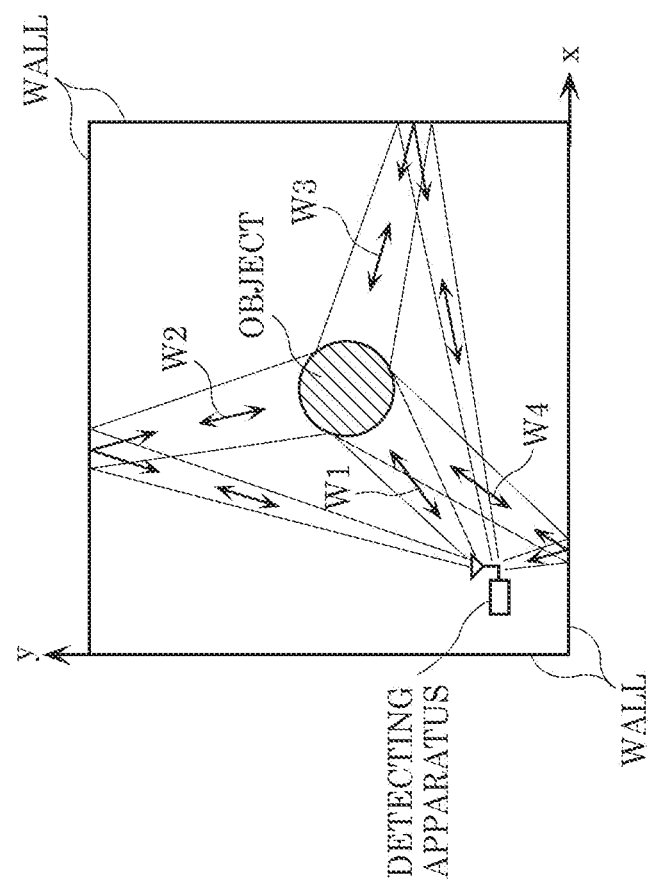
FIG. 65 illustrates a sensing method described in the embodiments.

FIG. 64 and FIG. 65 illustrate sensing methods described in the embodiments.

FIG. 64 schematically and three-dimensionally illustrates a space. As illustrated in FIG. 64, an object and a detecting apparatus are present in the space. For example, the detecting apparatus senses an object using wireless technology using, for example, radio waves. Note that the object may be any shape.

FIG. 65 illustrates one example of a plane passing through the object that is parallel to the xy plane in FIG. 64, and illustrates, for example, paths of radio waves transmitted by the detecting apparatus. Here, radio waves obtained by the detecting apparatus from the object may be reflected waves which are radio waves that reach the object and are reflected by the object, and may be radio waves emitted by the object itself.

As illustrated in FIG. 65, the detecting apparatus receives radio wave W1 that reaches the detecting apparatus directly after being reflected or emitted by the object (hereinafter referred to as a direct wave). The detecting apparatus also receives radio waves W2, W3 and W4 which are transmitted by the detecting apparatus, reflect off a wall, reach the object, reflect off the object, once again reflect off a wall, and reach the detecting apparatus (hereinafter referred to as reflected waves).

FIG. 65 illustrates an example of a single two-dimensional xy plane that cuts through the three-dimensional space. Since the above description can be applied to this two-dimensional plane that cuts through the three-dimensional space, the detecting apparatus can detect the position and shape of an object using direct and reflected waves. Stated differently, the detecting apparatus can achieve the advantageous effect that it can detect part of an object that cannot be captured with a sensor capable of capturing an image, such as a camera.

Supplemental Information 1

As a matter of course, the embodiments described in the present description may be combined and carried out with other content such as supplemental information.

In the present disclosure, detecting apparatus A12 is exemplified as being implemented as a camera, but detecting apparatus A12 according to the present disclosure may be implemented as something else. For example, detecting apparatus A12 may be a smartphone or personal computer, and may be a vehicle, robot, or drone.

Supplemental Information 2

As a matter of course, the embodiments described in the present description may be combined and carried out with other content such as supplemental information.

The terminal and access point (AP) may transmit a single modulated signal in order to perform communication, and may transmit a plurality of modulated signals using a plurality of antennas to perform communication. Accordingly, the transmission scheme known as multiple-input multiple-output (MIMO) may be used. Thus, the terminal and AP may be configured so as to include a plurality of receive antennas.

In the present specification, for the sake of simplicity, the terms terminal, AP, base station, apparatus, detecting apparatus, device, etc., are used, but the terms by which these elements are referred are not limited to these examples. For example, the terminal may be referred to as a communication/broadcast device such as a base station, access point, mobile phone, smartphone, or tablet, as a communication device such as a television, radio, or personal computer, or as a communication apparatus, a repeater, or a server. The AP may be referred to as a communication/broadcast device such as a base station, terminal, mobile phone, smartphone, or tablet, as a communication device such as a television, radio, or personal computer, or as a communication apparatus, a repeater, or a server. The base station may be referred to as a communication/broadcast device such as an AP, terminal, mobile phone, smartphone, or tablet, as a communication device such as a television, radio, or personal computer, or as a communication apparatus, a repeater, or a server. The device that performs sensing may be referred to as a communication/broadcast device such as an AP, base station, terminal, mobile phone, smartphone, or tablet, as a communication device such as a television, radio, or personal computer, or as a communication apparatus, a repeater, or a server. The apparatus or detecting apparatus may be referred to as a communication/broadcast device such as an AP, base station, terminal, mobile phone, smartphone, or tablet, as a communication device such as a television, radio, or personal computer, or as a communication apparatus, a repeater, or a server. The device or device A may be referred to as a communication/broadcast device such as an AP, base station, terminal, mobile phone, smartphone, or tablet, as a communication device such as a television, radio, or personal computer, or as a communication apparatus, a repeater, a server, an electronic motorcycle (e-motorcycle), an electric kick scooter, a vacuum cleaner, an electric automobile, an electric power-assisted automobile, a motorcycle, an automobile, a boat, or airplane.

The embodiments are merely examples. For example, while a "modulation method, an error correction coding method (error correction code, code length, coding rate, etc., to be used), control information, etc." are exemplified, it is possible to carry out the present disclosure with the same configuration even when other types of a "modulation method, an error correction coding method (error correction code, code length, coding rate, etc., to be used), control information, etc." are applied.

Regarding the modulation method, even when a modulation method other than the modulation methods described in the present specification is used, it is possible to carry out the exemplary embodiments and the other contents described herein. For example, APSK (for example, 16APSK, 64APSK, 128APSK, 256APSK, 1024APSK, and 4096APSK), PAM (for example, 4PAM, 8PAM, 16PAM, 64PAM, 128PAM, 256PAM, 1024PAM, and 4096PAM), PSK (for example, BPSK, QPSK 8PSK, 16PSK, 64PSK, 128PSK, 256PSK, 1024PSK, and 4096PSK), and QAM (for example, 4QAM, 8QAM, 16QAM, 64QAM, 128QAM, 256QAM, 1024QAM, and 4096QAM) may be applied, or in each modulation method, uniform mapping or non-uniform mapping may be performed. Moreover, a method for arranging 2, 4, 8, 16, 64, 128, 256, 1024, etc., signal points on an I-Q plane (a modulation method having 2, 4, 8, 16, 64, 128, 256, 1024, etc., signal points) is not limited to a signal point arrangement method of the modulation methods described herein.

The transmitting apparatus and receiving apparatus according to the present disclosure are devices having a communication function, and the devices may be devices having a communication function, and such devices may be configured to be connectable with devices for running applications such as a television, a radio, a personal computer, and a mobile phone, via a certain interface. Moreover, in the present embodiment, symbols other than data symbols, such as a pilot symbol (preamble, unique word, postamble, reference symbol, mid-amble, etc.), a control information symbol, a null symbol, may be arranged in any order in the frame. Here, the terms "reference symbol" and "control information symbol" are used, but the naming of such symbols is not important; the functions that they perform are.

A reference symbol or reference signal may be a known symbol that is modulated using PSK modulation in a transceiver, and the receiver may use this symbol to perform, for example, frequency synchronization, time synchronization, channel estimation (channel state information (CSI) estimation) for each modulated signal, and signal detection. Alternatively, the reference symbol or reference signal enables a symbol transmitted by a transmitter to be known by a receiver by the receiver being synchronized.

The control information symbol is a symbol for transmitting information required to be transmitted to a communication partner in order to establish communication pertaining to anything other than data (such as application data) (this information is, for example, the modulation method, error correction coding method, coding rate of the error correction encoding method used in the communication, and/or upper layer settings information).

Note that the present disclosure is not limited to the embodiments; various modifications may be made to the embodiments. For example, each embodiment is described as being implemented as a communication device, but this example is not limiting, each embodiment may implement a corresponding communication method as software.

Note that a program for executing the above-described communication method may be stored in read only memory (ROM) in advance to cause a central processing unit (CPU) to operate this program.

Moreover, the program for executing the communication method may be stored in a computer-readable storage medium, the program stored in the recording medium may be recorded in RAM in a computer, and the computer may be caused to operate according to this program.

Each configuration of each of the above-described embodiments, etc., may be realized as a large scale integration (LSI) circuit, which is typically an integrated circuit that includes an input terminal and an output terminal. These integrated circuits may be formed as separate chips, or may be formed as one chip so as to include the entire configuration or part of the configuration of each embodiment. LSI is described here, but the circuit may also be referred to as an IC, a system ISI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a programmable FPGA or a reconfigurable processor which is reconfigurable in connection or settings of circuit cells inside the LSI circuit may be used. Further, when development of a semiconductor technology or another derived technology provides a circuit integration technology which replaces LSI, as a matter of course, functional blocks may be integrated by using this technology. Adaption of biotechnology, for example, is a possibility.

The transmitting method supported by the AP and terminal may be a multi-carrier scheme such as OFDM, and may be a single-carrier scheme. The AP and terminal may support both a multi-carrier scheme and a single-carrier scheme. In such cases, a plurality of methods may be used to generate the single-carrier scheme modulated signal, and implementation is possible regardless of which method is used. Examples of single-carrier schemes include discrete Fourier transform (DFT)-spread orthogonal frequency division multiplexing (OFDM), trajectory constrained DFT-Spread OFDM, OFDM based single carrier (SC), single carrier (SC)-frequency division multiple access (FDMA), and guard interval DFT-spread OFDM.

Note that at least one of the field programmable gate array (FPGA) and the central processing unit (CPU) may be configured to download, via wired or wireless communication, some or all of the software required to implement the communication method described in the present disclosure. At least one of the FPGA and the CPU may be further configured to download, via wired or wireless communication, some or all of software required to perform updates. The downloaded software may be stored in storage, and based on the stored software, at least one of the FPGA and the CPU may be operated to implement the digital signal processing described in the present disclosure.

Here, a device including at least one of the FPGA and the CPU may connect to a communications modem over a wired or wireless connection, and the device and the communications modem may implement the communication method described in the present disclosure.

For example, a communication device such as the AP, or the terminal described in the present specification may include at least one of the FPGA and the CPU, and include an interface for obtaining, from an external source, software for operating at least one of the FPGA and the CPU. The communication device may further include storage for storing software obtained from the external source, and implement the signal processing described in the present disclosure by operating the FPGA and the CPU based on the stored software.

The sensing or sensing processing described in the present specification includes at least processing of detecting the position of an object, processing of detecting presence or absence of an object, processing of predicting a material property of an object, processing of detecting movement of an object, processing of estimating the status of a surrounding area of an apparatus capable of performing sensing, processing of estimating a distance between an apparatus capable of performing sensing and an object, or processing of detecting the shape of an object. In the processing of detecting the position of an object, there are instances in which an object and object movement may be detected simultaneously. Moreover, in the processing of detecting presence or absence of an object or processing of detecting the shape of an object, it is possible to specify a target object.

In the above embodiments, upon detecting an object (a person, animal, vehicle, etc.), a shutter may be triggered, that is to say, a still image may be captured. Moreover, upon detecting an object, a video may be captured. What is to be detected may be a predetermined gesture.

The sensing may be sensing performed via wireless technology that uses radio waves or sensing performed via wireless technology that uses a higher frequency, such as light.

An apparatus for sensing like that illustrated in FIG. 14 and an apparatus for communication like that illustrated in FIG. 15 may be connected via an interface or the like to achieve an apparatus capable of both sensing and communication like that in FIG. 16.

Note that the purpose for using spatial sensing, the application of spatial sensing, and the environment in which spatial sensing is used vary. Various factors vary depending on the application or environment of use, such as the object that is a detection target or the distance to an object that is a detection target, desired distance precision, allowable delay time, or information desired to be obtained simultaneously with the detection of an object. Accordingly, depending on the purpose for using spatial sensing, the application of spatial sensing, and the environment in which spatial sensing is used, a transmitting apparatus and a transmitting method that can obtain a purpose-specific sensing result by, for example, switching sensing methods or combining a plurality of sensing methods are required.

With the detecting apparatus according to the above aspect, by performing detection of distance to an object using radio waves and controlling detection position using image information, it is possible to easily specify an object that is a detection target for distance measuring, and detect the distance thereto.

For example, when a user specifies an object as a detection target based on video displayed on an apparatus having a display such as a touch panel and an input unit or inputs a signal to be selected, it is easy for the user to specify a target object for sensing performed using radio waves.

Moreover, for example, when an object that is a detection target is detected via image processing that uses image information obtained by an image capturing unit and distance between the detected object is estimated, it is possible to use a feature amount included in the image information, such as color or shape, in the object detection. Accordingly, compared to when detection is performed using only radio waves, it is possible to improve object detection precision and foster improvement of identification ability of an object.

An example in which triangulation is used is given in the present disclosure. Hereinafter, another method for measuring or estimating position using triangulation will be described with reference to FIG. 66.

Figure 66:
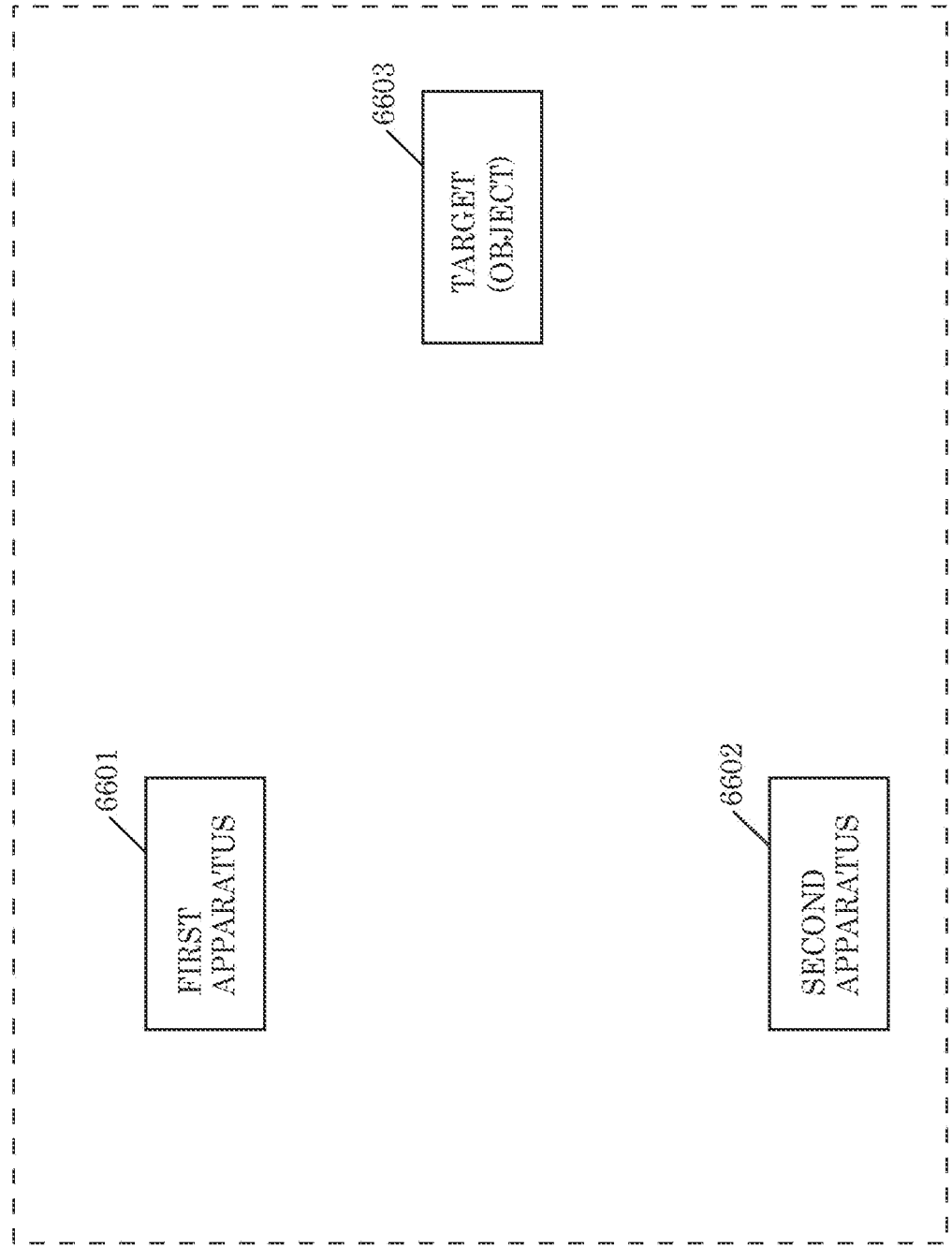
FIG. 66 illustrates measurement or estimation of a position using triangulation described in the embodiments.

Process A:

In FIG. 66, for example, first apparatus 6601 transmits a signal using radio waves. This signal is then reflected by second apparatus 6602, and first apparatus 6601 obtains the reflected signal. With this, first apparatus 6601 knows the distance between first apparatus 6601 and second apparatus 6602. Note that first apparatus 6601 may share with second apparatus 6602 the information of the distance between first apparatus 6601 and second apparatus 6602.

Process B:

For example, first apparatus 6601 transmits a signal using radio waves. This signal is then reflected by target (object) 6603, and first apparatus 6601 obtains the reflected signal. With this, first apparatus 6601 knows the distance between first apparatus 6601 and target (object) 6603. Note that first apparatus 6601 may share with second apparatus 6602 the information of the distance between first apparatus 6601 and target (object) 6603.

Process C:

For example, second apparatus 6602 transmits a signal using radio waves. This signal is then reflected by target (object) 6603, and second apparatus 6602 obtains the reflected signal. With this, second apparatus 6602 knows the distance between second apparatus 6602 and target (object) 6603. Note that second apparatus 6602 may share with first apparatus 6601 the information of the distance between second apparatus 6602 and target (object) 6603.

Process D:

First apparatus 6601 and/or second apparatus 6602 obtains, via Process A. Process B, and Process C, information indicating the distance between first apparatus 6601 and second apparatus 6602, information indicating the distance between first apparatus 6601 and target (object) 6603, and information indicating the distance between second apparatus 6602 and target (object) 6603, and performs triangulation using this information to know the position of target (object) 6603.

Next, another method will be described.

Process E:

For example, first apparatus 6601 and/or second apparatus 6602 store, at the point in time of being initially set up, information indicating the distance between first apparatus 6601 and second apparatus 6602.

Process F:

For example, first apparatus 6601 transmits a signal using radio waves. This signal is then reflected by target (object) 6603, and first apparatus 6601 obtains the reflected signal. With this, first apparatus 6601 knows the distance between first apparatus 6601 and target (object) 6603. Note that first apparatus 6601 may share with second apparatus 6602 the information of the distance between first apparatus 6601 and target (object) 6603.

Process G:

For example, second apparatus 6602 transmits a signal using radio waves. This signal is then reflected by target (object) 6603, and second apparatus 6602 obtains the reflected signal. With this, second apparatus 6602 knows the distance between second apparatus 6602 and target (object) 6603. Note that second apparatus 6602 may share with first apparatus 6601 the information of the distance between second apparatus 6602 and target (object) 6603.

Process H:

First apparatus 6601 and/or second apparatus 6602 obtains, via Process E, Process F, and Process G, information indicating the distance between first apparatus 6601 and second apparatus 6602, information indicating the distance between first apparatus 6601 and target (object) 6603, and information indicating the distance between second apparatus 6602 and target (object) 6603, and performs triangulation using this information to know the position of target (object) 6603. Note that first apparatus 6601 and second apparatus 6602 may be configured as a single apparatus.

In the present disclosure, pairing of a gesture and an operation of an apparatus is described. Hereinafter, an example of registration processing for pairing of a gesture and an operation of an apparatus will be described.

In Embodiment 7 in the present disclosure, an example in which a registered first gesture and a first operation of apparatus #A, such as emitting sound or vibrating, is given. Here, the processing of registering the combination of the first gesture and the operation of apparatus #A as a paired operation may be performed using, for example, a settings screen for setting a paired operation of a device in device #A, for example.

For example, in order to pair a gesture and an operation of a device, the user opens a settings screen on device #A, and one or more candidate gestures are displayed on the settings screen. Here, when the user selects a first gesture from among the one or more candidate gestures displayed on the settings screen, one or more candidate operations that are permitted to be used in apparatus #A are displayed on the settings screen. For example, when the user selects a first operation from among a plurality of candidate operations, a confirmation screen for determining whether or not to pair the first gesture and the first operation as a combination of a gesture and a device operation is displayed, and the registration is completed by the user making an input that confirms the pairing.

Note that the method used to register the pairing of a gesture and a device operation that uses the above-described settings screen is merely one example of a plurality of pairing registration methods; the method used to register the pairing of a gesture and a device operation according to the present disclosure is not limited to the above method.

For example, instead of selecting an operation to be paired after selecting a gesture, a gesture may be selected after selecting an operation to be paired. In such cases, after selecting an operation to be paired, a plurality of gesture candidates that can be paired are displayed on the settings screen.

Note that as with this example, the procedure of processes for pairing a gesture and an operation of an apparatus and the order of the processes are not limited to the examples given in the specification.

Moreover, the method of registering the pairing of a gesture and a device operation may be provided using a graphical user interface (GUI). When a GUI is used, for example, icons or blocks corresponding to each of a plurality of gesture candidates and icons or blocks corresponding to each of a plurality of device operation candidates may be displayed on the screen, the pairing process may be described by moving around the icons or blocks and connecting them using a touch panel or mouse or by connecting the icons or blocks with a connector indicated by a line, for example, and the described pairing process may then be registered.

Although the above describes a case in which a gesture is paired with an operation of a device, in addition to the user selecting a gesture from a settings screen, a surrounding environment or a user movement detectable by another sensor included in device #A, e.g., a voice command, may be selectably presented as a candidate for an input that can be paired with a device operation. Since this configuration enables control of an operation of a device based on, for example, a movement of the user other than a gesture or a place in which the device is used, the probability that a user operation (user input) can be simplified and erroneous user operation can be avoided increases, and there is a possibility that this can contribute to an improvement of operability.

Although the above describes a case in which the pairing of a gesture and a device operation is performed on a settings screen of device #A, the setting may be configured using some device other than device #A. In such cases, on the settings screen of the other device, the user selects, via the other device, a device to be set from among a plurality of candidate devices whose pairable operation settings are configurable.

Moreover, for example, when a combination of an operation of a device and an action of a user, such as a gesture, detected by a device capable of sensing that is placed in the space described in Embodiment 8, such as the inside of a home, is registered in a server as a paired operation, the user selects which device or sensor for the pairing registration from among a plurality of devices capable of sensing or sensors, and selects which device for the pairing registration from among a plurality of devices that provide usable operations.

For example, to perform the pairing registration, the user opens a settings screen on a device such as a smartphone, tablet, computer, or mobile phone or the like, whereby one or more candidate devices or candidate sensors that can be used in the pairing registration are displayed on the settings screen. The user then selects a first device from among the one or more candidate devices or candidate sensors displayed on the settings screen, whereby one or more candidate gestures detectable by the selected first device are displayed. When the user selects a first gesture from among the one or more candidate gestures displayed on the settings screen, one or more candidate apparatuses that can be paired are displayed on the settings screen. The user selects apparatus #A from among the plurality of displayed candidate apparatuses, whereby one or more candidate operations permitted to be used in apparatus #A are displayed on the settings screen. For example, when the user selects a first operation from among a plurality of candidate operations, a confirmation screen for determining whether or not to pair the first gesture and the first operation as a combination of a gesture and a device operation is displayed, and the registration is completed by the user making an input that confirms the pairing.

With this configuration, for example, it is possible to register the pairing of an operation of a given device that is pairable and a gesture detected by a given device or sensor that is pairable and is placed in a target space such as the inside of a home. As a result, for example, it is possible to control an operation based on a gesture even for a device that does not include a gesture detection function, which makes it possible to improve the operability of the device.

Note that the pairing registration method used for the combination of a gesture and a device and device operation that uses the above-described settings screen is merely one example of a plurality of pairing registration methods; the pairing registration method used for the combination of a gesture and a device and device operation according to the present disclosure is not limited to the above method.

For example, instead of, after selecting a device or sensor to be paired, a gesture candidate that is detectable by the selected device or sensor being displayed, one or more detectable gesture candidates for each of a plurality of devices or sensors may be simultaneously displayed on a settings screen. Similarly, instead of, after selecting a device to be paired, an operation candidate of the selected device being displayed, a plurality of selectable operations for each of a plurality of devices may be simultaneously displayed on a settings screen. The above configuration enables selection of a combination of a device and an operation to be paired with a single user input operation which simplifies user operation and makes it possible to improve operability. Additionally, instead of selecting a device operation after selecting a gesture, a gesture may be selected after selecting a device operation. In such cases, after selecting a device operation, a plurality of candidate gestures that can be paired are displayed on the settings screen.

When associating a combination of a plurality of gestures with a device operation, a combination of a plurality of gestures that are detectable by mutually different devices or sensors may be used.

As one example of a paired operation for a combination of gestures that are detectable by a plurality of devices or sensors, a case in which access point (AP) N701 and audio equipment N702 in FIG. 50 or FIG. 55 each include a sensing function will be described.

Access point (AP) N701 detects a first change pattern registered in advance based on a temporal change in first sensing data obtained by a first sensor included in access point (AP) N701. In this example, the first change pattern is a pattern detected when the user performs a first gesture. Although the process of detecting a first change pattern from the first sensing data is exemplified as being performed by access point (AP) N701, the detection process may be performed by some other device, such as cloud server N720 illustrated in FIG. 50, server Q101 illustrated in FIG. 55, or some other device. In such cases, access point (AP) N701 forwards the first sensing data to the other device over a network, and the other device uses the first sensing data to perform the process of detecting one or more change patterns including the first change pattern.

Audio equipment N702 detects a second change pattern registered in advance based on a temporal change in second sensing data obtained by a second sensor included in audio equipment N702. In this example, the second change pattern is a pattern detected when the user performs a first gesture. Although the process of detecting a second change pattern from the second sensing data is exemplified as being performed by audio equipment N702, the detection process may be performed by some other device, such as access point (AP) N701, cloud server N720 illustrated in FIG. 50, server Q101 illustrated in FIG. 55, or some other device. In such cases, audio equipment N702 forwards the first sensing data to the other device over a network, and the other device uses the first sensing data to perform the process of detecting one or more change patterns including the second change pattern. Taking security into consideration, the other device that performs the detection process may be restricted to a device capable of direct wireless communication such as access point (AP) N701 or a device connected to a directly-wired communication cable.

Next, a first example of using a combination of mutually different devices or sensors in the detection of a gesture will be described. In the first example, upon registering the pairing function, when both the first change pattern is detected from the first sensing data and the second change pattern is detected from the second sensing data, the registration associates and registers a fourth operation such as increasing the volume of a speaker included in audio equipment N702, for example, or increasing the amplitude of a voice component transmitted in a voice signal output from an audio output terminal, or decreasing the volume of a speaker included in audio equipment N702, for example, or decreasing the amplitude of a voice component transmitted in a voice signal output from an audio output terminal. In other words, when the first change pattern is detected from the first sensing data and the second change pattern is detected from the second sensing data, the fourth operation is performed in audio equipment N702.

As one example of a paired operation using the above configuration, a case in which the user performs a second gesture different than the first gesture will be described. Assume the user performs the second gesture and a sensing result similar to the first gesture from the position of access point (AP) N701 is obtained, and a sensing result not similar to the first gesture from the position of audio equipment N702 is obtained. In such cases, with a determination that uses only the first sensing data, the first change pattern is detected, and audio equipment N702 performs the fourth operation. This operation is unintended by the user, as the user performed the second gesture. However, with a determination that uses the second sensing data in addition to the first sensing data, the second change pattern is detected from the second sensing data, so the fourth operation is not performed. In other words, with a configuration in which a gesture performed by the user is determined using a plurality of devices that have the above-described sensing function or a plurality of sensors and the determination result is paired with an operation of a given device, it is possible to inhibit a device from performing an operation which is unintended by the user.

Next, a second example of using a combination of mutually different devices or sensors in the detection of a gesture will be described. In the second example, upon registering the pairing function, when the first change pattern and is detected from the first sensing data but the second change pattern is not detected from the second sensing data, the registration associates and registers the fourth operation. In other words, when the first change pattern is detected from the first sensing data but the second change pattern is not detected from the second sensing data, the fourth operation is performed in audio equipment N702.

As one example of a paired operation using the above configuration, a case will be described in which the user is in a position that can be sensed from both access point (AP) N701 and audio equipment N702, such as a position close to audio equipment N702, and performs the first gesture. In such cases, since the first change pattern is detected from the first sensing data and the second change pattern is detected from the second sensing data, audio equipment N702 does not perform the fourth operation. Next, as another example of a paired operation, a case will be described in which the user is in a position that can be sensed from access point (AP) N701 but cannot be sensed from audio equipment N702, such as a position distanced from audio equipment N702, that is to say, is in a position outside the sensing range of audio equipment N702, and performs the first gesture. In such cases, since the first change pattern is detected from the first sensing data but the second change pattern is not detected from the second sensing data, audio equipment N702 performs the fourth operation.

Although the above describes an example in which audio equipment N702 performs the fourth operation when the first gesture is detected from a sensing result of access point (AP) N701 and the first gesture is not detected from a sensing result of audio equipment N702, the configuration according to the present disclosure whereby a determination is made as to whether the user performed a gesture or not using a plurality of devices having a sensing function or a plurality of sensors, and the determination result is paired with an operation of a given device is not limited to this example.

For example, the sensing performed by audio equipment N702 may be sensing that only determines whether an object is present in the surrounding area or not, and not sensing that detects a gesture. In such cases, instead of the condition "the first gesture is not detected from the sensing result of audio equipment N702", for example, the condition "an object is not detected in the surrounding area from the sensing result of audio equipment N702" may be employed. Here, "an object is not detected in the surrounding area from the sensing result of audio equipment N702" is, for example, a situation in which an object other than an object detected in the initial sensing described in Embodiment 8 or 9 is not detected, or a situation in which second sensing data is obtained that is similar to the second sensing data obtained upon performing the initial sensing.

When the first gesture is detected from the sensing result of access point (AP) N701 and the first gesture is detected from the sensing result of audio equipment N702, audio equipment N702 may perform a fifth operation different than the fourth operation, and when the first gesture is detected from the sensing result of access point (AP) N701 but the first gesture is not detected from the sensing result of audio equipment N702, audio equipment N702 may perform the fourth operation.

As described above, with the configuration in which a determination is made as to whether a user has made a gesture or not using a plurality of devices having a sensing function or a plurality of sensors and the determination result is paired with an operation of a given device, whether the paired operation is implemented or not based on, for example, the position, orientation, or posture of the user can be switched, even if the user performs the same gesture, and the device operation to be implemented can be switched based on, for example, the position, orientation, or posture of the user. As a result, it may be possible to improve operability of the device by the user and inhibit the execution of a device operation that the user does not intend to execute.

Moreover, the method of registering the pairing of the above-described event that is detectable from sensing data from a plurality of devices or sensors and a device operation may be provided using a graphical user interface (GUI). When a GUI is used, for example, icons or blocks corresponding to each of a plurality of candidates of events that are detectable from sensing data from a plurality of devices or sensors and icons or blocks corresponding to each of a plurality of device operation candidates may be displayed on the screen, the pairing process may be described by moving around the icons or blocks and connecting them using a touch panel or mouse or by connecting the icons or blocks with a connector indicated by a line, for example, and the described pairing process may then be registered.

The above describes an example of providing a function for describing and registering a pairing process using the above-described settings screen and pairing registration method to determine whether a condition has been met, such as whether a specified gesture has been detected or whether a specified event has been detected using sensing data, and perform a specified device operation when a detection is made or when a detection is not made. However, the registerable pairing process according to the present disclosure is not limited to this example. For example, in order to describe a complicated pairing process, the above-described settings screen and pairing registration method may provide a function that describes a relationship between a plurality of gestures or between a gesture and a device operation, using a given logical operator such as a OR, AND, XOR, or NOT. Moreover, in order to describe a complicated pairing process, the above-described settings screen and pairing registration method may provide a function that can describe a relationship between a plurality of events or between an event and a device operation, using a given logical operator such as a OR, AND, XOR, or NOT. Moreover, in addition to condition determination based on sensing data, a combination of any given condition determinations, such as a condition determination based on time information or a condition determination based on, for example, the number of devices connected to the network or a function included in a device, may be used.

In the present disclosure, the sensor used for sensing is not limited to sensing that uses radio waves. For example, sensing that uses light such as light detection and ranging (LIDAR) may be used. When a combination of a plurality of sensors is used, the sensors that are combined may be any sort of sensors. For example, a camera may be used as a sensor, and captured video may be used as sensing data as-is, or image processing for extracting a feature amount or image processing such as patter recognition may be performed on the video, and the result may be used as sensing data. Moreover, for example, data obtained from any given sensor included in a wearable terminal worn by the user may be used as sensing data. Examples of such a sensor include a microphone, position sensor, acceleration sensor, myoelectric potential sensor, or temperature sensor.

Although the above describes an example of a case in which registration of a paired operation of a combination of events detected using a plurality of sensing data items is performed by a user on a settings screen or GUI, another method may be used for the registration. For example, in the process for registering a gesture to a device that is described in Embodiment 7, it may be created automatically. For example, in the system described in Embodiment 8 or 9, after a user instructs gesture registration to start, while the user is performing the gesture, a first sensor and a second sensor included in a plurality of different or same devices each obtain sensing data, and a temporal change in the sensing data obtained by each of the sensors is stored. Thereafter, determination as to whether or not the registered gesture has been made or not is performed using the sensing data obtained by the first sensor and the sensing data obtained by the second sensor. This configuration achieves the advantageous effect that it is possible to simplify the registration of a paired operation of a combination of events detected using a plurality of sensing data items.

Note that when a sensor that performs sensing using radio waves is used, the sensing data used in the above-described process may be data indicating a three-dimensional position or shape in a given format such as a point cloud or mesh format, and may be data obtained by implementing given signal processing on the reception signal, such as a transmission path characteristic estimated from a pilot or reference signal, a correlation value between a reference signal and the reception signal, or a phase difference between sub-carriers in an OFDM signal. The sensing data may be, for example, data obtained by extracting a difference between a sensing result obtained while a moving target object is not present, such as the sensing result of the initial sensing described above, and a sensing result obtained by normal sensing performed for the purpose of detecting a target object.

In the above embodiments, each element may be configured as dedicated hardware or may be realized by executing a software program suitable for the element. Each of the elements may be realized by means of a program executing unit, such as a central processing unit (CPU) or a processor, reading and executing the software program recorded on a recording medium such as a hard disk or a semiconductor memory. Here, the software program for realizing the transmitting apparatus and the like according to each of the embodiments is the program described below.

The program causes a computer to execute a transmitting method including: configuring a frame conforming to orthogonal frequency-division multiple access (OFDMA)

and including a plurality of time-frequency resources, each being a resource defined by time and frequency; and transmitting the frame configured in the configuring over radio waves, wherein in the configuring, a frame including a resource for communication and a resource for sensing is configured as the frame, the resource for communication being a time-frequency resource in which a symbol including communication data is disposed, and the resource for sensing being a time-frequency resource in which a symbol for sensing via radio waves transmitted in the transmitting is disposed.

Hereinbefore, a transmitting apparatus and the like according to one or more aspects has been described based on exemplary embodiments, but the present disclosure is not limited to the above exemplary embodiments. Various modifications of the exemplary embodiments as well as embodiments resulting from combinations of elements from different exemplary embodiments that may be conceived by those skilled in the art are intended to be included within the scope of the one or more aspects as long as these do not depart from the novel teachings and advantages of the present disclosure.

INDUSTRIAL APPLICABILITY

The present disclosure is applicable in, for example, a wireless communication apparatus, a wired communication apparatus, or a terminal or device including such an apparatus.

What is claimed is:

1. A transmitting apparatus, comprising:
a processor configured to configure an orthogonal frequency-division multiple access (OFDMA) frame including resources, each of the resources being defined by time and frequency; and
a transmitter configured to transmit the OFDMA frame over radio waves,
wherein the OFDMA frame includes a resource for communication and resources for sensing, the resource for communication being a time-frequency resource in which a symbol including communication data is transmitted, and each of the resources for sensing being a time-frequency resource in which a symbol for sensing via radio waves is transmitted,
wherein the resources for sensing include a first resource and a second resource, the first resource and the second resource being allocated at different times and having a same frequency, the first resource and the second resource being separated in time axis by a guard interval, and
wherein the resource for communication is at least allocated at a same time and having a different frequency than at least one of the first resource or the second resource.

2. The transmitting apparatus according to claim 1, wherein the OFDMA frame includes two guard intervals of different lengths of time and different frequencies.

3. The transmitting apparatus according to claim 1, wherein the OFDMA frame includes at least two resources for sensing each of which is the resource for sensing, the at least two resources for sensing being of different frequencies and different lengths of time.

4. The transmitting apparatus according to claim 1, further comprising:
a receiver configured to receive a reflected wave of the radio waves, transmitted by the transmitter,
wherein the processor is further configured to execute sensing processing by analyzing the reflected wave received by the receiver.

5. The transmitting apparatus according to claim 4, wherein the sensing processing includes at least one of processing of detecting a position of an object, processing of detecting presence or absence of an object, or processing of detecting a shape of an object, by analyzing the reflected wave received by the receiver.

6. The transmitting apparatus according to claim 4, further comprising:
a controller configured to control driving of an electronic device based on a result of the sensing processing by the processor.

7. A control system, comprising:
the transmitting apparatus according to claim 6; and
the electronic device driven under control by the controller included in the transmitting apparatus.

8. A transmitting method, comprising:
configuring an orthogonal frequency-division multiple access (OFDMA) frame including resources, each of the resources being defined by time and frequency; and
transmitting the OFDMA frame over radio waves,
wherein the OFDMA frame includes a resource for communication and resources for sensing, the resource for communication being a time-frequency resource in which a symbol including communication data is transmitted, and each of the resources for sensing being a time-frequency resource in which a symbol for sensing via radio waves is transmitted,
wherein the resources for sensing include a first resource and a second resource, the first resource and the second resource being allocated at different times and having a same frequency, the first resource and the second resource being separated in time axis by a guard interval, and
wherein the resource for communication is at least allocated at a same time and having a different frequency than at least one of the first resource or the second resource.

9. The transmitting apparatus according to claim 1, wherein
the resource for communication is allocated at a same time and having a different frequency than the first resource, the guard interval, and the second resource.

* * * * *